US012230043B2

(12) United States Patent
Suemasu et al.

(10) Patent No.: US 12,230,043 B2
(45) Date of Patent: Feb. 18, 2025

(54) COOKING ASSISTANCE METHOD, COOKING ASSISTANCE DEVICE, AND RECORDING MEDIUM

(71) Applicant: Panasonic Intellectual Property Corporation of America, Torrance, CA (US)

(72) Inventors: Satoshi Suemasu, Osaka (JP); Tatsuhiro Kishi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 333 days.

(21) Appl. No.: 17/871,325

(22) Filed: Jul. 22, 2022

(65) Prior Publication Data

US 2022/0358771 A1 Nov. 10, 2022

Related U.S. Application Data

(63) Continuation of application No. PCT/JP2021/004844, filed on Feb. 9, 2021.

(30) Foreign Application Priority Data

Feb. 13, 2020 (JP) .................... 2020-022333

(51) Int. Cl.
*G06V 20/68* (2022.01)
*A47J 47/00* (2006.01)
(Continued)

(52) U.S. Cl.
CPC ............ *G06V 20/68* (2022.01); *A47J 47/005* (2013.01); *G01G 19/413* (2013.01); *G01G 19/56* (2013.01); *G05B 15/02* (2013.01)

(58) Field of Classification Search
CPC ........ G06V 20/68; G06V 20/52; G06V 20/41; G06V 10/44; A47J 47/005; A47J 36/32;
(Continued)

(56) References Cited

U.S. PATENT DOCUMENTS 4,981,187 A 1/1991 Masuyama et al.
2010/0231506 A1* 9/2010 Pryor .................. F24C 7/082
348/E7.085

(Continued)

FOREIGN PATENT DOCUMENTS

CN 106618291 A * 5/2017
CN 107343382 A * 11/2017 ............ A47J 36/321
(Continued)

OTHER PUBLICATIONS

International Search Report (ISR) issued on Apr. 20, 2021 in International (PCT) Application No. PCT/JP2021/004844.

*Primary Examiner* — Jose L Couso
(74) *Attorney, Agent, or Firm* — Wenderoth, Lind & Ponack, L.L.P.

(57) ABSTRACT

A cooking assistance method executed by a computer includes: causing an output device to display a first image relating to a first cooking process in which a cooking operation is performed using a cooking board; obtaining a load on the cooking board at a first temporal resolution while the first image is displayed; changing the first image displayed on the output device to a second image relating to a second cooking process in which a cooking operation different from the first cooking process is performed using the cooking board; changing the first temporal resolution used to obtain the load to a second temporal resolution different from the first temporal resolution, when the first image is
(Continued)

changed to the second image; and obtaining a load on the cooking board at the second temporal resolution while the second image is displayed.

20 Claims, 40 Drawing Sheets

(51) Int. Cl.
*G01G 19/413* (2006.01)
*G01G 19/56* (2006.01)
*G05B 15/02* (2006.01)

(58) Field of Classification Search
CPC ........ A47J 36/321; A47J 36/046; A47J 36/00; A47J 37/108; A47J 44/00; A47J 43/00; G01G 19/413; G01G 19/56; G05B 15/02; F24C 7/02; F24C 7/04; A23L 5/10; A23L 5/00; G06T 2207/30128; H04N 7/183; H04N 7/181; G01K 1/02; G01K 2207/00; G01K 2207/06; H05B 1/0266; H05B 6/12; G06F 3/0425

See application file for complete search history.

(56) References Cited

U.S. PATENT DOCUMENTS

| 2011/0167100 | A1* | 7/2011 | Brodowski | ............... | A23L 5/10 |
| | | | | | 708/133 |
| 2012/0286080 | A1 | 11/2012 | Sladecek | | |
| 2018/0292254 | A1 | 10/2018 | Caregnato et al. | | |

FOREIGN PATENT DOCUMENTS

| JP | 63-228033 | 9/1988 |
| JP | 2-75913 | 3/1990 |
| JP | 5814935 | 11/2015 |
| WO | 2011/080660 | 7/2011 |

* cited by examiner

FIG. 10
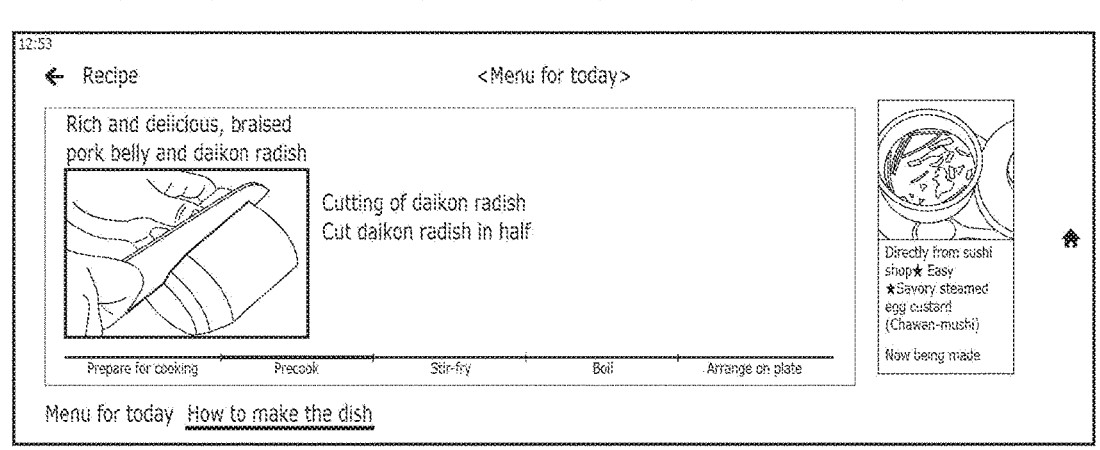
(a)
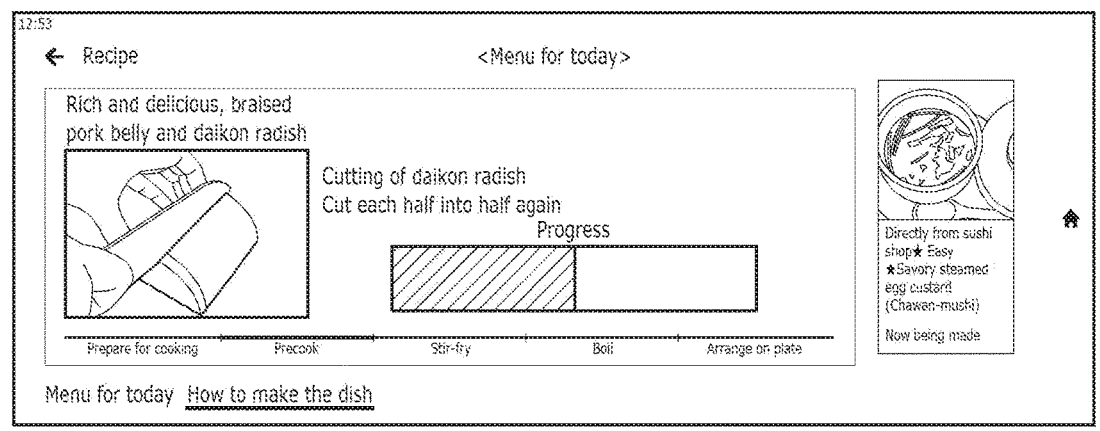
(b)
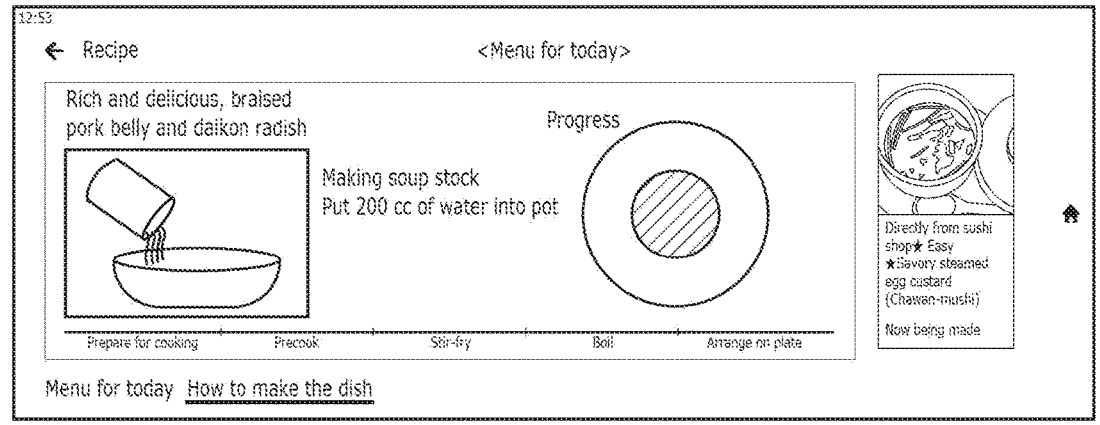
(c)

FIG. 13A

| | Type of cooking process | Description of cooking process | | ... | Presentation information |
|---|---|---|---|---|---|
| | | cooking object | Cooking method | | |
| Cooking process 1 | Cutting process | Carrot | Chopping | ... | Image 1, Audio 1 |
| Cooking process 2 | Cutting process | Potato | Chopping | ... | Image 2, Audio 2 |
| Cooking process 3 | Cutting process | onion | Slicing | ... | Image 3, Audio 3 |
| ... | ... | ... | ... | ... | ... |
| Cooking process N | ... | ... | ... | ... | ... |

FIG. 13B

| | Derivation subject | Standard range | Change made when value of derivation subject is outside standard | |
|---|---|---|---|---|
| | | | Above standard | Below standard |
| Cooking process 1 | Hardness | A | Add cutting process<br>Add preparation process<br>Change heating-cooling process | Suggest different dish |
| Cooking process 2 | Thickness | B | Add cutting process<br>Add preparation process<br>Change heating-cooling process | Suggest different dish |
| Cooking process 3 | Thermal conductivity | C | Add cutting process<br>Add preparation process<br>Change heating-cooling process | Suggest different dish |
| ... | ... | ... | ... | ... |
| Cooking process N | | | | |

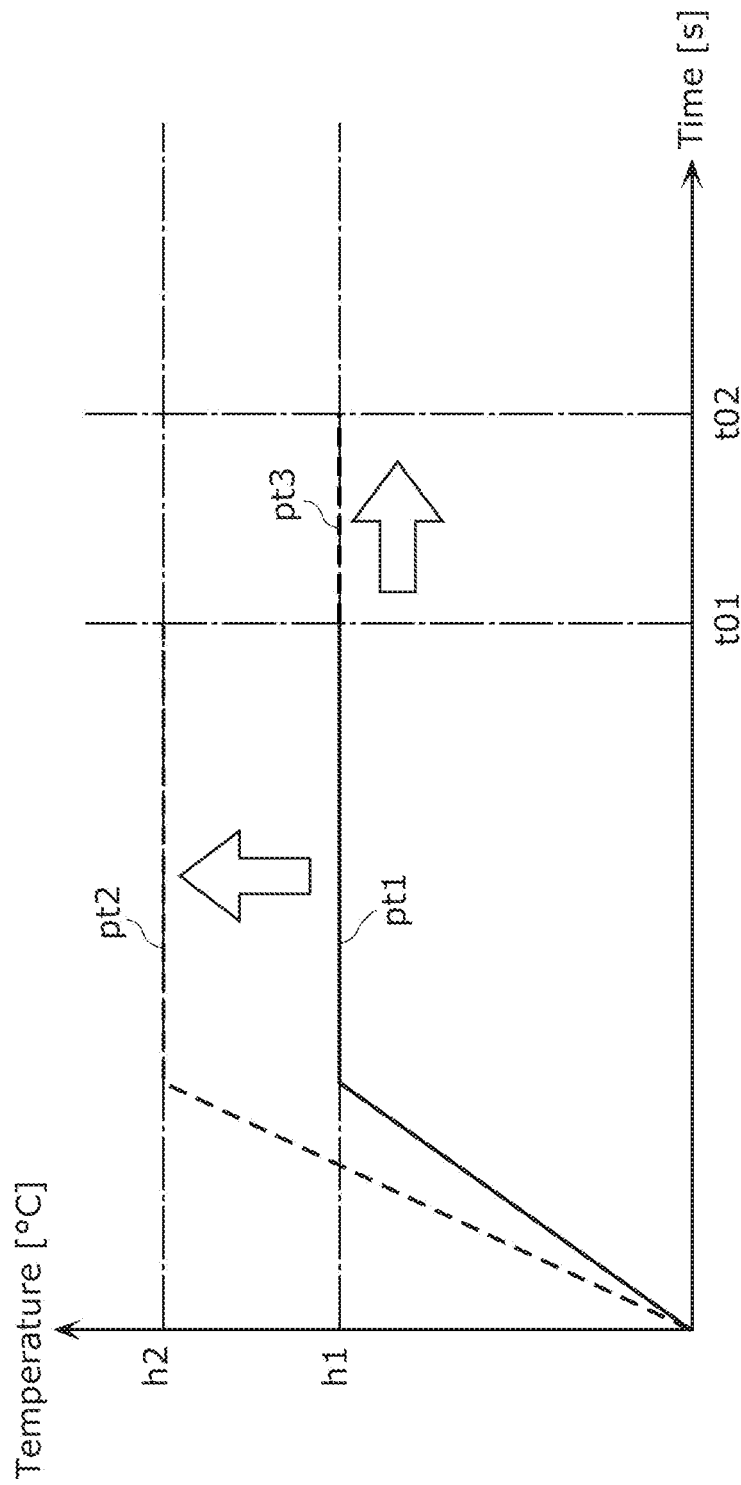

FIG. 15

| | Description of cooking process | Type of cooking process | Addition of cooking process | Change of cooking process | Change of dish | Presentation information |
|---|---|---|---|---|---|---|
| Cooking process 1 | Cut carrot | Cutting process | Reprocess carrot | Change of heating process | Suggestion of different dish | Image 1, Audio 1 |
| Cooking process 2 | Cut potato | Cutting process | Reprocess potato | Change of heating process | Suggestion of different dish | Image 2, Audio 2 |
| Cooking process 3 | Cut onion | Cutting process | Reprocess onion | Change of heating process | Suggestion of different dish | Image 3, Audio 3 |
| Cooking process 4 | Stir-fry meat | Heating process | ... | ... | ... | ... |
| Cooking process 5 | Cut vegetables | Heating process | ... | ... | ... | ... |
| Cooking process 6 | Put water | Preparation process | ... | ... | ... | ... |
| Cooking process 7 | Put ingredient | Preparation process and heating process | ... | ... | ... | ... |
| Cooking process 8 | Boil | Heating process | ... | ... | ... | ... |
| Cooking process 9 | Skim off foam | Heating process | ... | ... | ... | ... |
| Cooking process 10 | Put curry roux | Heating process | ... | ... | ... | ... |
| Cooking process 11 | Arrange on plate | Arrangement process | ... | ... | ... | ... |

FIG. 27

| | Load range | Load resolution | Temporal resolution |
|---|---|---|---|
| First cut measurement mode | 0 to A1 | B1 | C1 |
| Second cut measurement mode | 0 to A2 (<A1) | B2 (<B1) | C2 (>C1) |
| Weight measurement mode | 0 to A3 (<A2) | B3 (<B2) | C3 (>C2) |

COOKING ASSISTANCE METHOD, COOKING ASSISTANCE DEVICE, AND RECORDING MEDIUM

CROSS REFERENCE TO RELATED APPLICATIONS

This is a continuation application of PCT International Application No. PCT/JP2021/004844 filed on Feb. 9, 2021, designating the United States of America, which is based on and claims priority of Japanese Patent Application No. 2020-022333 filed on Feb. 13, 2020. The entire disclosures of the above-identified applications, including the specifications, drawings and claims are incorporated herein by reference in their entirety.

FIELD

The present disclosure relates to a cooking assistance method, a cooking assistance device, and a recording medium.

BACKGROUND

A food processor including a weighing device has been developed (see Patent Literature [PTL] 1, for example). This processor includes a food processing container, a food weighing bowl, and a measuring sensor. The food processing container holds an ingredient to be processed. The measuring sensor measures a weight of the food weighing bowl in which the food is placed. While the weight of the ingredient is measured, the food weighing bowl is located above the food processing container. While the food is cooked, the food weighing bowl covers the food processing container. With this, the weight of the food to be cooked is easily measured. To be more specific, this food processor provides a user-friendly cooking assistance method.

CITATION LIST

Patent Literature

PTL 1: U.S. Pat. No. 5,814,935

SUMMARY

Technical Problem

Unfortunately, it is difficult for the aforementioned food processor disclosed in PTL 1 to appropriately provide cooking assistance.

In response to this, the present disclosure provides a cooking assistance method that appropriately provides cooking assistance.

Solution to Problem

In accordance with an aspect of the present disclosure, a cooking assistance method executed by a computer includes: causing an output device to display a first image relating to a first cooking process in which a cooking operation is performed using a cooking board; obtaining a load on the cooking board at a first temporal resolution while the first image is displayed; changing the first image displayed on the output device to a second image relating to a second cooking process in which a cooking operation different from the first cooking process is performed using the cooking board; changing the first temporal resolution used to obtain the load to a second temporal resolution different from the first temporal resolution, when the first image is changed to the second image; and obtaining a load on the cooking board at the second temporal resolution while the second image is displayed.

General or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

Advantageous Effects

The cooking assistance method according to the present disclosure appropriately provides cooking assistance.

Advantages and effects in an aspect according to the present disclosure are disclosed by the specification and the drawings. These advantages and/or effects are provided by characteristics described in some of Embodiments and in the specification and the drawings. However, to obtain one or more than one identical characteristic, all the advantages and/or effects are not necessarily to be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 illustrates an example of an image displayed by an output device according to Embodiment 1.

FIG. 13A illustrates an example of cooking data held in a memory according to Embodiment 1.

FIG. 13B illustrates an example of change-addition data held in the memory according to Embodiment 1.

FIG. 14 illustrates an example of change in temperature pattern according to Embodiment 1.

FIG. 15 conceptually illustrates cooking data for a dish "curry" in combination with change-addition data, according to Embodiment 1.

FIG. 27 illustrates a comparison of load range, load resolution, and temporal resolution among measurement modes according to Embodiment 3.

DESCRIPTION OF EMBODIMENTS

Figure 1:
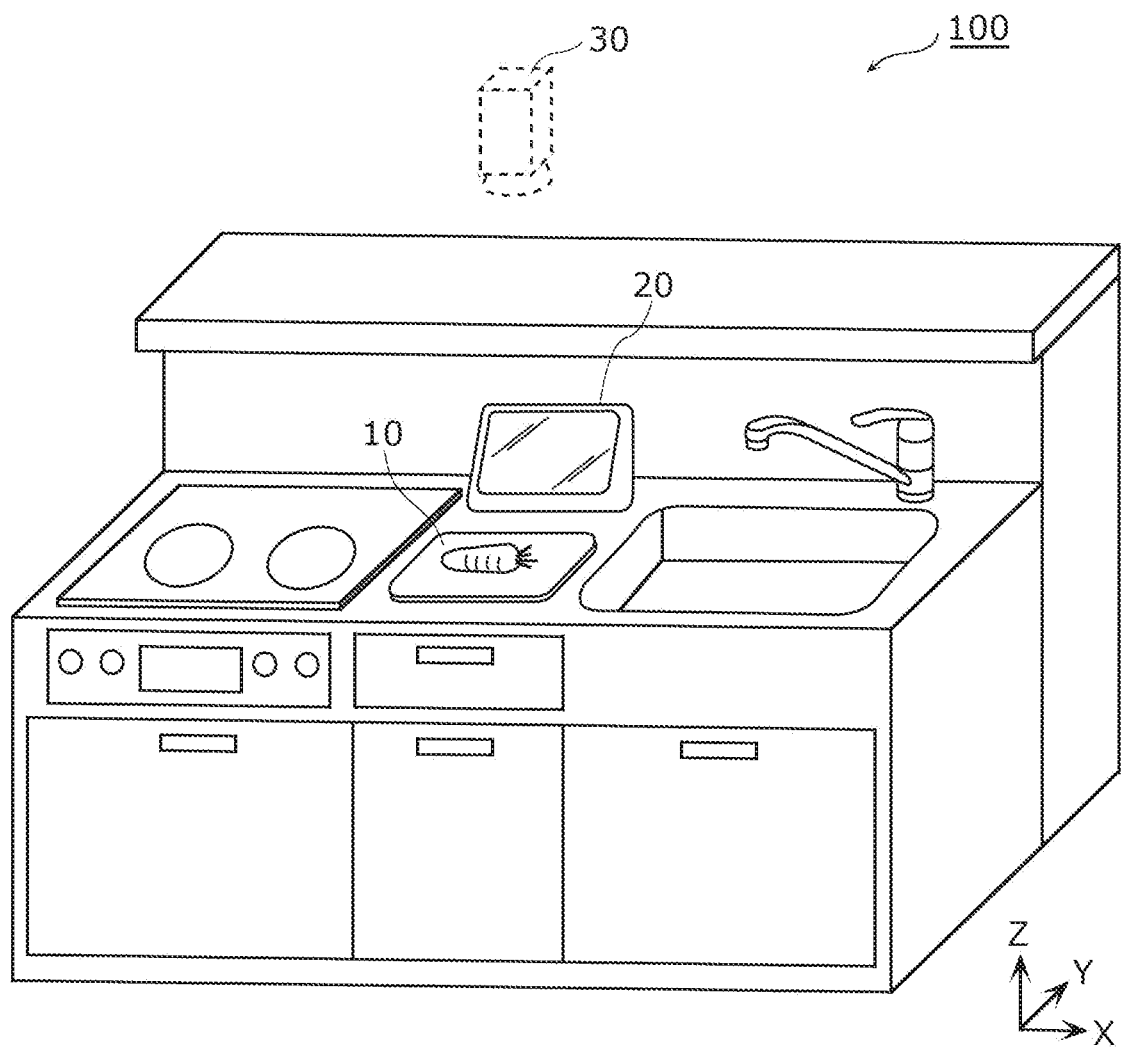
FIG. 1 illustrates an external view of a cooking assistance system according to Embodiment 1.

In accordance with an aspect of the present disclosure, a cooking assistance method executed by a computer includes: causing an output device to display a first image relating to a first cooking process in which a cooking operation is performed using a cooking board; obtaining a load on the cooking board at a first temporal resolution while the first image is displayed; changing the first image displayed on the output device to a second image relating to a second cooking process in which a cooking operation different from the first cooking process is performed using the cooking board; changing the first temporal resolution used to obtain the load to a second temporal resolution different from the first temporal resolution, when the first image is changed to the second image; and obtaining a load on the cooking board at the second temporal resolution while the second image is displayed. For example, it is possible that when the cooking operation to cut the ingredient on the cooking board is performed in the first cooking process and a cooking operation to measure a weight of a cooking substance on the cooking board is performed in the second cooking process, the first temporal resolution is shorter than the second temporal resolution.

With this, the user of the output device performs the cooking operation of the first cooking process according to the first image outputted by the output device. Then, the load on the cooking board in response to this cooking operation is derived. Thus, the result of the cooking operation of the first cooking process can be determined on the basis of the load. After the first image is changed to the second image, the user performs the cooking operation of the second cooking process according to the second image. Then, the load on cooking board 11 in response to this cooking operation is derived. Thus, the result of the cooking operation of the second cooking process can also be determined on the basis of the load. Moreover, the load is obtained at the first temporal resolution during the first cooking process, and the load is obtained at the second temporal resolution during the second cooking process. This allows the change in the load to be obtained in the first cooking process at a temporal resolution suited for the cooking operation of the first cooking process, and also appropriately determines a result of the cooking operation of the first cooking process. Similarly, this allows the change in the load to be obtained in the second cooking process at a temporal resolution suited for the cooking operation of the second cooking process, and also appropriately determines a result of the cooking operation of the second cooking process. Moreover, the temporal resolution used to obtain the load is changed when the image is changed. Thus, while helping the user to perform the operations in the cooking processes with high accuracy using the images before and after the change, the temporal resolution is appropriately changed during an interval between the cooking operations. Hence, the cooking assistance can be appropriately provided.

It is possible that the obtaining of the load while the first image is displayed is performed further using a first load range, the changing of the first image to the second image includes changing the first load range to a second load range different from the first load range, and the obtaining of the load while the second image is displayed is performed further using the second load range. For example, it is possible that when the cooking operation to cut the ingredient on the cooking board is performed in the first cooking process and a cooking operation to measure a weight of a cooking substance on the cooking board is performed in the second cooking process, the first load range is wider than the second load range.

With this, the load is obtained using the first load range during the first cooking process, and the load is obtained using the second load range during the second cooking process. This allows the load to be obtained in the first cooking process using a load range suited for the cooking operation of the first cooking process, and also appropriately determines a result of the cooking operation of the first cooking process. Similarly, this allows the load to be obtained in the second cooking process using a load range suited for the cooking operation of the second cooking process, and also appropriately determines a result of the cooking operation of the second cooking process.

It is possible that the obtaining of the load while the first image is displayed is performed further using a first load resolution, the changing of the first image to the second image includes changing the first load resolution to a second load resolution different from the first load resolution, and the obtaining of the load while the second image is displayed is performed further using the second load resolution. For example, it is possible that when the cooking operation to cut the ingredient on the cooking board is performed in the first cooking process and a cooking operation to measure a weight of a cooking substance on the cooking board is performed in the second cooking process, the first load resolution is greater than the second load resolution.

With this, the load is obtained at the first load resolution during the first cooking process and the load is obtained at the second load resolution during the second cooking process. This allows the change in the load to be obtained in the first cooking process using a load resolution suited for the cooking operation of the first cooking process, and also appropriately determines a result of the cooking operation of the first cooking process. Similarly, this allows the load to be obtained in the second cooking process using a load resolution suited for the cooking operation of the second cooking process, and also appropriately determines a result of the cooking operation of the second cooking process.

It is possible that the obtaining of the load while the first image is displayed includes averaging output values received from a sensor in response to the load during a first period, thereby obtaining the load expressed by a first load resolution, the changing of the first image to the second image includes changing the first period to a second period different from the first period, and the obtaining of the load while the second image is displayed includes averaging output values received from the sensor in response to the load during the second period, thereby obtaining the load expressed by a second load resolution different from the first load resolution.

With this, the load resolution can be changed by changing a first period to a second period as a period used for the moving average. For example, if the second period is longer than the first period, the stability of the load to be obtained can be enhanced. To be more specific, the load resolution can be enhanced. Here, one of the first period and the second period may be 1, and the moving average may not be performed during this period.

It is possible that the cooking assistance method further includes: when a cooking operation to cut a first ingredient on the cooking board is performed in the first cooking process and a cooking operation to cut a second ingredient different in at least one of hardness or size from the first ingredient on the cooking board is performed in the second cooking process, detecting cutting of the first ingredient while the first image is displayed, when a change in the load obtained satisfies a first condition, changing the first condition to a second condition different from the first condition when the first image is changed to the second image, and detecting cutting of the second ingredient while the second image is displayed, when a change in the load obtained satisfies the second condition. For example, it is possible that each of the first condition and the second condition is that, after a period during which a time derivative value of the load is a positive value exceeds a first threshold and the load exceeds a second threshold, the load decreases below the second threshold, and the first condition is different from the second condition in at least one of the first threshold or the second threshold.

With this, the cutting of the first ingredient is detected under the first condition during the first cooking process, and the cutting of the second ingredient is detected under the second condition during the second cooking process. This allows the cutting of the ingredient to be detected in the first cooking process under a condition suited for the ingredient used in the first cooking process, and also appropriately determines a result of the cooking operation of the first cooking process. Similarly, this allows the cutting of the ingredient to be detected in the second cooking process under a condition suited for the ingredient used in the second cooking process, and also appropriately determines a result of the cooking operation of the second cooking process.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Note that the respective figures are schematic diagrams and are not necessarily precise illustrations. Additionally, components that are essentially the same share like reference signs in the figures. It should also be noted that the following embodiments may include expressions using "substantially the same" and the like. For example, "substantially the same" means not only completely same but also substantially same. For example, substantially same includes a difference of about several % from completely same. The "substantially the same" means the same within a range producing the effects of the present disclosure. The other expressions using "substantially" have the same meaning.

Embodiment 1

FIG. 1 illustrates an external view of a cooking assistance system according to the present embodiment.

In the present disclosure, a Z-axis direction or an up-down direction refers to the vertical direction, and a Y-axis direction or a depth direction refers to one direction in a plane perpendicular to the vertical direction. Moreover, an X-axis direction, a right-and-left direction, or a horizontal direction refers to a direction perpendicular to the Y-axis direction in this plane. Furthermore, a positive side of the Z-axis direction refers to a vertically upward side or indicates "above", and a negative side of the Z-axis direction refers to a vertically downward side or indicates "below". Moreover, in the present disclosure, a positive side of the Y-axis direction refers to a rear side or indicates the rear, and a negative side of the Y-axis direction refers to a front side or indicates the front. Furthermore, a positive side of the X-axis direction refers to a right side or indicates the right, and a negative side of the X-axis direction refers to a left side or indicates the left. In the present embodiment, any numerical value representing a load or time for instance is merely an example and thus may be any different numerical value.

As illustrated in FIG. 1, cooking assistance system 100 according to the present embodiment includes cooking assistance device 10 and output device 20 that are provided in, for example, a system kitchen.

Cooking assistance device 10 is placed on a countertop of the system kitchen for example, and used as a cutting board. Note that cooking assistance device 10 may be embedded in the countertop or independent of the countertop.

Output device 20 is placed on the countertop of the system kitchen for example, and outputs at least one of an image or audio that relate to the cooking. For example, output device 20 is a display, such as a liquid crystal display, a plasma display, or an organic electro-luminescence (EL) display. Output device 20 may include a speaker. As with cooking assistance device 10, output device 20 may also be embedded in the countertop or independent of the countertop. For example, output device 20 may be included in an electronic device, such as a microwave oven or a refrigerator.

Moreover, cooking assistance system 100 may include second sensor 30 used as a camera, for example. Second sensor 30 images cooking assistance device 10 from above, and then outputs an image obtained through the imaging to cooking assistance device 10.

Figure 2A:
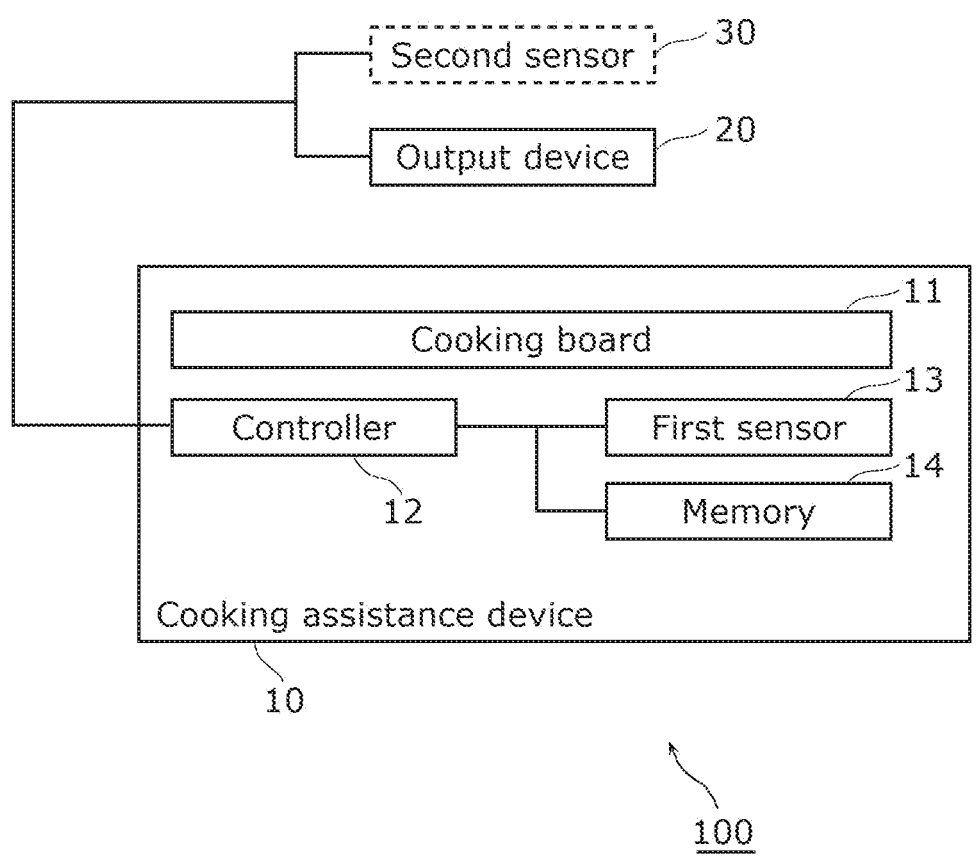
FIG. 2A is a block diagram illustrating a configuration of a cooking assistance system according to Embodiment 1.

FIG. 2A is a block diagram illustrating an example of a configuration of cooking assistance system 100 according to the present embodiment.

Cooking assistance device 10 includes cooking board 11, controller 12, first sensor 13, and memory 14. Note that cooking assistance system 100 may include second sensor 30 instead of first sensor 13.

At least one of an ingredient, a cooking substance, or a cooking utensil that is to be used in the cooking is placed on cooking board 11. Examples of the ingredient include a daikon radish, a carrot, an onion, and meat. Examples of the cooking substance include water, milk, soy sauce, sweetened sake (mirin), salt, and sugar. The cooking utensil may be a container, such as a pot, a cup, or a bowl, or may be any other utensil.

First sensor 13 is a pressure sensor, for example. First sensor 13 continuously outputs, to controller 12, a pressure signal indicating a numerical value, such as a voltage value varying according to a load on cooking board 11.

Memory 14 holds cooking data for each dish, for example. The cooking data indicates information for each of at least one cooking process to make the dish. To be more specific, the cooking data is a recipe for the dish. Moreover, the cooking data includes an image and audio outputted from output device 20, for each of the at least one cooking process. These image and audio are presentation information indicating a cooking operation of the cooking process. Memory 14 is a read-only memory (ROM), a random-access memory (RAM), or a semiconductor memory, for example. Note that memory 14 may be volatile or nonvolatile.

Controller 12 is a central processing unit (CPU) or a processor, and controls at least one of first sensor 13, memory 14, output device 20, or second sensor 30. Controller 12 according to the present embodiment reads the aforementioned cooking data held in memory 14. Then, controller 12 causes output device 20 to sequentially output the presentation information for each of the at least one cooking process indicated by the read cooking data. According to the presentation information outputted from output device 20, a user of cooking assistance system 100 performs an operation of the cooking process, that is, a cooking operation indicated by this presentation information.

Figure 2B:
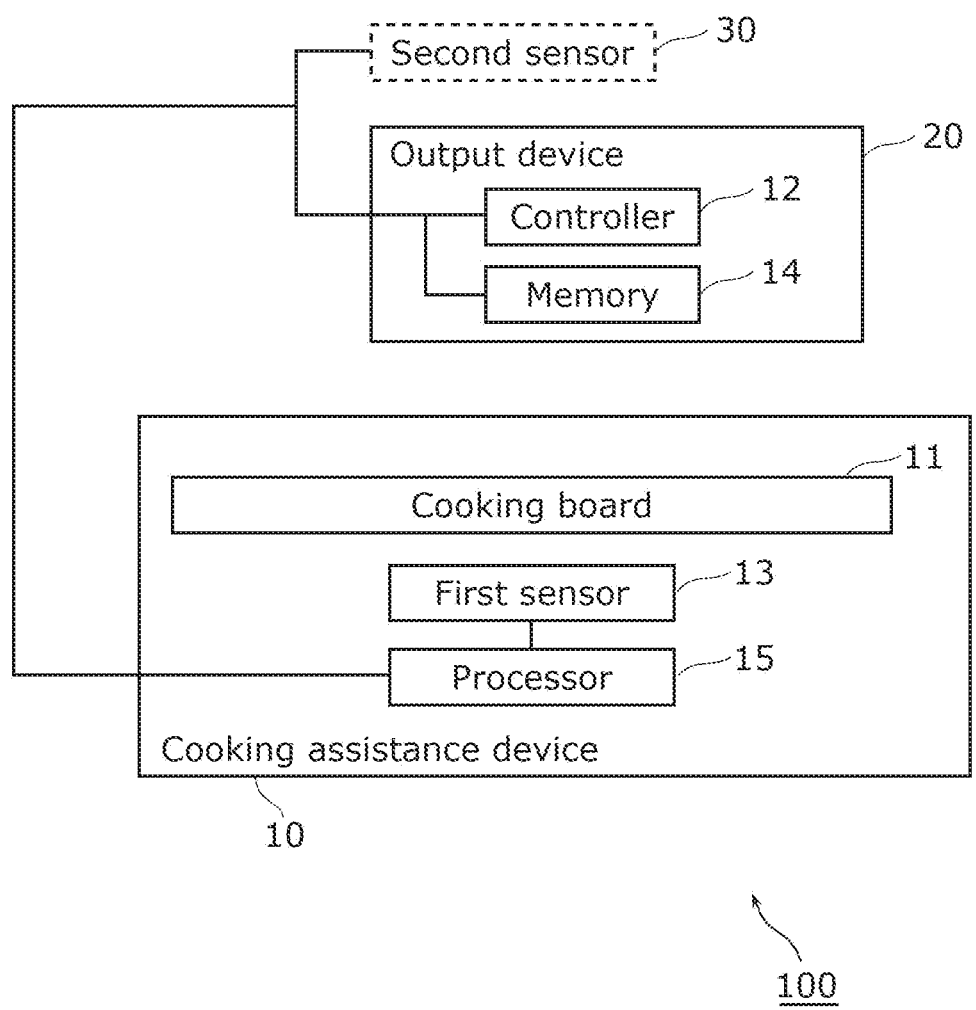
FIG. 2B is a block diagram illustrating another example of the configuration of the cooking assistance system according to Embodiment 1.

FIG. 2B is a block diagram illustrating another example of the configuration of cooking assistance system 100 according to the present embodiment.

In the example illustrated in FIG. 2A, cooking assistance device 10 includes controller 12 and memory 14. However, controller 12 and memory 14 may be included in output device 20 as illustrated in FIG. 2B. In this case, cooking assistance device 10 includes processor 15 that processes the pressure signal outputted from first sensor 13 and then outputs the processed signal to output device 20.

Figure 2C:
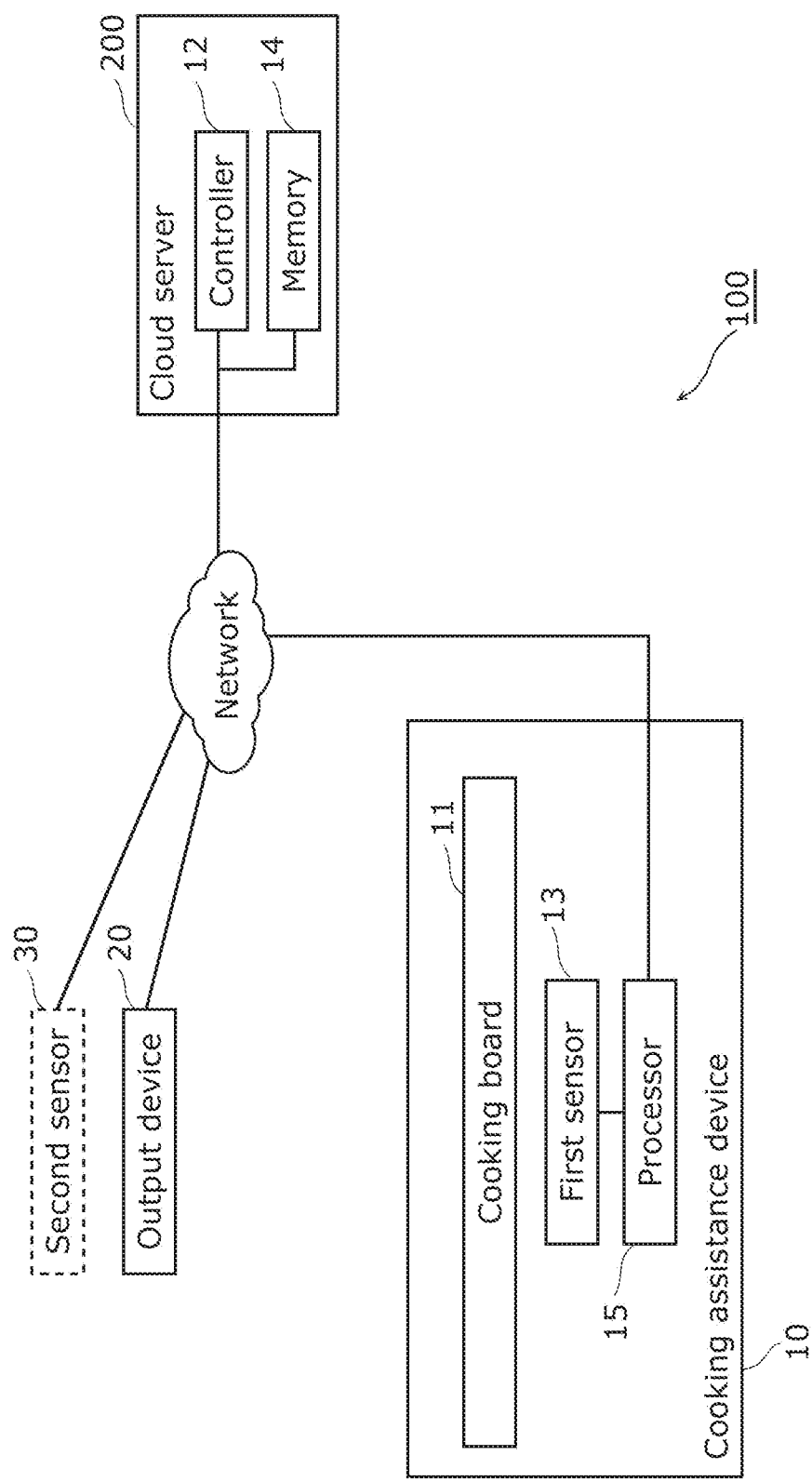
FIG. 2C is a block diagram illustrating yet another example of the configuration of the cooking assistance system according to Embodiment 1.

FIG. 2C is a block diagram illustrating yet another example of the configuration of cooking assistance system 100 according to the present embodiment.

As illustrated in FIG. 2C, cooking assistance system 100 may include cloud server 200 that is connected to cooking assistance device 10, output device 20, and second sensor 30 via a communication network, such as the Internet. In this case, although not illustrated in FIG. 2C, each of cooking assistance device 10, output device 20, and second sensor 30 includes a communication interface to communicate with cloud server 200. Moreover, in the example illustrated in FIG. 2C, controller 12 and memory 14 are included in cloud server 200 instead of in cooking assistance device 10.

As described above, controller 12 and memory 14 may be included in cooking assistance device 10, in output device 20, or in a different external device. The different external device may be cloud server 200. Controller 12 may include a plurality of CPUs or processors, and memory 14 may include a plurality of memories. In this case, each of the plurality of processors is included in a different device or in the aforementioned external device. The plurality of processors may achieve the function as controller 12 by communicating with each other. Similarly, each of the plurality of memories is included in a different device or in the aforementioned external device. Moreover, controller 12 may achieve the function according to the present embodiment by executing, for example, a computer program stored in memory 14. If memory 14 is included in a device other than cloud server 200, the aforementioned cooking data, change-addition data described later, and corresponding computer programs may be downloaded from, for example, cloud server 200 and then stored into memory 14.

Figure 3:
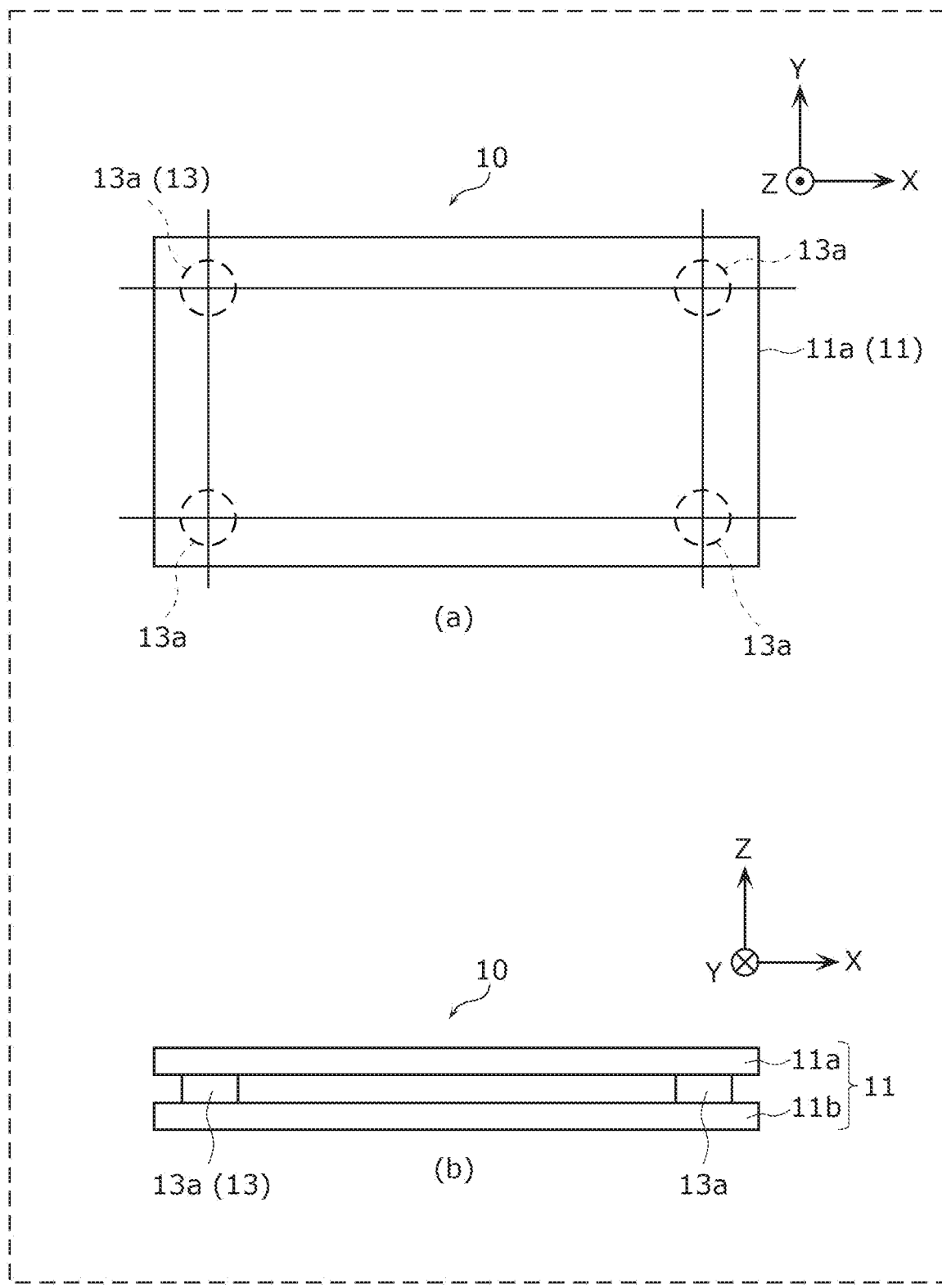
FIG. 3 is an external view of a cooking assistance device according to Embodiment 1.

FIG. 3 is an external view of cooking assistance device 10 according to the present embodiment. To be more specific, (a) of FIG. 3 is a top view of cooking assistance device 10 whereas (b) of FIG. 3 is a side elevation view of cooking assistance device 10.

For example, cooking board 11 of cooking assistance device 10 includes first board 11a and second board 11b that are opposite to each other in the Z-axis direction, as illustrated in (b) of FIG. 3. First board 11a and second board 11b are substantially rectangular and substantially the same in size.

For example, first sensor 13 includes four pressure sensors 13a that are disposed between first board 11a and second board 11b. Each of pressure sensors 13a is disposed in a different one of four corners of cooking board 11. For example, each of pressure sensors 13a detects a pressure received from cooking board 11 and then outputs a signal corresponding to the detected pressure as a pressure signal to controller 12.

Note that controller 12 and memory 14 may be disposed in a space between first board 11a and second board 11b or in a different location.

Cooking assistance device 10 described above is placed on the countertop so that second board 11 is in contact with the countertop. For example, an ingredient is placed on a top surface of first board 11a, that is, a surface of first board 11a on a positive side of the Z-axis direction. Then, the ingredient is cut with a knife, for instance. Moreover, a container, such as a pot, a cup, or a bowl, is placed on the top surface of first board 11a, for example. Then, cooking substances, such as water and a seasoning, are put into the container to make soup stock, for instance.

Thus, a cooking operation is performed on the top surface of first board 11a, that is, on cooking board 11. In this case, each of four pressure sensors 13a of first sensor 13 detects a pressure received from cooking board 11. Then, each of four pressure sensors 13a outputs, to controller 12, a pressure signal indicating a result of the detection, that is, a result of sensing.

Controller 12 receives the pressure signal from each of four pressure sensors 13a. More specifically, controller 12 obtains pressures on cooking board 11 from four pressure sensors 13a. On the basis of the obtained pressures, controller 12 derives a load on cooking board 11. For example, controller 12 sums voltage values indicated by the pressure signals received from four pressure sensors 13a, and multiplies the sum of the voltage values by a proportionality coefficient. Then, to calculate the load, controller 12 adds a constant to the result of the multiplication. On the basis of this load, a weight or hardness of the ingredient placed on the top surface of first board 11a or a weight of the cooking substance in the container placed on the top surface is obtained. Moreover, on the basis of a change in the load, cutting of the ingredient is detected. On the basis of a change in the center of gravity of the load, the thickness of the cut ingredient is derived. Furthermore, on the basis of a change in the load, a thermal conductivity of the cut ingredient may be derived. To be more specific, controller 12 obtains at least one of the number of cuts made to a first ingredient or a state of the first ingredient after the cutting.

Note that, in the present disclosure, "cut ingredient", "ingredient to be cut", and "ingredient after the cutting" each refer to a part of one piece of the ingredient separated, by being cut, from the other piece of the ingredient. Note also that the thickness of the cut ingredient refers to a thickness in the direction perpendicular to the Z-axis direction. If the ingredient is cut along a YZ plane, this thickness refers to a thickness in the X-axis direction.

Controller 12 according to the present embodiment changes a description of a subsequent cooking process on the basis of the weight, hardness, or thickness that is derived as described above as a result of the cooking operation. More specifically, controller 12 according to the present embodiment causes output device 20 to output information of a first cooking process in which the first ingredient is cut. Then, during the first cooking process, controller 12 obtains at least one of: a pressure on cooking board 11 while the first ingredient is cut on cooking board 11; the number of cuts made to the first ingredient; or a state of the first ingredient after the cutting. For example, the state of the first ingredient after the cutting may indicate the aforementioned weight, hardness, or thickness. Using information based on the at least one of the pressure, the number of cuts, or the state of the first ingredient after the cutting, controller 12 changes a description of a second cooking process performed subsequently to the first cooking process. Then, controller 12 causes output device 20 to output information of the changed second cooking process. For example, each of the information of the first cooking process and the information of the second cooking process is the aforementioned presentation information. In this way, the description of the second cooking process, which is a subsequent cooking process, is changed, and the information of the changed second cooking process is outputted. Thus, cooking assistance is appropriately provided as described below.

[Detection of Cutting of Ingredient]

Figure 4:
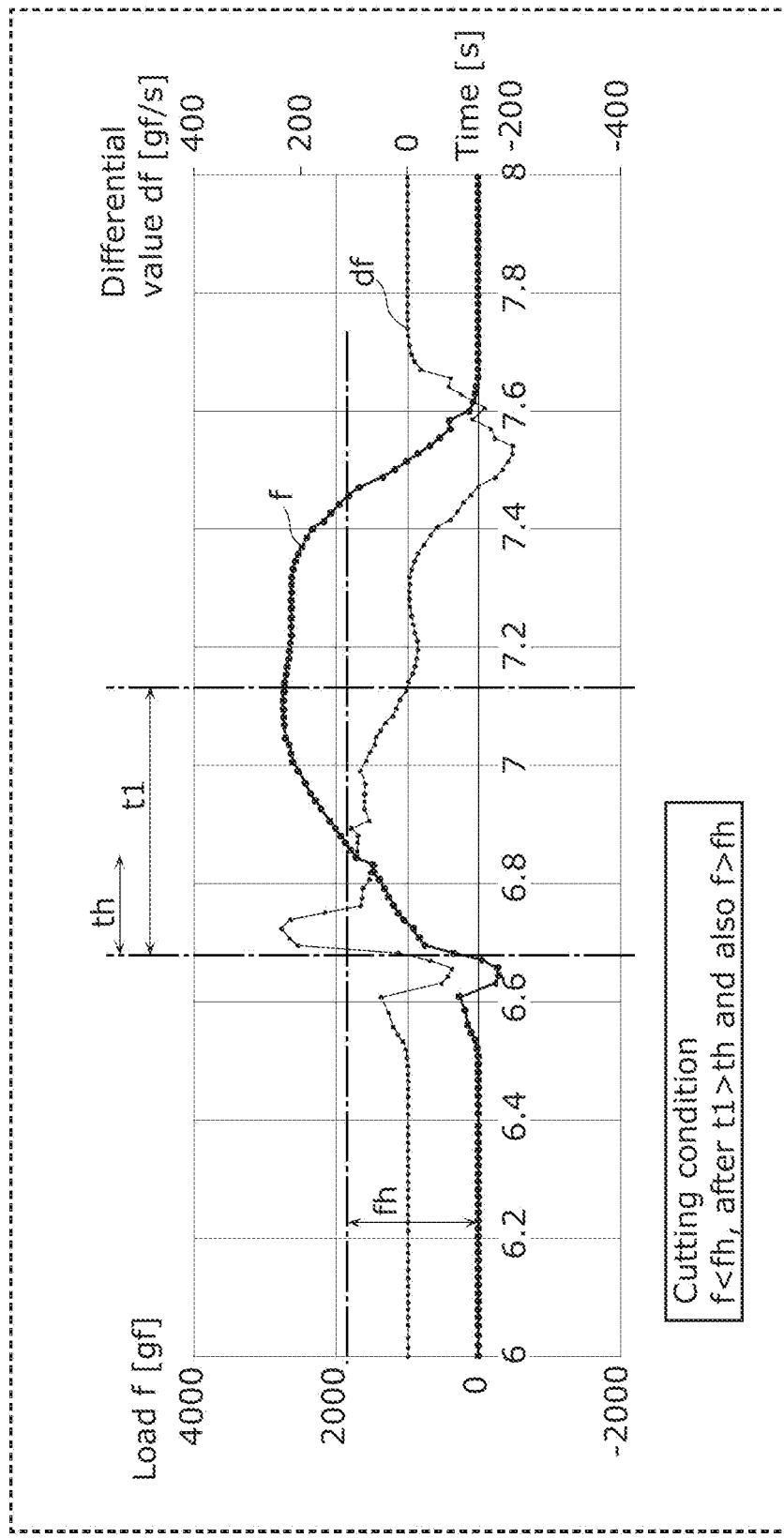
FIG. 4 illustrates change in load and change in differential value of the load when an ingredient is cut.

FIG. 4 illustrates an example of change in load and change in differential value of the load when an ingredient is cut. In a graph of FIG. 4, the horizontal axis represents time [s] whereas the vertical axis represents load f [gf] and differential value df [gf/s] of load f.

As illustrated in FIG. 4, when an ingredient placed on cooking board 11 is cut, load f on cooking board 11 changes over time. Differential value df obtained by differentiating load f with respect to time also changes over time. Note that, in the graph of FIG. 4, load f is 0 gf when an ingredient is placed on cooking board 11 but not in contact with the knife.

Controller 12 detects the cutting of the ingredient on the basis of the change in load. To be more specific, controller 12 determines a time during which differential value df greater than 0 continues, that is, time t1 during which a force is continuously applied to cooking board 11. Then, controller 12 determines whether time t1 is longer than threshold th. Moreover, controller 12 determines whether load f exceeds threshold fh within time t1. Then, controller 12 determines whether load f exceeding threshold fh decreases below threshold fh after a lapse of time t1.

If time t1 is longer than threshold th and load f exceeds threshold fh within time t1 and decreases below threshold fh after the lapse of time t1, controller 12 detects the cutting of the ingredient placed on cooking board 11. More specifically, controller 12 detects the cutting of the ingredient if the change in load f satisfies a cutting condition. This cutting condition is that f<fh is satisfied after t1>th and f>fh are satisfied.

If cooking assistance system 100 includes second sensor 30, controller 12 may detect the cutting of the ingredient on the basis of an image captured by second sensor 30. Moreover, controller 12 may obtain the number of cuts made to the first ingredient on the basis of the result of the detection, and also obtain the state of the first ingredient after the cutting. The obtained state of the first ingredient after the cutting may be a thickness of the first ingredient after the cutting, for example.

[Derivation of Hardness of Ingredient]

Figure 5:
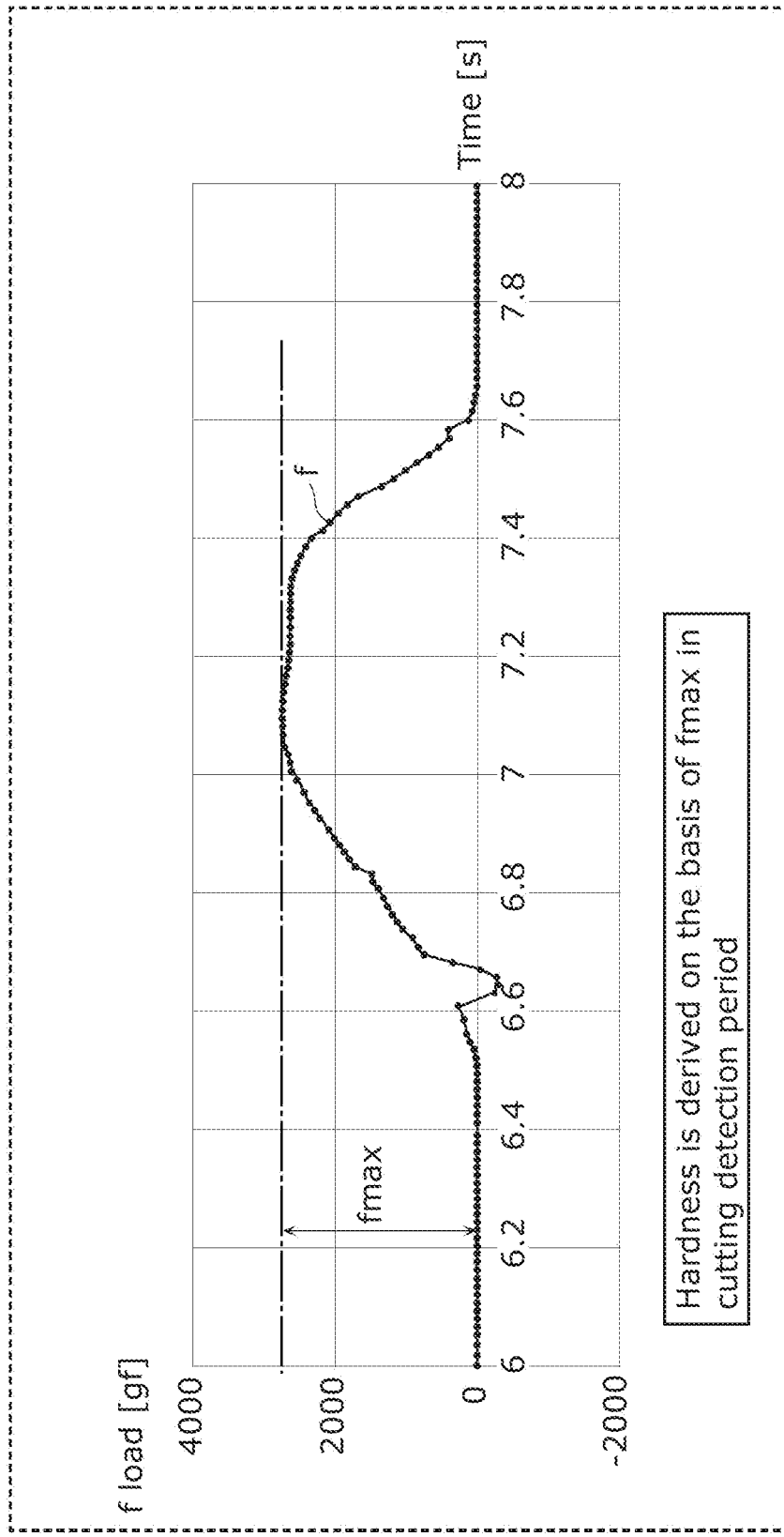
FIG. 5 illustrates load change and a maximum load when an ingredient is cut.

FIG. 5 illustrates load change and a maximum load when an ingredient is cut. In a graph of FIG. 5, the horizontal axis represents time [s] whereas the vertical axis represents load f [gf].

As illustrated in FIG. 5, when an ingredient placed on cooking board 11 is cut, load f on cooking board 11 changes over time.

When detecting the cutting of the ingredient as illustrated in FIG. 4, controller 12 determines maximum load fmax that is a maximum value of load f during a cutting detection period. The cutting detection period includes time t1 described above. The cutting detection period may start from a beginning of time t1 and end when load f reaches 0.

Controller 12 derives the hardness of the ingredient on the basis of maximum load fmax and a kind of the ingredient.

Figure 6:
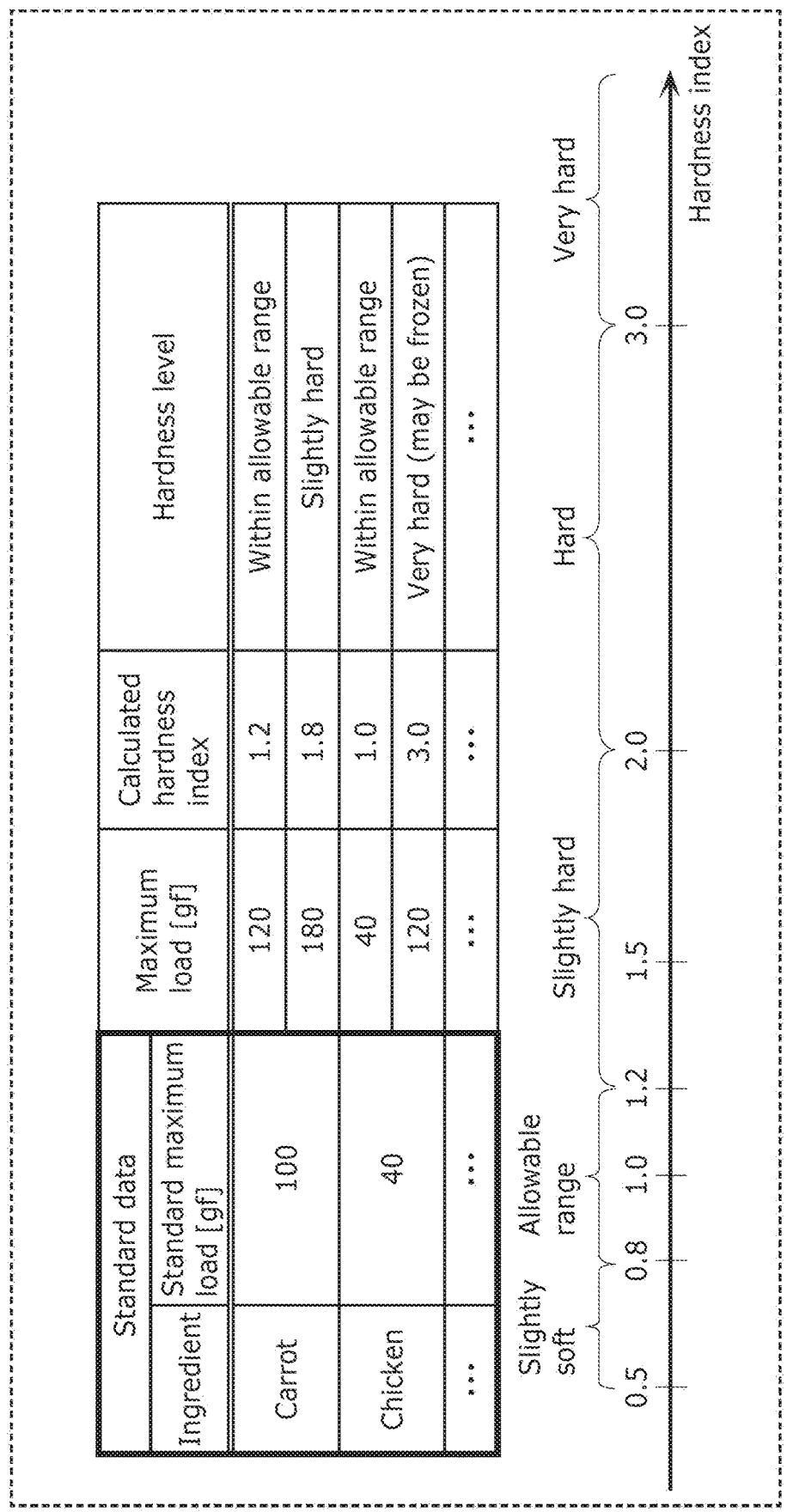
FIG. 6 illustrates an example of how to derive hardness of an ingredient according to Embodiment 1.

FIG. 6 illustrates an example of how to derive hardness of the ingredient.

For example, memory 14 stores standard data illustrated in FIG. 6. The standard data indicates a standard maximum load for each of a plurality of kinds of ingredients.

Controller 12 reads the standard maximum load corresponding to the kind of the ingredient placed on cooking board 11, from the standard data stored in memory 14. Then, controller 12 calculates a hardness index of the ingredient placed on cooking board 11, on the basis of the maximum load fmax determined as illustrated in FIG. 5 and the read standard maximum load. The hardness index is represented by a greater value when the ingredient is harder, and by a smaller value when the ingredient is softer.

As a specific example, if the ingredient is "carrot" that is to be cut according to a cooking process indicated by the cooking data, controller 12 reads the standard maximum load "100 gf" corresponding to this ingredient "carrot" from the standard data. Then, by dividing the determined maximum load fmax "120 gf" by the standard maximum load "100 gf", controller 12 calculates the hardness index "1.2" of the ingredient "carrot". In this case, controller 12 determines that the hardness of the ingredient "carrot" is within an allowable range. Note that controller 12 may use the hardness index as the hardness of the ingredient or use a hardness level that is classified according to the hardness index.

In this way, controller 12 according to the present embodiment estimates a first hardness of the first ingredient after the cutting, on the basis of the pressure. More specifically, the first hardness is derived. Then, controller 12 changes the description of the second cooking process, on the basis of the first hardness of the first ingredient as information based on the pressure.

In the example described above, the ingredient is cut. However, the hardness of the ingredient may be similarly derived when an action of applying a pressure to the ingredient is performed without cutting the ingredient. More specifically, the application of the pressure to cooking board 11 by this action allows the hardness to be derived, as in the case where the ingredient is cut. Examples of the action of applying the pressure to the ingredient without cutting the ingredient include: an action of pounding an ingredient to, for example, tenderize the ingredient, such as meat; an action of rolling out dough; an action of mixing dough; and an action of kneading dough. Controller 12 is also capable of detecting the action of applying a pressure to an ingredient on the basis of a pressure on cooking board 11, as in the case of detecting the cutting of the ingredient. For example, if the ingredient on cooking board 11 is pounded, the pressure on the ingredient is also applied to cooking board 11. This allows controller 12 to detect the action of pounding the ingredient, on the basis of the pressure on cooking board 11. If dough is rolled out, the dough is in contact with cooking board 11 and thus a pressure is applied to cooking board 11. This allows controller 12 to detect the action of rolling out the dough, on the basis of the pressure on cooking board 11. If the action of mixing or kneading dough is performed using cooking board 11, a pressure on the ingredient is also applied to cooking board 11. This allows controller 12 to detect this action, on the basis of the pressure on cooking board 11.

As described, controller 12 according to the present embodiment causes output device 20 to output the information of the first cooking process in which the first ingredient is cut or applied with a pressure. Then, when the first ingredient is cut on cooking board 11 or applied with the pressure on cooking board 11 in the first cooking process, controller 11 obtains at least one of: a pressure on cooking board 11; the number of cuts made to the first ingredient; or the state of the first ingredient after the cutting. Controller 12 changes the description of the second cooking process performed subsequently to the first cooking process, on the basis of the information based on the at least one of the pressure, the number of cuts, or the state of the first ingredient after the cutting. Then, controller 12 causes output device 20 to output the changed information of the second cooking process.

[Derivation of Thickness in Direction Perpendicular to Z-Axis Direction]

Figure 7:
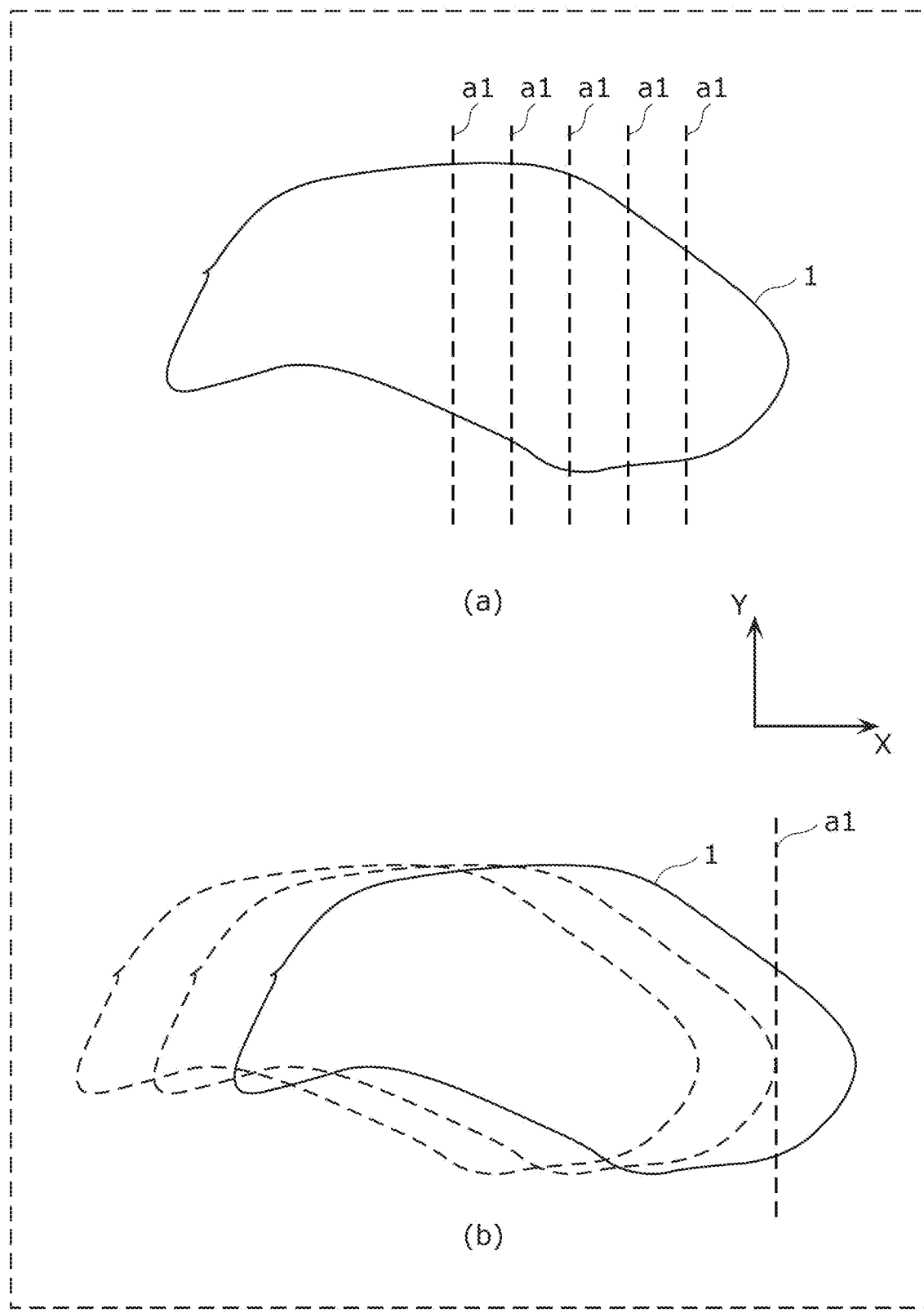
FIG. 7 illustrates an example of how to derive thickness of an ingredient according to Embodiment 1.

FIG. 7 illustrates an example of how to derive the thickness of an ingredient. Note that, in FIG. 7, ingredient 1 placed on cooking board 11 is viewed from the positive side of the Z-axis direction.

For example, the user holds down ingredient 1 placed on cooking board 11 and then cuts ingredient 1 a plurality of times while moving the knife held in a hand of the user in the X-axis direction, as illustrated in (a) of FIG. 7. A plurality of cutting lines a1 as a result of the cutting are each along the Y-axis direction, and are arranged in the X-axis direction. A distance between cutting lines a1 that are adjacent to each other corresponds to a thickness of cut ingredient 1 in the X-axis direction.

At this time, whenever ingredient 1 is cut, controller 12 determines the center of gravity of the load on cooking board 11 on the basis of the pressure signals from four pressure sensors 13a. The center of gravity is different depending on a position of the cutting on ingredient 1, or more specifically, a position of cutting line a1. Thus, controller 12 derives the thickness of cut ingredient 1 from an amount of shift in the center of gravity of the load.

Alternatively, the user cuts ingredient 1 a plurality of times while moving ingredient 1 placed on cooking board 11 in the X-axis direction without moving the knife held in the hand of the user in the X-axis direction, as illustrated in (b) of FIG. 7. In this case, a moving distance of ingredient 1 in the X-axis direction that is moved to be cut corresponds to a thickness of cut ingredient 1 in the X-axis direction.

At this time, whenever ingredient 1 is moved, controller 12 determines the center of gravity of the load on cooking board 11 on the basis of the pressure signals from four pressure sensors 13a. Thus, controller 12 derives the thickness of cut ingredient 1 from an amount of shift in the center of gravity of the load.

Figure 8:
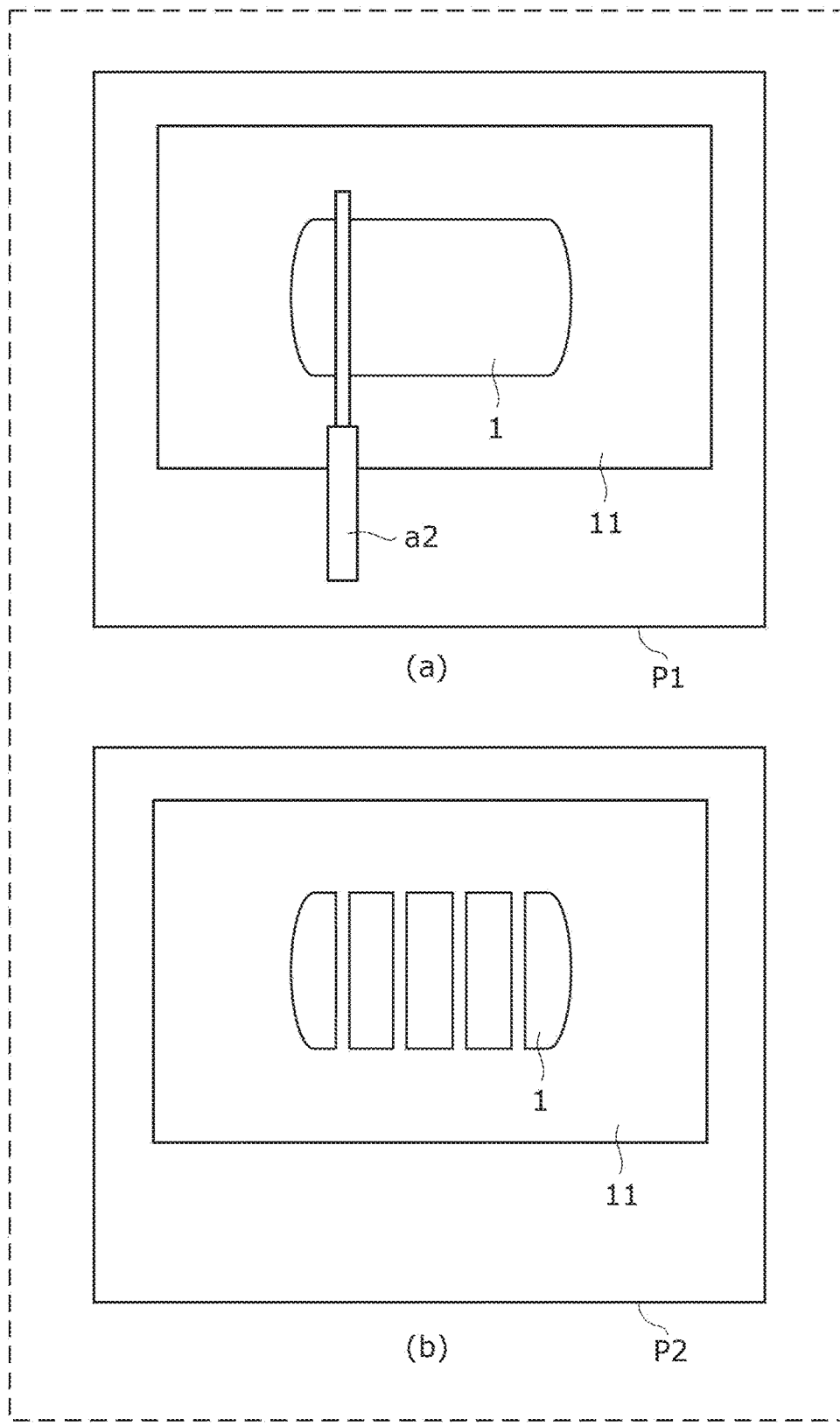
FIG. 8 illustrates an example of an image obtained by a second sensor according to Embodiment 1.

FIG. 8 illustrates an example of an image obtained by second sensor 30.

If cooking assistance system 100 includes second sensor 30, controller 12 may derive the thickness of the ingredient on the basis of an image captured by second sensor 30.

For example, controller 12 obtains image P1 illustrated in (a) of FIG. 8 from second sensor 30. By image processing performed on image P1, controller 12 detects that ingredient 1 and knife a2 on cooking board 11 are shown in image P1. To be more specific, controller 12 performs edge detection, as the image processing, on image P1. Then, controller 12 determines whether at least one outline represented by the detected edges includes an outline of knife a2, by pattern matching, for example. If determining that the outline of knife a2 is included, controller 12 detects that knife a2 is shown in image P1. Moreover, if an outline of a different object is present near the outline of knife a2, controller 12 detects that this object is shown as ingredient 1 in image P1. In this way, controller 12 detects the cutting of ingredient 1 from image P1.

Next, controller 12 obtains image P2 illustrated in (b) of FIG. 8 from second sensor 30. By image processing performed on image P2, controller 12 detects a thickness of cut ingredient 1 in the X-axis direction shown in image P2. To be more specific, controller 12 performs edge detection, as the image processing, on image P2. As a result, an outline of cut ingredient 1 is represented by the detected edges. Then, controller 12 derives a width of this outline of cut ingredient 1, as the thickness of cut ingredient 1 in the X-axis direction.

In the above example, controller 12 performs the edge detection as the image processing. However, controller 12 may use different image processing to detect the cutting of ingredient 1 and derive the thickness of cut ingredient 1. Alternatively, controller 12 may use machine learning, such as deep learning, to detect the cutting and derive the thickness.

Moreover, if the cutting of an ingredient is performed according to a cooking process indicated by cooking data, controller 12 reads a standard length of this ingredient from memory 14. Then, controller 12 may derive the thickness of the cut ingredient by dividing the standard length by the number of cuts made to the ingredient.

Note that controller 12 may estimate the length of an ingredient. For example, if the ingredient is cut according to a cooking process indicated by cooking data, controller 12 reads a standard length and a standard weight of this ingredient from memory 14. Next, controller 12 calculates a ratio of the weight of the ingredient based on a pressure signal from first sensor 13, to the standard weight. Controller 12 estimates the length of the ingredient by multiplying the standard length by this ratio. Then, controller 12 may estimate the thickness of the cut ingredient by dividing the estimated length of the ingredient by the number of cuts made to the ingredient.

In this case, controller 12 according to the present embodiment estimates a first thickness of the first ingredient after the cutting on the basis of the number of cuts. More specifically, the first thickness is derived. Then, controller 12 changes the description of the second cooking process, using the first thickness of the first ingredient as the information based on the number of cuts. Even if the thickness of the first ingredient after the cutting is not the estimated thickness in the cooking process of cutting the first ingredient, an influence caused by this result on the dish can be reduced in the second cooking process that is subsequently performed.

[Derivation of Thermal Conductivity]

Figure 9:
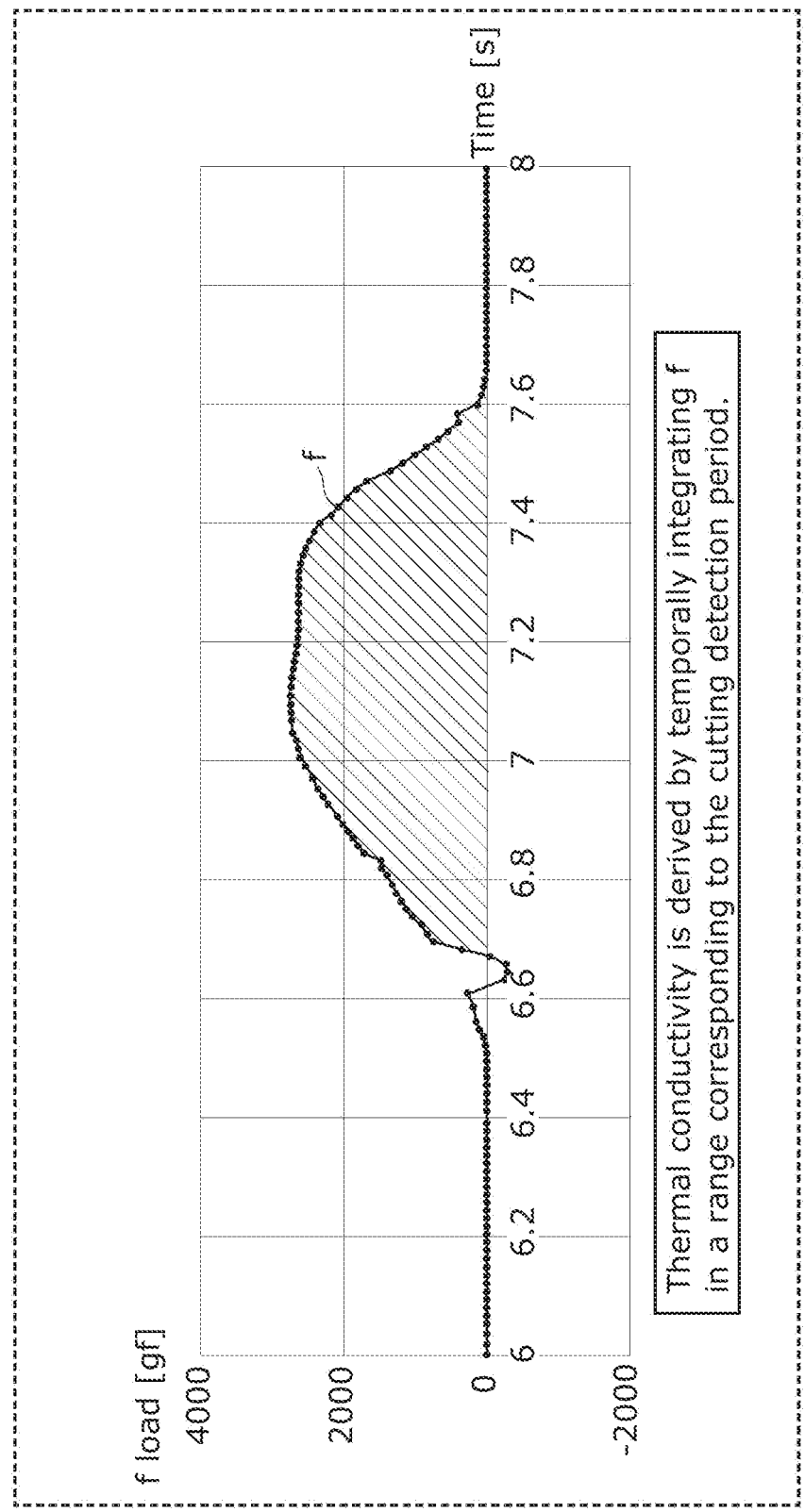
FIG. 9 illustrates load change while an ingredient is cut, and a thermal conductivity.

FIG. 9 illustrates load change while an ingredient is cut, and a thermal conductivity. In a graph of FIG. 9, the horizontal axis represents time [s] whereas the vertical axis represents load f [gf].

As illustrated in FIG. 9, when an ingredient placed on cooking board 11 is cut, load f on cooking board 11 changes over time.

When detecting the cutting of the ingredient as illustrated in FIG. 4, controller 12 calculates, as the thermal conductivity of the cut ingredient, an integral value by temporally integrating load f during the cutting detection period. This integral value corresponds to an area of a hatched part in FIG. 9. Moreover, this integral value also corresponds to a product of the hardness of the ingredient and the thickness of the ingredient in the Z-axis direction.

Note that controller 12 may calculate the thermal conductivity on the basis of standard data, as in the case of calculating the hardness described above. For example, memory 14 stores standard data relating to the thermal conductivity. More specifically, the standard data indicates, for each of a plurality of kinds of ingredients, a standard value corresponding to an integral value obtained by temporally integrating load f during the cutting detection period of this kind of ingredient.

Controller 12 reads, from the standard data stored in memory 14, a standard value corresponding to the kind of the ingredient placed on cooking board 11, that is, the standard value corresponding to the integral value obtained by temporally integrating load f during the cutting detection period. Then, controller 12 calculates an index to the thermal conductivity of the ingredient placed on cooking board 11, on the basis of the integral value obtained by temporally integrating load f during the cutting detection period and the corresponding standard value. The index to the thermal conductivity is represented by a greater value when the ingredient has a higher thermal conductivity, and by a smaller value when the ingredient has a lower thermal conductivity.

[Image Displayed by Output Device 20]

FIG. 10 illustrates an example of an image displayed by output device 20 according to the present embodiment.

For a dish "braised pork belly and daikon radish (buta-bara daikon)", the cooking data includes cooking process k of cutting daikon radish and cooking process (k+1) of making soup stock, for example.

Controller 12 reads the cooking data for this dish from memory 14, and causes output device 20 to display an image relating to cooking process k included in the cooking data as illustrated in (a) of FIG. 10. The image relating to cooking process k includes a message "Cut daikon radish in half" that helps the user to perform a cooking operation, for example. The user watching this image performs the cooking operation to cut the daikon radish placed on cooking board 11 in half with the knife according to this message.

At this time, controller 12 detects the cutting of daikon radish. As a result, controller 12 causes output device 20 to display a different image relating to cooking process k as illustrated in (b) of FIG. 10. The different image relating to cooking process k includes a message "Cut each half in half again" that helps the user to perform a cooking operation. The different image relating to cooking process k may show progress of cooking process k. For example, cooking process k includes a first sub-process of cutting daikon radish in half and a second sub-process of cutting each half daikon radish in half again. In this case, the aforementioned detection of the cutting of daikon radish allows controller 12 to determine that the first sub-process is completed out of the first sub-process and the second sub-process. Then, controller 12 causes output device 20 to display a progress bar or a progress meter indicating that the first sub-process included in cooking process k is completed.

Next, the user watching the different image relating to cooking process k performs the cooking operation to cut the half daikon radish placed on cooking board 11 in half again with the knife according to the message. At this time, the detection of the cutting of the half daikon radish allows controller 12 to determine that the second sub-process, that is, cooking process k, is completed.

As a result, controller 12 causes output device 20 to display an image relating to a cooking process subsequent to cooking process k, that is, cooking process (k+1) of making soup stock, according to the aforementioned cooking data. The image relating to cooking process (k+1) includes a message "Put 200 g of water into pot" that helps the user to perform a cooking operation, for example. The user watching this image places a pot on cooking board 11 and then put water, which is a cooking substance, into the pot.

At this time, controller 12 derives a weight of this water. As a result, controller 12 causes output device 20 to display a progress ring or a progress meter indicating the weight of water actually poured, out of 200 g of water.

Here, on the basis of the result of the cooking operation performed in cooking process k, controller 12 according to the present embodiment changes the description of cooking process (k+1) performed subsequently to cooking process k, for example. Examples of the result of the cooking operation performed in cooking process k include the number of cuts made to the daikon radish and the weight, hardness, and thickness of the cut daikon radish.

Note that the image displayed by output device 20 according to the present embodiment may be based on a description of JavaScript (registered trademark) on an HTML page. Alternatively, this image may be based on an image file specified on an HTML page, or may be any other image.

In the example illustrated in FIG. 10, controller 12 causes output device 20 to display the image including the message "Cut daikon radish in half" for example. Here, note that controller 12 may also cause output device 20 to display information derived or calculated as a result of the cooking operation. For example, controller 12 causes the image including the message "Cut daikon radish in half", as illustrated in (a) of FIG. 10. Then, the user watching this image performs the cooking operation to cut the daikon radish placed on cooking board 11 in half with the knife according to this message. At this time, controller 12 may cause output device 20 to display the weight, hardness, or thickness of the cut daikon radish that is derived as a result of the cooking operation before the image illustrated in (b) of FIG. 10 is displayed. For example, controller 12 may cause the hardness index illustrated in FIG. 6 to be displayed at the bottom of a screen of output device 20, as the hardness of the cut daikon radish. As a specific example of the hardness index, controller 12 may display a message "Hardness of daikon radish is 1.2". Instead of the hardness index, controller 12 may cause output device 20 to display a hardness level illustrated in FIG. 6. Alternatively, controller 12 may cause output device 20 to display the hardness index and the hardness level.

[Processing Flow]

Figure 11:
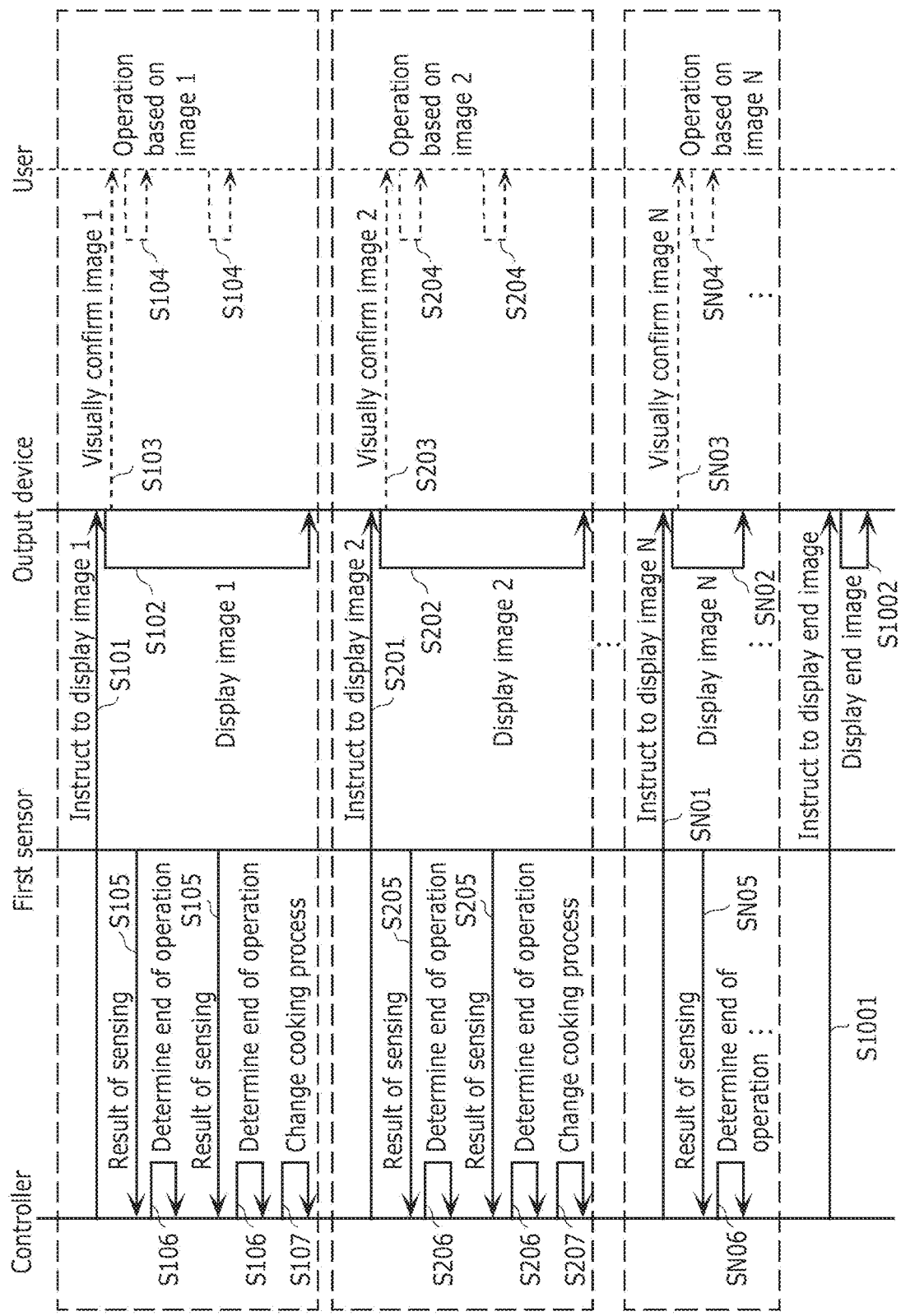
FIG. 11 is a sequence diagram illustrating a processing operation performed by the cooking assistance system according to Embodiment 1.

FIG. 11 is a sequence diagram illustrating a processing operation performed by cooking assistance system 100.

Cooking assistance system 100 sequentially assists cooking processes 1 to N (where N is an integer greater than or equal to 2) indicated by cooking data.

More specifically, cooking assistance system 100 first assists cooking process 1 by performing Steps S101, S102, and S105 to S107.

(Step S101)

For example, controller 12 instructs output device 20 to display image 1 relating to cooking process 1 of the cooking data stored in memory 14. At this time, if audio relates to cooking process 1, controller 12 also instructs output device 20 to output this audio.

(Step S102)

Following the instruction from controller 12, output device 20 displays image 1. Moreover, if instructed to output the audio, output device 20 also outputs the audio.

(Step S103)

The user visually confirms image 1 displayed on output device 20. Moreover, if the audio is also outputted from output device 20, the user listens to this audio.

(Step S104)

As a result of visually confirming image 1, the user performs a cooking operation indicated by image 1 at least once.

(Step S105)

Whenever the cooking operation is performed in Step S104, first sensor 13 outputs a pressure signal indicating a result of sensing the cooking operation to controller 12.

(Step S106)

On the basis of the result of sensing the cooking operation indicated by the pressure signal, controller 12 determines whether the cooking operation included in cooking process 1 is fully completed.

For example, the cooking data indicates that the ingredient is to be cut M times (where M is an integer that is at least 1), as the cooking operation performed in cooking process 1. In this case, controller 12 counts the number of times the ingredient is cut on the basis of the pressure signals from first sensor 13. Then, controller 12 determines whether the cooking operation is fully completed by determining whether the number of times reaches M times. Alternatively, the cooking data indicates that the ingredient is to be cut at Q-cm intervals (where Q is greater than 0), as the cooking operation performed in cooking process 1. In this case, controller 12 derives the thickness of each cut ingredient, on the basis of the pressure signal from first sensor 13 and the image from second sensor 30. Then, controller 12 may determine whether the cooking operation is fully completed by determining whether the thickness of each cut ingredient is Q cm. Alternatively, the cooking data indicates an operation time taken for the cooking operation performed in cooking process 1. For example, this operation time refers to a simmering time. In this case, controller 12 measures time elapsed from the start of the displaying of image 1 relating to cooking process 1. Then, controller 12 may determine whether the cooking operation is fully completed by determining whether the elapsed time reaches the operation time. Alternatively, the cooking data indicates that an onion is to be minced, as the cooking operation performed in cooking process 1. In this case, when a maximum value of a pressure signal corresponding to onion chopping drops below a threshold, controller 12 may determine that the cooking operation is fully completed.

Alternatively, when a period during which a numerical value indicated by a pressure signal from first sensor 13 stabilizes, that is, a period during which this numerical value is within a predetermined range reaches or exceeds a predetermined period of time, controller 12 may determine that the cooking operation is fully completed.

Alternatively, controller 12 may determine whether the cooking operation is fully completed, from a gesture of the user. For example, this gesture may be to tap the knife twice in a row on cooking board 11. In this case, first sensor 13 outputs, to controller 12, a pressure signal obtained as a result of the gesture of tapping the knife twice in a row on cooking board 11. Receiving this pressure signal, controller 12 determines that the cooking operation is fully completed.

Alternatively, cooking assistance system 100 may include an operator that physically receives an operation performed by the user. In this case, when an operation is performed on the operator, controller 12 may determine that the cooking operation is fully completed.

(Step S107)

Next, after determining in Step S106 that the cooking operation included in cooking process 1 is fully completed, controller 12 changes a description of a cooking process subsequent to cooking process 1 on the basis of a result of this cooking operation. For example, a description of cooking process 2 immediately subsequent to cooking process 1 is changed. For example, if the result of the cooking operation in cooking process 1 indicates that the daikon radish is hard, controller 12 changes the description of cooking process 2 so that the daikon radish is softened.

Next, cooking assistance system 100 assists cooking process 2 by performing Steps S201, S202, and S205 to S207 similarly to the case of assisting cooking process 1. After repeating such assistance in cooking processes, cooking assistance system 100 assists cooking process N that is the last cooking process.

(Step S1001)

After the end of the assistance in cooking process N, controller 12 instructs output device 20 to display an end image.

(Step S1002)

Following the instruction from controller 12, output device 20 displays the end image.

Figure 12:
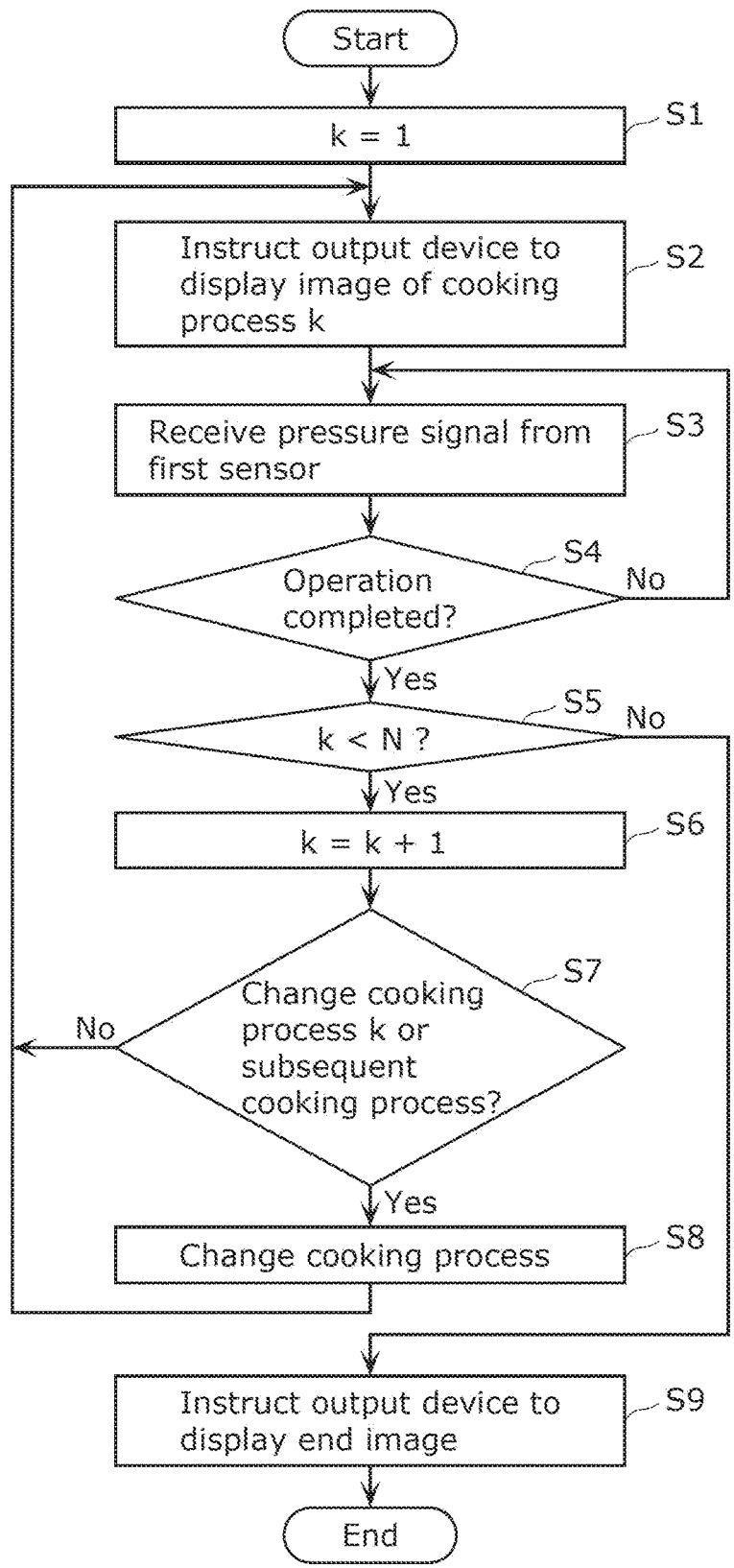
FIG. 12 is a flowchart illustrating a processing operation performed by a controller according to Embodiment 1.

FIG. 12 is a flowchart illustrating a processing operation performed by controller 12.

(Step S1)

First, controller 12 initializes variable k to 1.

(Step S2)

Next, controller 12 instructs output device 20 to display an image relating to cooking process k indicated by cooking data.

(Step S3)

Next, controller 12 receives a pressure signal from first sensor 13.

(Step S4)

Next, on the basis of the pressure signal received in Step S3, controller 12 determines whether the cooking operation included in cooking process k is fully completed.

(Step S5)

Next, controller 12 determines whether variable k is below maximum value N.

(Step S6)

Here, if determining in Step S5 that variable k is below maximum value N (Yes in Step S5), controller 12 increments variable k.

(Step S9)

In contrast, if determining in Step S5 that variable k is not below maximum value N (No in Step S5), or more specifically, if determining that variable k is maximum value N, controller 12 instructs output device 20 to display the end image.

(Step S7)

After incrementing variable k in Step S6, controller 12 determines a result of the latest cooking operation completed, on the basis of the pressure signal received in Step S3. Then, controller 12 determines whether to change the description of cooking process k or a description of a cooking process subsequent to cooking process k, on the basis of the result of the latest cooking operation. Here, the latest completed cooking operation refers to the cooking operation performed in cooking process k before the incrementing is performed. The cooking process for which whether to change the description is determined refers to cooking process k after the incrementing or a cooking process subsequent to cooking process k. If determining in Step S7 that the description of the cooking process is not to be changed (No in Step S7), controller 12 performs the processing from Step S2 again.

(Step S8)

In contrast, if determining in Step S7 that the description of the cooking process is to be changed (Yes in Step S7), controller 12 changes the description of the cooking process.

As a result, an image relating to this cooking process displayed on output device 20 according to the instruction subsequently received in Step S2 shows a changed description.

[Change and Addition of Cooking Process]

FIG. 13A illustrates an example of cooking data held in memory 14.

As described above, memory 14 stores, for each of the plurality of dishes, the cooking data used for making the dish. For example, the cooking data indicates information for each of cooking processes 1 to N to make the dish, as illustrated in FIG. 13A. More specifically, the cooking data indicates, for each of cooking processes 1 to N, a type of the cooking process, a description of the cooking process, and presentation information corresponding to the cooking process. Here, the description of the cooking process indicates a cooking object and a cooking method to be used in this cooking process. To help the user to perform a cooking operation in the cooking process, the presentation information includes an image to be displayed by output device 20 and audio to be outputted from output device 20.

Examples of the type of the cooking process include a cutting process, a preparation process, and a heating-cooling process. By the cutting process, an ingredient is cut on cooking board 11 with, for example, a knife. In this cutting process, controller 12 detects the cutting of the ingredient and the number of cuts made to the ingredient, on the basis of the pressure signals from first sensor 13. Moreover, controller 12 may derive at least one of: the hardness of the cut ingredient; the thickness of the cut ingredient; the weight of the cut ingredient; or the volume of the cut ingredient.

The heating-cooling process includes at least one of a heating process of heating an ingredient or a cooling process of cooling an ingredient. The heating process is at least one of grilling, steaming, boiling, or broiling. The cooling process is at least one of freezing or refrigerating.

The preparation process is other than the cutting process and the heating-cooling process. For example, examples of the preparation process include: placing an ingredient or a cooking utensil on cooking board 11; putting at least one of an ingredient or a cooking substance into a container that is the cooking utensil placed on cooking board 11; softening an ingredient; and making an ingredient easy to heat through.

For example, the cooking data illustrated in FIG. 13A indicates that the type of cooking process 1 is "cutting process". Moreover, the cooking data indicates that the cooking object is "carrot" and that the cooking method is "chopping", as the description of this cooking process. Furthermore, the cooking data indicates "image 1, audio 1" as the presentation information corresponding to this cooking process.

If the user selects a dish, controller 12 reads the cooking data corresponding to this dish from memory 14. Then, following a sequence of a plurality of cooking processes indicated by this cooking data, controller 12 performs, for each cooking process, an operation based on the information corresponding to this cooking process. For example, the presentation information of cooking process 1 is "image 1, audio 1". Thus, controller 12 instructs output device 20 to display image 1 and output audio 1. Moreover, the type of cooking process 1 is indicated as "cutting process". Thus, controller 12 detects the cutting of the ingredient "carrot" used in the dish, on the basis of the pressure signal from first sensor 13. Moreover, controller 12 derives the hardness and thickness of the cut carrot.

FIG. 13B illustrates an example of change-addition data held in memory 14.

Memory 14 stores the change-addition data to make a change or addition to the description of the cooking process, for each of the plurality of dishes. For example, for each of cooking processes 1 to N, the change-addition data indicates a derivation subject, a standard range, and change to be made when a value of the derivation subject is outside the standard, as illustrated in FIG. 13B. The derivation subject is a parameter derived on the basis of the pressure signal from first sensor 13, and is hardness, thickness, thermal conductivity, or weight, for instance. The standard range refers to a numerical standard range with respect to a numerical value of the derivation subject. Examples of the change to be made when the value of the derivation subject is outside the standard include: addition of the cutting process; change of the cutting process; addition of the preparation process; change of the heating-cooling process; and suggestion of a different dish. This change is made to a cooking process subsequent to the current cooking process when the value of the derivation subject that is derived during the current cooking process is outside the standard. Moreover, this change is made by changing the information such as the presentation information relating to the aforementioned subsequent cooking process in the cooking data in FIG. 13A, for example.

When the value of the derivation subject is outside the standard, controller 12 according to the present embodiment makes a change to the subsequent cooking process. At or before this time, controller 12 may cause output device 20 to display a reason for the change and details of the change. The reason for the change may be the value of the derivation subject. For example, if the hardness is the derivation subject, the reason for the change may be the hardness index or the hardness level illustrated in FIG. 6. The details of the change may be an addition of the cutting or preparation process or a change of the heating-cooling process. To be more specific, controller 12 may cause output device 20 to display a message "Cutting process is added to cooking process 2 because daikon radish is hard in cooking process 1". Moreover, controller 12 may cause output device 20 to display, together with this message, the description of the cooking process before the change.

In the present embodiment, the cooking data illustrated in FIG. 13A and the change-addition data illustrated in FIG. 13B are separate. However, the change-addition data may be included in the cooking data.

For example, the change-addition data in FIG. 13B indicates "hardness" as the derivation subject and "A" as the standard range for cooking process 1. Thus, controller 12 derives the hardness of the cut ingredient in cooking process 1. This hardness is derived as the hardness index illustrated in FIG. 6, for example. Standard range A refers to the allowable range illustrated in FIG. 6, for example. Controller 12 compares the hardness index with the allowable range. If the hardness index is outside the allowable range, that is, if the value of the derivation subject is outside the standard, controller 12 changes the cooking process subsequent to cooking process 1 as indicated by the change-addition data. If the value of the derivation subject is outside the standard in cooking process 1, the change to be made includes addition of the cutting process, addition of the preparation process, and change in the heating-cooling process as illustrated in the change-addition data of FIG. 13B. Moreover, if the value of the derivation subject is below the standard in cooking process 1, the change to be made is to suggest a different dish. Thus, if the aforementioned hardness index exceeds the allowable range, controller 12 makes at least one of addition of the cutting process, addition of the preparation process, and change in the heating-cooling process, to the cooking process subsequent to cooking process 1. Here, priorities may be assigned to these three processes in advance. Controller 12 may select the change having a high priority and then executes the selected change. In contrast, if the aforementioned hardness index is below the allowable range, controller 12 suggests a different dish in the cooking process subsequent to cooking process 1. For example, controller 12 suggests a different dish by causing output device 20 to display an image of the different dish and a message to help the user to change to this different dish.

Specific examples of the aforementioned changes are as follows.

By the addition of the cutting process, a process of further cutting the cut ingredient into smaller pieces is added to a cooking process performed subsequently to the current cooking process. Such a cutting process is added when the hardness or thickness of the ingredient cut in the previous cutting process exceeds the standard range.

For example, controller 12 derives the hardness or thickness of the carrot cut in the carrot-cutting process of cooking process 1 or 2, with reference to the change-addition data illustrated in FIG. 13B. Then, if determining that the numerical value representing the hardness or thickness (for example, the hardness index) exceeds standard range A or B, controller 12 adds the cutting process of further cutting the cut carrot into smaller pieces, to a cooking process to be performed subsequently to the current cooking process. In this way, controller 12 according to the present embodiment obtains a second thickness associated with the first cooking process. Then, controller 12 changes the description of the second cooking process on the basis of a result of a comparison between the first thickness derived in the first cooking process and the second thickness. Moreover, controller 12 obtains a second hardness associated with the first cooking process. Then, controller 12 changes the description of the second cooking process on the basis of a result of a comparison between the first hardness derived in the first cooking process and the second hardness. For example, the second thickness or the second hardness is within the standard range indicated by the change-addition data. In this way, even if the hardness or thickness of the ingredient that is cut once is outside the predetermined standard range, the hardness or thickness can be brought within the standard range later.

By the change of the cutting process, the cutting process for ingredient 2 performed subsequently to the cutting process for ingredient 1 is changed. More specifically, a size of ingredient 2 after the cutting is changed to match with a size of ingredient 1 after the cutting in the previous cooking process. Thus, the size of cut ingredient 2 as a result of the cutting process is changed to be roughly the same as the size of cut ingredient 1 as a result of the cutting process. Such a change of the cutting process is performed when the size of ingredient 1 as a result of the cutting process is outside the standard range. Note that the size of the cut ingredient may be the thickness of the cut ingredient.

For example, controller 12 derives the thickness of the daikon radish cut in the daikon-radish cutting process of cooking process 2, with reference to the change-addition data illustrated in FIG. 13B. Then, if determining that the thickness is outside the standard range, controller 12 changes a predetermined thickness of potato cut in a cutting process performed subsequently to the current cutting process to the thickness of the daikon radish previously cut. This can appropriately adjust textures or chunkiness of the daikon radish and potato in the dish when put into the mouth.

Thus, controller 12 according to the present embodiment changes the way of cutting the second ingredient, such as potato described above, to be used in the second cooking process on the basis of a result of a comparison between the first thickness derived in the first cooking process and the second thickness (the aforementioned standard range, for example). In this way, controller 12 changes the description of the second cooking process by changing the way of cutting the second ingredient in the second cooking process. As a result, the aforementioned textures can be appropriately adjusted.

Note that a combination of ingredient 1 and ingredient 2 (that is, a combination of the first ingredient and the second ingredient) that are to be adjusted to have roughly the same size, such as the same thickness, after the cutting is predetermined. To be more specific, a combination of carrot and daikon radish and a combination of daikon radish and potato may be predetermined. For example, combination data indicating such combinations may be stored in memory 14. Then, controller 12 may select the change of the cutting process from among a plurality of changes, with reference to this combination data.

By the addition of the preparation process, a process of softening the ingredient cut in the cutting process or a process of making this ingredient easy to heat through is added to a cooking process performed subsequently to this cutting process. Such an addition of the preparation process is made when the hardness or thickness of the ingredient cut in the cutting process is outside the standard range.

For example, controller 12 derives the hardness of the carrot cut in the carrot cutting process of cooking process 1, with reference to the change-addition data illustrated in FIG. 13B. Then, if determining that the numerical value representing the hardness (for example, the hardness index) exceeds standard range A, controller 12 adds a process of softening the cut carrot using a microwave oven as a preparation process, to a cooking process to be performed subsequently to the current cutting process. If cooking process 1 is a process of cutting meat, controller 12 adds a process of pouring sake over the meat and rubbing sake into the meat, to a cooking process to be performed subsequently to the current cooking process. In this way, even if the hardness of the cut ingredient is outside the predetermined standard range, the hardness can be brought within the standard range later.

As described, if the first hardness derived in the first cooking process is greater than the second hardness (the aforementioned standard range, for example), controller 12 according to the present embodiment changes the description of the second cooking process by adding the process performed on the cut first ingredient to the second cooking process. For example, the process performed on this first ingredient is to soften the first ingredient using the microwave oven as described above. With this, even if the hardness of the first ingredient after the cutting is not as expected, the hardness can be made closer to an expected hardness. More specifically, even if the hardness of the first ingredient after the cutting is outside the predetermined standard range, the hardness can be brought within the standard range later.

The change of the heating-cooling process changes a temperature pattern that is to be used in the heating-cooling process performed subsequently to the cutting process. The temperature pattern indicates a relationship between temperature and time of a heating or cooling process. Such a change of the heating-cooling process is made when the hardness or thickness of the ingredient cut in the cutting process is outside the standard range.

For example, controller 12 derives the hardness of the onion cut in the onion cutting process of cooking process 1, with reference to the change-addition data illustrated in FIG. 13B. Then, if determining that the numerical value representing the hardness (for example, the hardness index) exceeds standard range A, controller 12 changes a temperature pattern to be used in a heating process of stir-frying the onion in the pot performed after this cutting process. Moreover, if the numerical value representing the hardness of the onion exceeds standard range A and the heating process is performed to stir-fry the onion and meat in the pot, controller 12 changes timing of stir-frying the meat so as to increase a period during which only the onion is stir-fried in the heating process. To be more specific, controller 12 delays the timing of stir-frying the meat with respect to predetermined timing. Thus, even if the hardness of the cut ingredient is outside the predetermined standard range, the hardness can be brought within the standard range later. In the above example, controller 12 derives the hardness of the onion and then changes the heating process on the basis of the derived hardness. However, controller 12 may similarly derive the thickness of the onion and then change the heating process on the basis of the derived thickness.

In the above example, cooking process 1 is performed to cut the onion. However, cooking process 1 may be performed to cut the meat. In this case, controller 12 derives the hardness of the meat cut in the meat cutting process of cooking process 1, with reference to the change-addition data illustrated in FIG. 13B. Then, if determining that the numerical value representing the hardness (for example, the hardness index) is outside standard range A, controller 12 changes a temperature pattern to be used in a heating process of stir-frying the meat in the pot performed after this cutting process. Moreover, if the numerical value representing the hardness of the meat exceeds standard range A and the heating process is performed to stir-fry the meat and vegetables in the pot, controller 12 may change timing of stir-frying the vegetables so as to increase a period during which only the meat is stir-fried in the heating process. To be more specific, controller 12 delays the timing of stir-frying the vegetables with respect to predetermined timing. Alternatively, if an order in which the ingredients are stir-fried in the process of stir-frying the meat and vegetables is specified, controller 12 may change this order. For example, assume that the order in which the vegetables and meat are stir-fried is specified such that the vegetables are first stir-fried in the pot and the meat is put into the pot later. In this case, if determining that the numerical value representing the hardness of the meat exceeds standard range A, controller 12 may change the order in which the vegetables and meat are stir-fried.

If the numerical value representing the hardness of the meat is below standard range A and the heating process is performed to stir-fry the meat in the pot, controller 12 changes the heating process so that the vegetables are added into the pot to make the meat hard to heat through in the heating process. More specifically, controller 12 causes output device 20 to output a message to add the vegetables into the pot via text or audio. In the above example, controller 12 derives the hardness of the meat and then changes the heating process on the basis of the derived hardness. However, controller 12 may similarly derive the thickness of the meat and then change the heating process on the basis of the derived thickness.

In the above example, the heating process is performed to stir-fry the ingredient. However, the heating process may be performed to simmer the ingredient. In this case, controller 12 derives the hardness of the ingredient cut in the cutting process of cooking process 1, with reference to the change-addition data illustrated in FIG. 13B. Then, if determining that the numerical value representing the hardness (for example, the hardness index) is outside standard range A, controller 12 changes a temperature pattern to be used in the heating process of simmering the ingredient performed subsequently to the cutting process. If timing of skimming off foam in the heating process is predetermined, controller 12 may also change this timing in addition to changing the temperature pattern. Moreover, if the change of the temperature pattern changes a predetermined simmering time, controller 12 may change an amount of water used for simmering in the heating process. To be more specific, a predetermined amount of water to be used in the heating process is changed. If determining, when the ingredient is the meat, that the numerical value representing the hardness of the meat exceeds standard range A, controller 12 may change part of water used for simmering the ingredient in the heating process performed subsequently to the cutting process, to red wine.

As described, on the basis of the result of the comparison between the first thickness derived in the first cooking process and the second thickness (the aforementioned standard range, for example) or the result of the comparison between the first hardness derived in the first cooking process and the second thickness (the aforementioned standard range, for example), controller 12 according to the present embodiment changes the description of the second cooking process by changing the way of heating the cut first ingredient to be used in the second cooking process. With this, even if the hardness of the first ingredient after the cutting is not as expected, the hardness can be made closer to an expected hardness.

By the suggestion of a different dish, suggestion of a dish different from the current dish made by the cutting and cooking processes is added to a cooking process performed subsequently to this cutting process. This suggestion of the different dish is made using an image displayed or audio outputted by output device 20. Moreover, such suggestion of the different dish is made when the hardness or thickness of the ingredient cut in the cutting process is below the standard range. Information about the different dish may indicate, for example, a soup-based dish, and may be previously stored in memory 14.

For example, controller 12 derives the thickness of the cut daikon radish in the daikon-radish cutting process of cooking process 2 of a dish "curry" for instance, with reference to the change-addition data illustrated in FIG. 13B. Then, if determining that the thickness is below the standard range, controller 12 searches memory 14 for a different dish made using the cut daikon radish, such as a dish "soup". Controller 12 then causes output device 20 to suggest the different dish "soup" in, for example, cooking process 3 performed subsequently to cooking process 2. Although texture of the pieces of daikon radish cut too small may be lost in the dish "curry", these pieces of daikon radish can be well used in this different dish "soup".

FIG. 14 illustrates an example of change in temperature pattern. In a graph of FIG. 14, the horizontal axis represents time [s] whereas the vertical axis represents temperature [° C.]. Moreover, a temperature represents a set temperature or level of heating power of a stove or heater used for heating the ingredient.

To change the temperature pattern to be used in a subsequent heating process because the hardness of the cut ingredient exceeds the standard range, controller 12 changes temperature pattern pt1 to temperature pattern pt2 or pt3 as illustrated in FIG. 14. To be more specific, by raising maximum temperature h1 of temperature pattern pt1 to maximum temperature h2, controller 12 changes temperature pattern pt1 to temperature pattern pt2. Alternatively, by increasing heating time t01 of temperature pattern pt1 to heating time t02, controller 12 changes temperature pattern pt1 to temperature pattern pt3.

Temperature pattern pt1 before the change may be indicated in the cooking data illustrated in FIG. 13A. Temperature pattern pt2 or pt3 after the change may be indicated in change-addition data illustrated in FIG. 13B. Controller 12 changes temperature pattern pt1 with reference to the change-addition data.

If temperature pattern pt2 or pt3 after the change is not indicated in the change-addition data, controller 12 may generate the changed temperature pattern. For example, controller 12 generates temperature pattern pt2 having maximum temperature h2 by multiplying maximum temperature h1 of temperature pattern pt1 indicated in the cooking data by the aforementioned hardness index. Alternatively, controller 12 generates temperature pattern pt3 having heating time t02 by multiplying heating time t01 of temperature pattern pt1 indicated in the cooking data by the aforementioned hardness index. In the above example, the hardness index is used to generate the changed temperature pattern. However, the hardness level illustrated in FIG. 6 may be used instead of the hardness index. In this case, a coefficient is previously assigned for each hardness level. Thus, controller 12 may generate the changed temperature pattern by multiplying maximum temperature h1 or hating time t01 of temperature pattern pt1 by the coefficient. In the above example, the temperature pattern is changed on the basis of the hardness of the cut ingredient. However, the temperature pattern may be similarly changed on the basis of the thickness of the cut ingredient. In this way, the harder or thicker the cut ingredient, the higher the temperature to which the cut ingredient is heated or the longer the time during which the cut ingredient is heated. In contrast to this, the softer or thinner the cut ingredient, the lower the temperature to which the cut ingredient is heated or the shorter the time during which the cut ingredient is heated. Hence, the hardness of the ingredient can be appropriately controlled.

FIG. 15 conceptually illustrates the cooking data for the dish "curry" in combination with the change-addition data.

For example, an operation to make the dish "curry" includes cooking processes 1 to N as illustrated in FIG. 15. Cooking process 1 is a process of cutting a carrot. According to a parameter of, for example, the hardness derived in this cutting process, reprocessing of the carrot, change of the heating process, or suggestion of a different dish is made in a cooking process subsequent to cooking process 1. The reprocessing of the carrot refers to an addition of the aforementioned cutting process performed on the carrot cut in the cutting process, or refers to an addition of a preparation process. Similarly, cooking process 2 refers to a process of cutting a potato. According to a parameter of, for example, the hardness derived in this cutting process, reprocessing of the potato, change of the heating process, or suggestion of a different dish is made in a cooking process subsequent to cooking process 2. The reprocessing of the potato refers to an addition of the aforementioned cutting process performed on the potato cut in the cutting process, or refers to an addition of a preparation process.

[Summary of Embodiment 1]

As described thus far, on the basis of a result of a cooking operation performed in a cooking process, cooking assistance system 100 according to the present embodiment changes a description of a subsequent cooking process. More specifically, controller 12 according to the present embodiment performs processing illustrated in FIG. 16.

Figure 16:
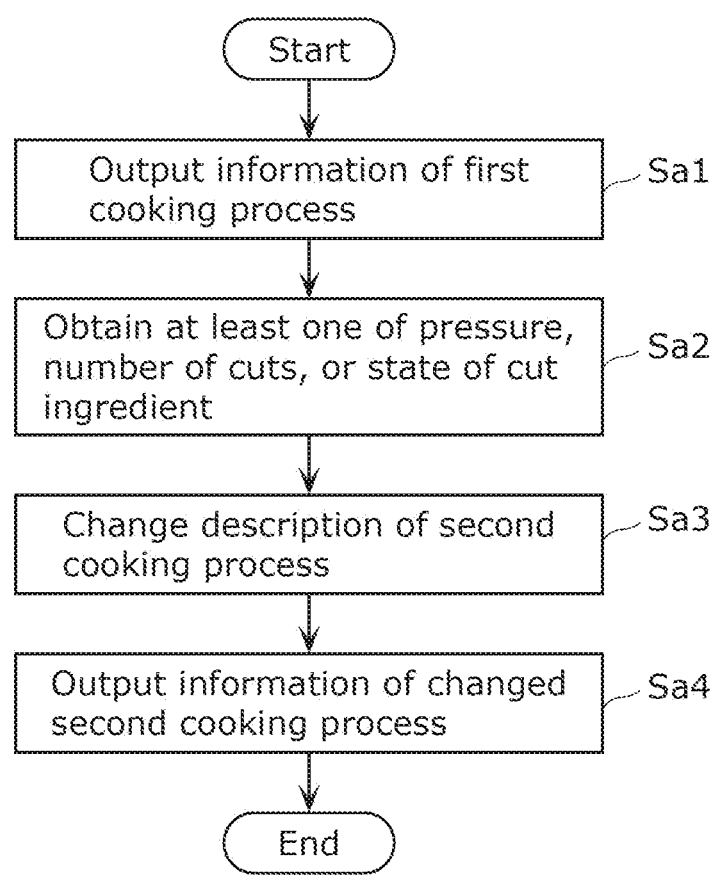
FIG. 16 is a flowchart illustrating a processing operation performed by the controller to change a description of a cooking process, according to Embodiment 1.

FIG. 16 is a flowchart illustrating a processing operation performed by controller 12 to change a description of a cooking process.

(Step Sa1)

First, controller 12 causes output device to output the information of the first cooking process in which the first ingredient is cut or applied with a pressure. For example, this information is an image or audio that helps the user to cut the first ingredient.

(Step Sa2)

Next, when the first ingredient is cut or applied with the pressure on cooking board 11 in the first cooking process, controller 12 obtains at least one of the pressure on cooking board 11, the number of cuts made to the first ingredient, or the state of the cut first ingredient.

(Step Sa3)

Next, on the basis of information about the at least one of the pressure, the number of cuts, or the state of the cut first ingredient, controller 12 changes the description of the second cooking process performed subsequently to the first cooking process.

(Step Sa4)

Then, controller 12 causes output device 20 to output the information of the changed second cooking process.

Thus, the user of output device 20 performs the cooking operation according to the information of the first cooking process outputted from output device 20, for example. As a result of this cooking operation, the aforementioned at least one of the pressure, the number of cuts, or the state of the cut first ingredient, or the information about this at least one is obtained. Even if the result of the cooking operation is not a result that is expected from the first cooking process, the description of the second cooking process is changed using this result of the cooking operation. Thus, if the result of the cooking operation in the first cooking process is not as expected, an influence caused by this result on the dish can be reduced in the second cooking process. Hence, the cooking assistance can be appropriately provided.

In Step Sa3, controller 12 estimates the first thickness of the cut first ingredient on the basis of the number of cuts. Then, controller 12 changes the description of the second cooking process, using the first thickness of the first ingredient as the information based on the number of cuts. For example, controller 12 obtains the second thickness associated with the first cooking process. Then, controller 12 changes the description of the second cooking process on the basis of the result of the comparison between the first thickness and the second thickness.

In this way, the first thickness is obtained as the result of the cooking operation of the first cooking process, and then the description of the second cooking process is changed using the first thickness. Thus, even if the first thickness is not the second thickness that is expected from the first cooking process, the influence caused by this result on the dish can be reduced in the second cooking process.

In Step Sa3, controller 12 estimates the first hardness of the first ingredient after the cutting or after the application of the pressure, on the basis of the pressure. Then, controller 12 changes the description of the second cooking process, using the first thickness of the first ingredient as the information based on the pressure. For example, controller 12 obtains the second hardness associated with the first cooking process. Then, controller 12 changes the description of the second cooking process on the basis of the result of the comparison between the first hardness and the second hardness.

In this way, the first hardness is obtained as the result of the cooking operation of the first cooking process, and then the description of the second cooking process is changed using the first hardness. Thus, even if the first hardness is not the second hardness that is expected from the first cooking process, the influence caused by this result on the dish can be reduced in the second cooking process.

In Step Sa3, according to the result of the comparison, controller 12 changes the description of the second cooking process by changing at least one of the way of cutting the second ingredient to be used in the second cooking process or the way of heating the cut first ingredient to be used in the second cooking process.

For example, if the first thickness is greater than the second thickness, the first thickness may be greater than the thickness of the second ingredient cut in the second cooking process. In this case, the way of cutting the second ingredient is changed. As a result, even if the first thickness is greater, the thickness of the cut first ingredient can be made equal to the thickness of the cut second ingredient. For example, if the first hardness of the cut first ingredient is greater than the second hardness, the way of heating the first ingredient is changed. This change of the heating way can make the hardness of the cut first ingredient closer to the second hard ness.

In Step Sa3, if the first hardness is greater than the second hardness, controller 12 changes the description of the second cooking process by adding a process performed on the cut first ingredient to the second cooking process.

In this way, if the first hardness of the cut first ingredient is greater than the second hardness, the process performed on the first ingredient is added. For example, this added process is to further cut the cut first ingredient or to heat the cut first ingredient using the microwave oven. This addition of the process can make the hardness of the cut first ingredient closer to the second hardness.

In the present embodiment, the description of the second cooking process is changed on the basis of the result of the comparison between the first thickness and the second thickness or between the first hardness and the second hardness. To be more specific, controller 12 compares the hardness derived in cooking process 1 and standard range A and changes the description of the subsequent cooking process on the basis of the result of the comparison as illustrated in FIG. 13B. However, controller 12 may not use this result of the comparison. For example, controller 12 may determine whether a change of a subsequent cooking process is set for each numerical value representing a hardness or thickness derived in a cooking process. If determining that the change is set, controller 12 may change the description of the subsequent cooking process. Alternatively, controller 12 may determine whether a change of a subsequent cooking process is set for each level representing a hardness or thickness derived in a cooking process. If determining that the change is set, controller 12 may change the description of the subsequent cooking process. This change of the subsequent cooking process according to the numerical value or level may be set in the change-addition data illustrated in FIG. 13B, for example.

In the present embodiment, the addition of the preparation process is to add, for example, the process of softening the ingredient cut in the cutting process to the cooking process performed subsequently to the cutting process. However, this addition of the preparation process may be to add a process of putting a cooking substance, to the cooking process performed subsequently to the previous preparation process. For example, too much salt may be put into water in the bowl in the previous preparation process. In this case, a process of putting more water into the bowl is added to the subsequent cooking process, as the addition of the preparation process.

In the present embodiment, controller 12 derives the weight, hardness, or thickness of the ingredient as a result of the cooking operation. However, controller 12 may derive a volume. For example, if cooking assistance system 100 includes second sensor 30, controller 12 may derive the volume of the ingredient shown in an image captured by second sensor 30, on the basis of an area of an XY plane of the ingredient and a height of the ingredient in the Z-axis direction. Note that the height in the Z-axis direction may be predetermined and indicated for each ingredient in the cooking data. Controller 12 may derive the weight of the ingredient by multiplying this volume of the ingredient by a density of the ingredient. Note that the density may also be predetermined and indicated for each ingredient in the cooking data.

Embodiment 2

Controller 12 of cooking assistance system 100 according to the present embodiment performs zero reset when an image displayed on output device 20 is changed. The zero reset is performed to reset a load derived on the basis of a pressure signal from first sensor 13. In the present embodiment, any numerical value representing a load or time for instance is merely an example and thus may be any different numerical value.

Figure 17:
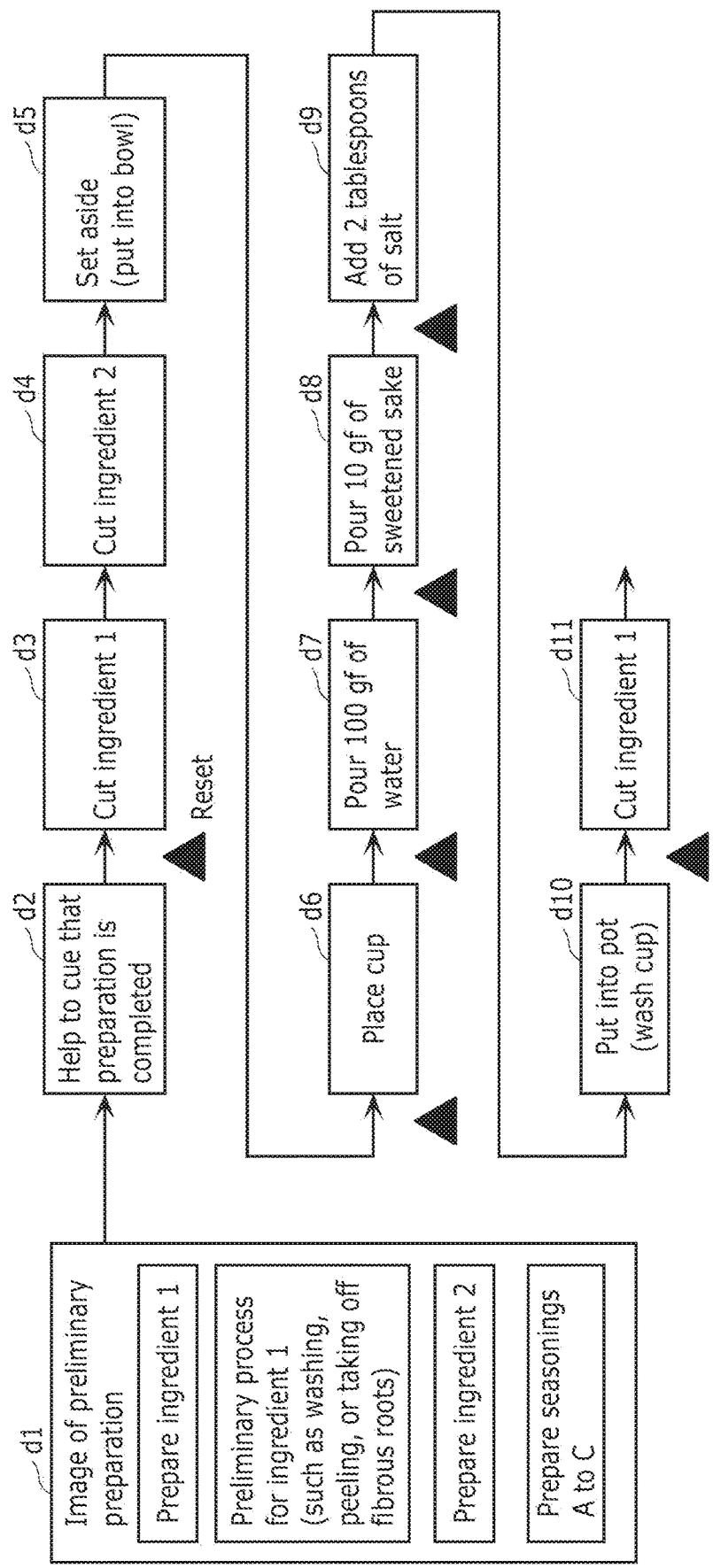
FIG. 17 illustrates an example of screen transitions of an output device and zero reset timing, according to Embodiment 2.

FIG. 17 illustrates an example of screen transitions of output device 20 and zero reset timing. Note that images d1 to d11 illustrated in FIG. 17 relate, respectively, to cooking processes 1 to 11 in cooking data.

First, controller 12 causes output device 20 to display image d1 of preliminary preparation for making a dish according to the aforementioned cooking data. Image d1 of the preliminary preparation helps the user to perform an operation including: placing ingredient 1 on cooking board 11; performing a preliminary process on ingredient 1; placing ingredient 2 on cooking board 11; and preparing seasonings A to C. Note that the preliminary process includes at least one of washing ingredient 1, peeling ingredient 1, or taking off fibrous roots of ingredient 1. Note also that the operation according to the present embodiment is similar to the cooking operation according to Embodiment 1.

Next, controller 12 changes image d1 displayed on output device 20 to image d2. Image d2 helps the user to cue that the preliminary preparation is completed. For example, the user provides this cue by tapping the knife twice in a row on cooking board 11, for example. First sensor 13 outputs a pressure signal obtained from these two taps with the knife on cooking board 11 to controller 12. Receiving this pressure signal, controller 12 recognizes the completion of the preliminary preparation. As a result, controller 12 changes image d2 displayed on output device 20 to image d3 and also performs the zero reset. Image d3 helps the user to cut ingredient 1 on cooking board 11. This zero reset allows controller 12 to appropriately detect the cutting of ingredient 1, cutting of next ingredient 2, and setting-aside of ingredients 1 and 2 on the basis of the load derived from the pressure signal in the subsequent cooking process.

Next, controller 12 changes image d3 displayed on output device 20 to image d4, and then changes image d4 displayed on output device 20 to image d5. Image d4 helps the user to cut ingredient 2 on cooking board 11. Image d5 helps the user to set aside ingredients 1 and 2 placed on cooking board 11.

Next, controller 12 changes image d5 displayed on output device 20 to image d6 and also performs the zero reset. Image d6 helps the user to place a cup on cooking board 11. This zero reset allows controller 12 to appropriately detect the placement of the cup on the basis of a load derived from the pressure signal.

Next, controller 12 changes image d6 displayed on output device 20 to image d7 and also performs the zero reset. Image d7 helps the user to pour 100 gf of water into the cup placed on cooking board 11. This zero reset allows controller 12 to appropriately detect the pouring of 100 gf of water into the cup on the basis of a load derived from the pressure signal.

Next, controller 12 changes image d7 displayed on output device 20 to image d8 and also performs the zero reset. Image d8 helps the user to pour 10 gf of sweetened sake into the cup placed on cooking board 11. This zero reset allows controller 12 to appropriately detect the pouring of 10 gf of sweetened sake into the cup on the basis of a load derived from the pressure signal.

Next, controller 12 changes image d8 displayed on output device 20 to image d9 and also performs the zero reset. Image d9 helps the user to add two tablespoons of salt to the cup placed on cooking board 11. This zero reset allows controller 12 to appropriately detect the addition of two tablespoons of salt to the cup on the basis of a load derived from the pressure signal.

Next, controller 12 changes image d9 displayed on output device 20 to image d10. Then, controller 12 changes image d10 to image d11 and also performs the zero reset. Image d10 helps the user to put the cooking substances in the cup placed on cooking board 11 into the pot. Image d11 helps the user to cut ingredient 1 on cooking board 11. This zero reset allows controller 12 to appropriately detect the cutting of ingredient 1 on the basis of a load derived from the pressure signal.

In this way, controller 12 according to the present embodiment performs the zero reset when the image displayed on output device 20 is changed to a next image. More specifically, controller 12 according to the present embodiment continuously obtains, from first sensor 13, a signal indicating a numerical value varying depending on a load on cooking board 11. Then, controller 12 causes output device 20 to display the first image relating to the first cooking process in which a cooking operation is performed using cooking board 11. While the first image is displayed, controller 12 converts the numerical value indicated by the aforementioned obtained signal to a load. Moreover, controller 12 changes the first image displayed on output device 20 to the second image relating to the second cooking process in which a cooking process different from the first cooking process is performed using cooking board 11. Here, controller 12 performs the zero reset to set, to 0 as a load, the numerical value indicated by the aforementioned signal obtained when the first image is changed to the second image. Then, while the second image is displayed, controller 12 converts the numerical value indicated by the aforementioned obtained signal to a load, with reference to 0 set as a numerical value of a load.

The timing of the zero reset may be indicated in the aforementioned cooking data. For example, the cooking data indicates that cooking process 2 is performed after cooking process 1 and that the zero reset is performed at the beginning of cooking process 2. Controller 12 performs the zero reset according to this cooking data. This increases the accuracy of the load derived in the second cooking process. Thus, the result of the cooking operation performed in the second cooking process can be appropriately determined. Hence, the cooking assistance can be appropriately provided.

Figure 18:
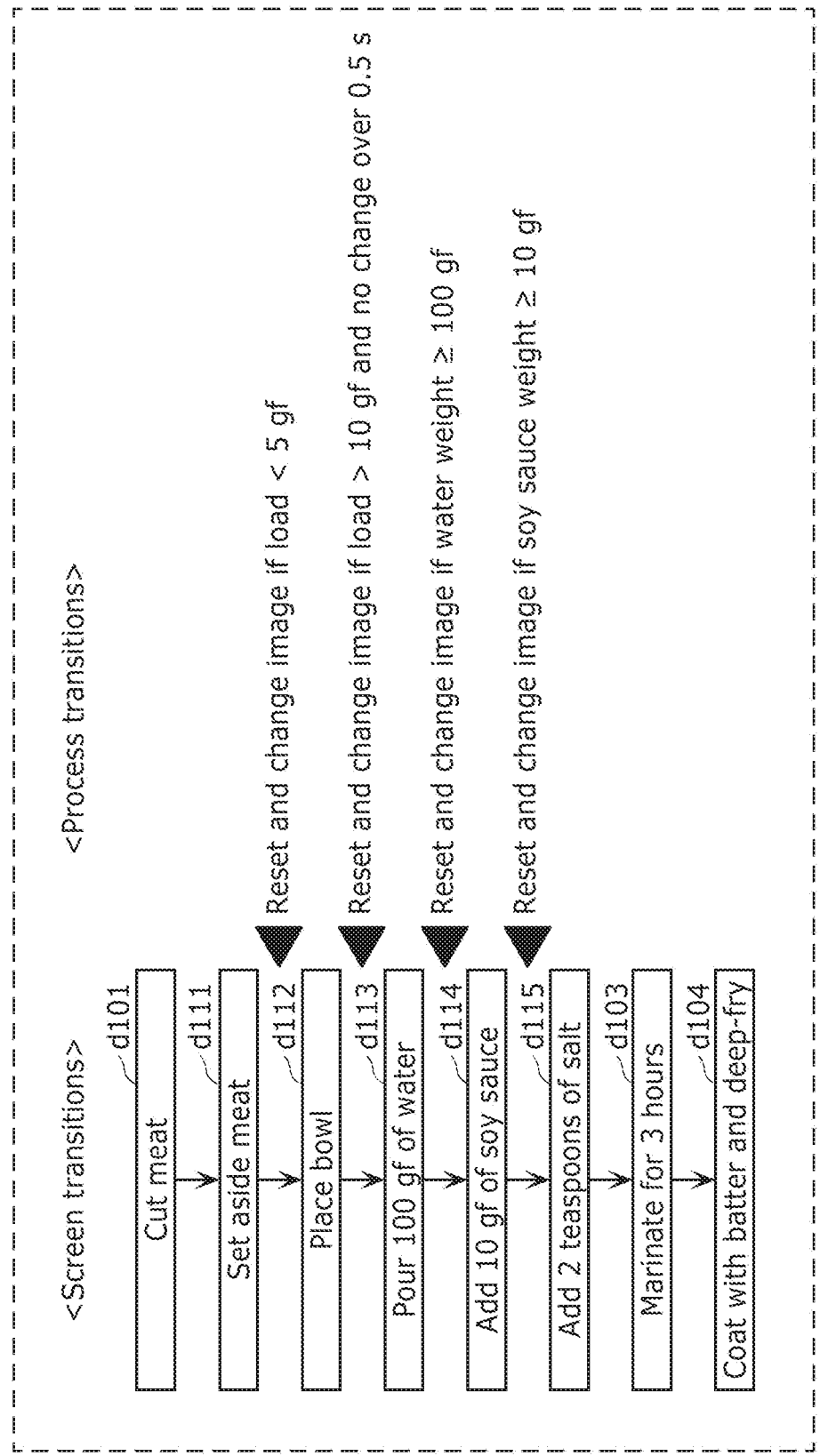
FIG. 18 illustrates an example of screen transitions of the output device and process transitions for making a dish "fried chicken (karaage)", according to Embodiment 2.

FIG. 18 illustrates an example of screen transitions of output device 20 and process transitions for making a dish "fried chicken (karaage)". Note that images d101, d111 to d115, d103, and d104 relate, respectively, to cooking processes 1 to 8 of cooking data of the dish "fried chicken".

First, controller 12 causes output device 20 to display image d101 that helps the user to cut meat for the dish "fried chicken" on cooking board 11, according to the cooking data of the dish "fried chicken". Then, if determining that this cutting operation is completed, controller 12 changes image d101 displayed on output device 20 to image d111. Image d111 helps the user to set aside the meat placed on cooking board 11.

Next, controller 12 changes image d111 displayed on output device 20 to image d112 and also performs the zero reset. Image d112 helps the user to place a bowl on cooking board 11. More specifically, if the load derived from the pressure signal is below 5 gf, that is, if the setting-aside of the meat is completed, controller 12 performs the zero reset and changes the image. This zero reset allows controller 12 to appropriately detect the placement of the bowl on cooking board 11 in the subsequent cooking process.

Next, controller 12 changes image d112 displayed on output device 20 to image d113 and also performs the zero reset. Image d113 helps the user to pour 100 gf of water into the bowl placed on cooking board 11. More specifically, if the load derived from the pressure signal exceeds 10 gf and does not change for 0.5 s or more, that is, if the placement of the bowl is completed, controller 12 performs the zero reset and changes the image. This zero reset allows controller 12 to appropriately detect the pouring of 100 gf of water into the bowl in the subsequent cooking process.

Next, controller 12 changes image d113 displayed on output device 20 to image d114 and also performs the zero reset. Image d114 helps the user to add 10 gf of soy sauce to the bowl placed on cooking board 11. More specifically, if the load derived from the pressure signal, that is, the weight of the water, exceeds 100 gf, controller 12 performs the zero reset and changes the image. This zero reset allows controller 12 to appropriately detect the addition of 10 gf of soy sauce to the bowl in the subsequent cooking process.

Next, controller 12 changes image d114 displayed on output device 20 to image d115 and also performs the zero reset. Image d115 helps the user to add two teaspoons of salt to the bowl placed on cooking board 11. More specifically, if the load derived from the pressure signal, that is, the weight of the soy sauce, exceeds 10 gf, controller 12 performs the zero reset and changes the image. This zero reset allows controller 12 to appropriately detect the addition of two teaspoons of salt to the bowl in the subsequent cooking process. As a result of this operation, marinade sauce is made in the bowl.

Following this, controller 12 changes image d115 displayed on output device 20 to image d103, and then changes image d103 to image d104. Image d103 helps the user to marinate the cut meat in the marinade sauce in the bowl for three hours. Image d104 helps the user to coat the marinated meat with batter and deep-fry this meat.

In the example illustrated in FIG. 18, the zero reset is performed when the image is changed as described. Thus, while helping the user to perform the operations in the cooking processes with high accuracy using the images before and after the change, controller 12 appropriately performs the zero reset during an interval between the operations.

In the example illustrated in FIG. 18, the zero reset is performed when the image is changed. However, the zero reset may be performed while the image is displayed, instead of when the image is changed.

Figure 19:
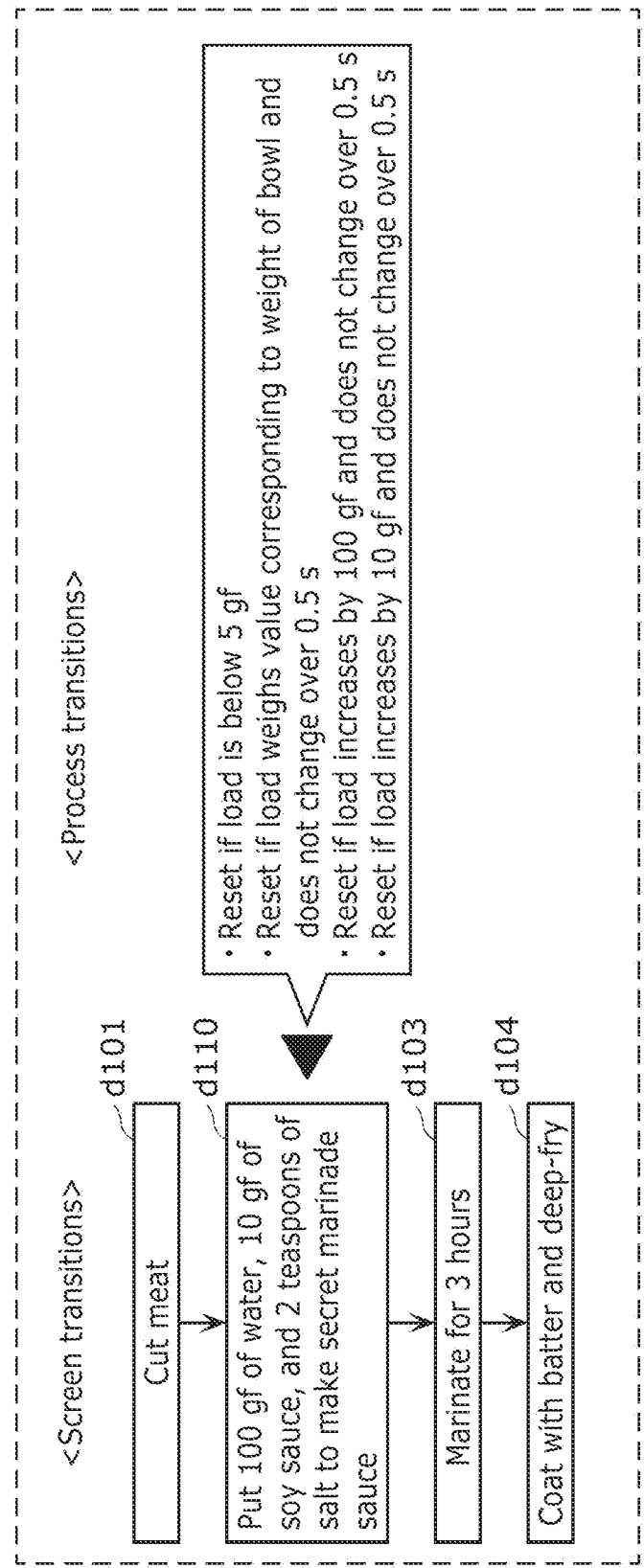
FIG. 19 illustrates another example of screen transitions of the output device and process transitions for making the dish "fried chicken", according to Embodiment 2.

FIG. 19 illustrates another example of screen transitions of output device 20 and process transitions for making the dish "fried chicken".

In the example illustrated in FIG. 19, controller 12 causes output device 20 to display image d110 including the descriptions of images d111 to d115 illustrated in FIG. 18, instead of displaying images d111 to d115. While image d110 is displayed, controller 12 performs the zero reset a plurality of times. More specifically, if the load derived from the pressure signal is below 5 gf, controller 12 performs the zero reset for a first time. Then, if the load corresponds to the weight of the bowl and does not change for 0.5 s or more, controller 12 performs the zero reset for a second time. For example, if the load exceeds 10 gf and does not change for 0.5 s or more, controller 12 performs the zero reset for the second time. Next, if the load increases by 100 gf and does not change for 0.5 s or more, controller 12 performs the zero reset for a third time. Then, if the load increases by 10 gf and does not change for 0.5 s or more, controller 12 performs the zero reset for a fourth time.

For example, the user watches image d110 displayed on output device 20 and then performs the operations indicated in image d110. More specifically, the user sets aside the meat cut on cooking board 11, places the bowl on cooking board 11, pours 10 gf of water into the bowl, adds 10 gf of soy sauce, and adds two teaspoons of salts. Based on the assumption that the user performs these operations, controller 12 determines that the setting-aside of the meat is completed if the load is below 5 gf. Thus, controller 12 performs the zero reset for the first time. Then, if the load corresponds to the weight of the bowl and does not change for 0.5 s or more, controller 12 determines that the placement of the bowl is completed and thus performs the zero reset for the second time. Then, if the load increases by 100 gf and does not change for 0.5 s or more, controller 12 determines that the pouring of 100 gf of water is completed and thus performs the zero reset for the third time. Then, if the load increases by 10 gf and does not change for 0.5 s or more, controller 12 determines that the addition of 10 gf of soy sauce is completed and thus performs the zero reset for the fourth time. These zero resets allow controller 12 to appropriately detect the placement of the bowl, the pouring of 100 gf of water, the addition of 10 gf of soy sauce, and the addition of two teaspoons of salt.

In the example illustrated in FIG. 18, the zero reset is performed when the image is changed. In the example illustrated in FIG. 19, the zero reset is performed while the image is displayed. Here, the zero reset may be performed both when the image is changed and while the image is displayed.

Figure 20:
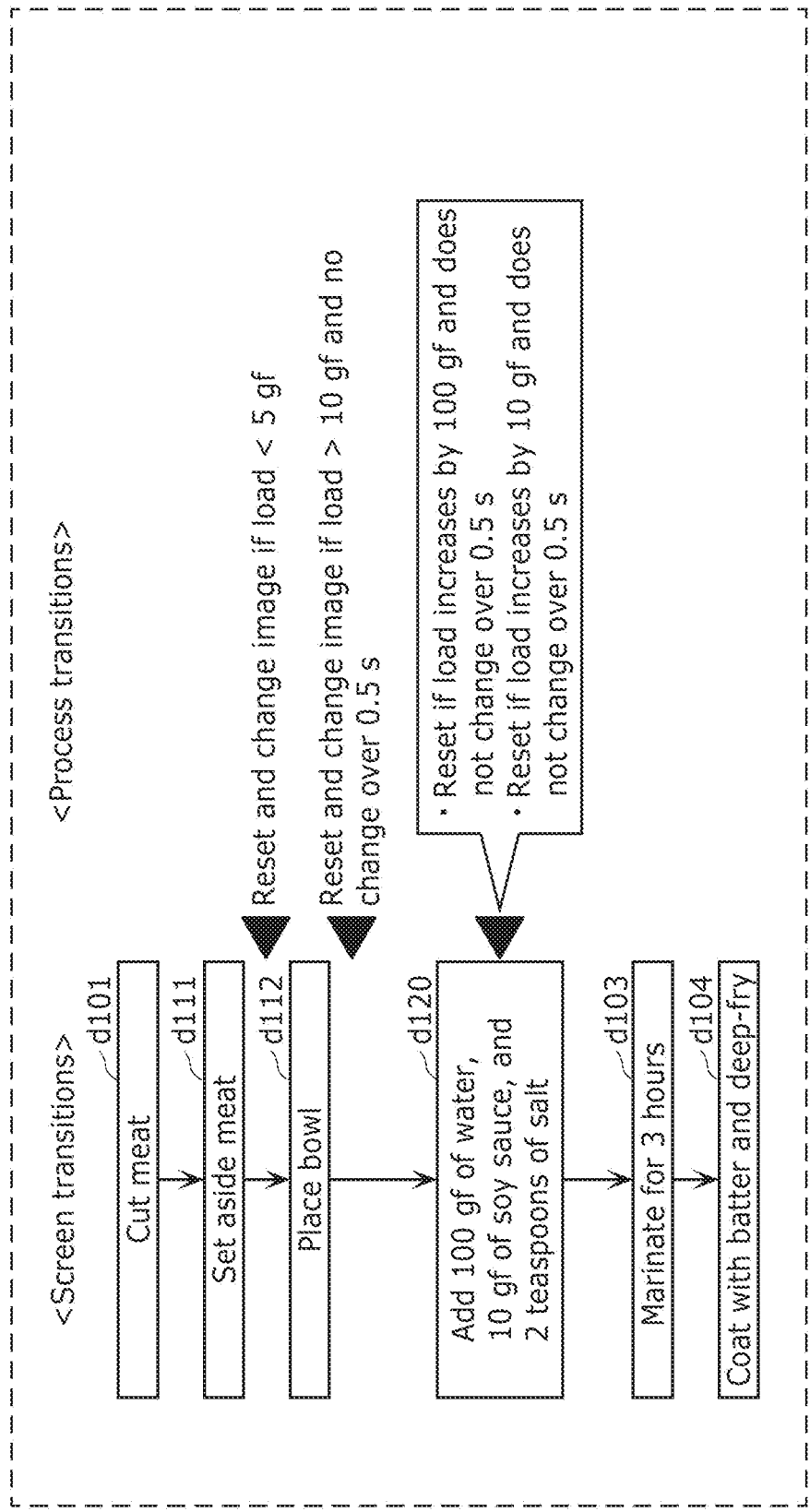
FIG. 20 illustrates another example of screen transitions of the output device and process transitions for making the dish "fried chicken", according to Embodiment 2.

FIG. 20 illustrates another example of screen transitions of output device 20 and process transitions for making the dish "fried chicken".

In the example illustrated in FIG. 20, controller 12 causes output device 20 to display image d120 including the descriptions of images d113 to d115 illustrated in FIG. 18, instead of displaying images d113 to d115. While image d120 is displayed, controller 12 performs the zero reset a plurality of times. More specifically, if the load derived from the pressure signal increases by 100 gf and does not change for 0.5 s or more, controller 12 performs the zero reset for a first time. Then, if the load increases by 10 gf and does not change for 0.5 s or more, controller 12 performs the zero reset for a second time.

Even in the example illustrated in FIG. 20, these zero resets also allow controller 12 to appropriately detect the placement of the bowl, the pouring of 100 gf of water, the addition of 10 gf of soy sauce, and the addition of two teaspoons of salt.

In this way, controller 12 according to the present embodiment causes output device 20 to display image d120 as a third image relating to a third cooking process in which a cooking operation is performed using cooking board 11, for example. While the third image is displayed, controller 12 performs the zero reset to set the numerical value indicated by the obtained pressure signal to 0 as a load when a change in the numerical value satisfies a predetermined condition. After this condition is satisfied, controller 12 converts the numerical value indicated by the obtained pressure signal to a load, with reference to 0 set as a numerical value of a load.

For example, in the third cooking process, a cooking operation to measure 100 gf of water on cooking board 11 and a cooking operation to measure 10 gf of soy sauce on cooking board 11 are performed. Image d120 as the third image helps the user to perform these cooking operations. While image d120 is outputted from output device 20, the user measures 100 gf of water and then 10 gf of soy sauce according to image d120. Here, if the predetermined condition is completion of measurement of water, the completion of the measurement of water is detected. After this, the zero reset is performed. In the example illustrated in FIG. 20, this completion condition is that the load derived from the pressure signal increases by 100 gf and does not change for 0.5 s or more. When 10 gf of soy sauce is measured on cooking board 11, the previously-measured water may be still on cooking board 11. Even in this case, 10 gf of soy sauce can be appropriately measured because the zero reset is performed after the completion of the measurement of water.

Here, the screen transitions for making the aforementioned dish "fried chicken" do not sequentially show images that helps the user to cut the ingredients. However, these images may be sequentially shown. Even in this case, controller 12 may perform the zero reset.

Figure 21:
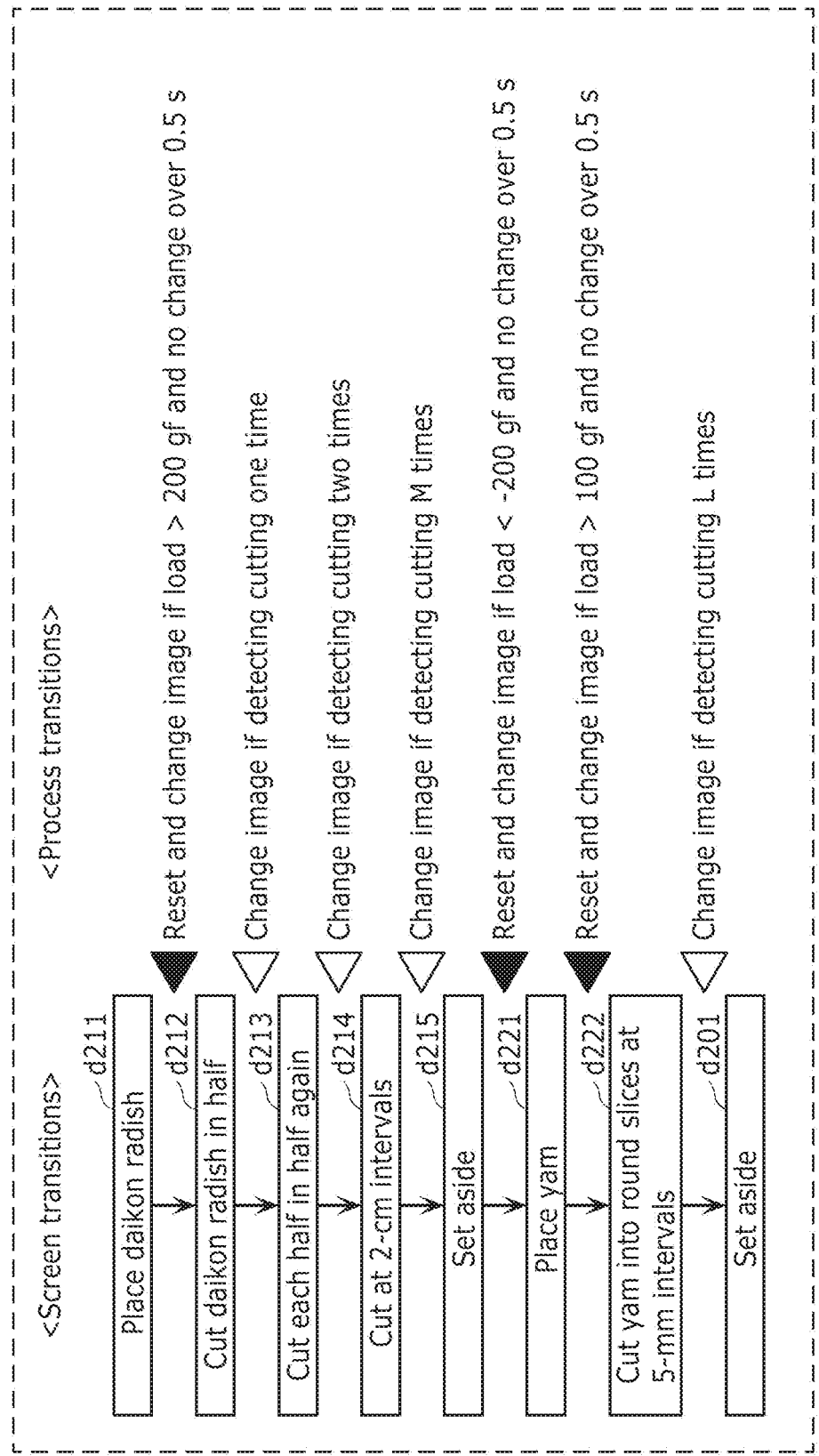
FIG. 21 illustrates an example of screen transitions of the output device and process transitions for making a dish by cutting an ingredient a plurality of times, according to Embodiment 2.

FIG. 21 illustrates an example of screen transitions of output device 20 and process transitions for making a dish by cutting an ingredient a plurality of times. Note that images d211 to d215, d221, d222, and d201 relate, respectively, to cooking processes 1 to 8 of cooking data of the aforementioned dish.

First, controller 12 causes output device 20 to display image d211 that helps the user to place a daikon radish for the dish on cooking board 11 according to the cooking data of the dish. Then, controller 12 changes image d211 displayed on output device 20 to image 212 and also performs the zero reset. Image d212 helps the user to cut the daikon radish in half on cooking board 11. To be more specific, if the load derived from the pressure signal exceeds 200 gf and does not change for 0.5 s or more for example, that is, if the placement of the daikon radish is completed, controller 12 performs the zero reset and then changes the image. This zero reset allows controller 12 to appropriately detect the cutting of the daikon radish in half in the subsequent cooking process.

Next, if detecting the cutting of the daikon radish one time on the basis of a change in the load, controller 12 changes image d212 displayed on output device 20 to d213. Image d213 helps the user to cut each half daikon radish in half again on cooking board 11.

Next, if detecting the cutting of the daikon radish two times on the basis of a change in the load, controller 12 changes image d213 displayed on output device 20 to image 214. Image d214 helps the user to further cut the cut daikon radish at 2-cm intervals. More specifically, the daikon radish is cut a plurality of times, into pieces with 2-cm thickness.

Next, if detecting the cutting of the daikon radish M times on the basis of a change in the load, controller 12 changes image d214 displayed on output device 20 to image d215. The value of M is a quotient obtained by dividing a standard length of a daikon radish stored in memory 14 by 2 cm. Controller 12 may calculate this value of M. Image d215 helps the user to set aside the pieces of daikon radish cut on cooking board 11.

Next, controller 12 changes image d215 displayed on output device 20 to image 221 and also performs the zero reset. Image d221 helps the user to place a yam on cooking board 11. To be more specific, if the load derived from the pressure signal is below −200 gf and does not change for 0.5 s or more for example, that is, if the setting-aside of the daikon radish is completed, controller 12 performs the zero reset and then changes the image. This zero reset allows controller 12 to appropriately detect the placement of the yam in the subsequent cooking process.

Next, controller 12 changes image d221 displayed on output device 20 to image 222 and also performs the zero reset. Image d222 helps the user to cut the yam placed on cooking board 11 into round slices at 5-mm intervals. By this operation, the yam is cut a plurality of times, into round slices of 5-mm thickness. To be more specific, if the load derived from the pressure signal exceeds 100 gf and does not change for 0.5 s or more for example, that is, if the placement of the yam is completed, controller 12 performs the zero reset and then changes the image. This zero reset allows controller 12 to appropriately detect the cutting of the yam into the round slices in the subsequent cooking process.

Next, if detecting the cutting of the yam L times (where L is an integer greater than or equal to 1) on the basis of a change in the load, controller 12 changes image d222 displayed on output device 20 to image d201. The value of L is a quotient obtained by dividing a standard length of a yam stored in memory 14 by 5 mm. Controller 12 may calculate this value of L. Image d201 helps the user to set aside the round slices of yam cut on cooking board 11.

In the example illustrated in FIG. 21, the zero reset is performed when the image is changed as described. Thus, while the user is helped to perform the operations in the cooking processes with high accuracy using the images before and after the change, the zero reset is appropriately performed during an interval between the operations.

In the example illustrated in FIG. 21, the zero reset is performed when the image is changed. However, the zero reset may be performed while the image is displayed, instead of when the image is changed.

Figure 22:
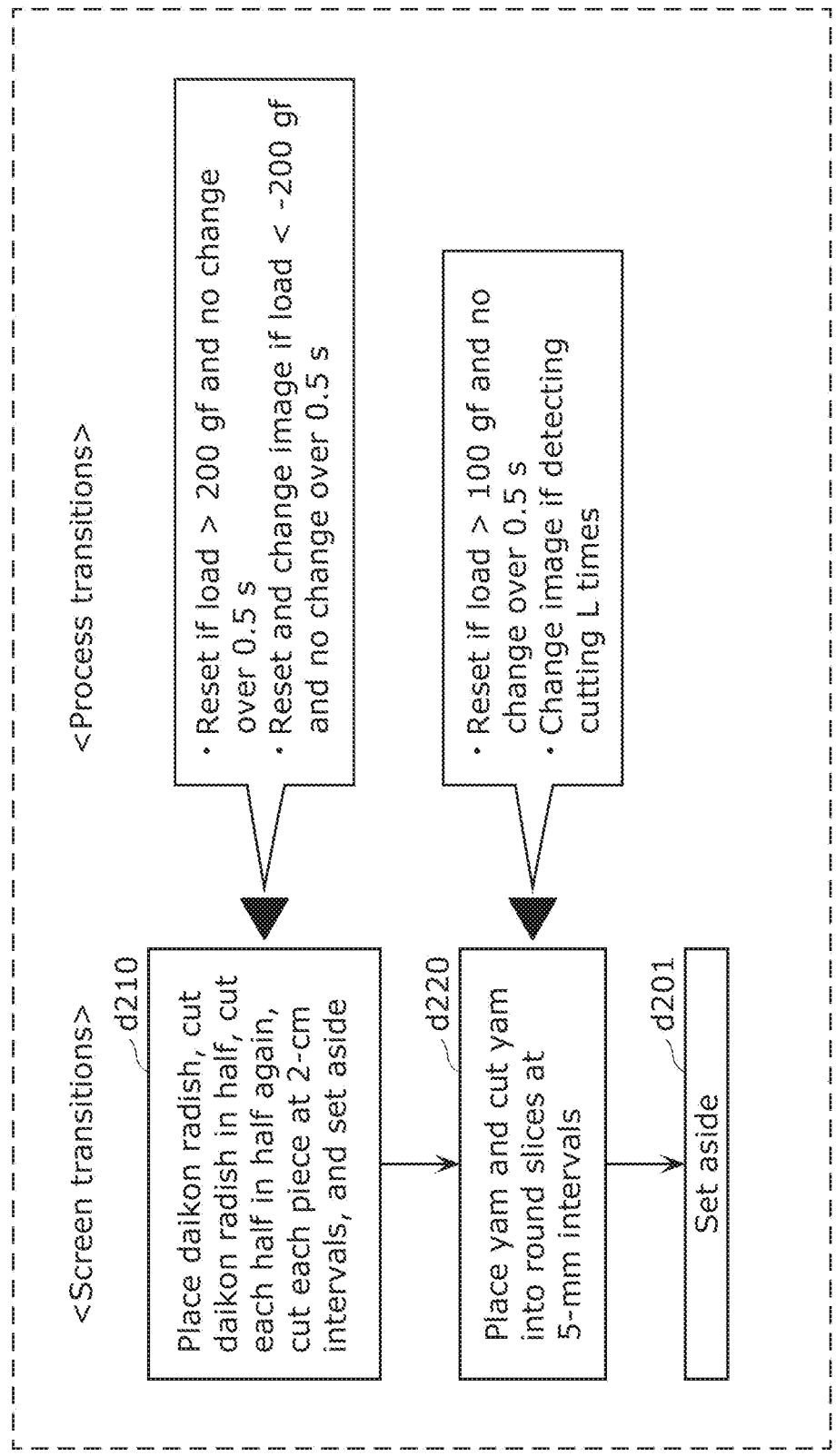
FIG. 22 illustrates another example of screen transitions of the output device and process transitions for making a dish by cutting an ingredient a plurality of times, according to Embodiment 2.

FIG. 22 illustrates another example of screen transitions of output device 20 and process transitions for making a dish by cutting an ingredient a plurality of times.

In the example illustrated in FIG. 22, controller 12 causes output device 20 to display image d210 including the descriptions of images d211 to d215 illustrated in FIG. 21, instead of displaying images d211 to d215. While image d210 is displayed, controller 12 performs the zero reset a plurality of times. More specifically, if the load derived from the pressure signal exceeds 200 gf and does not change for 0.5 s or more, controller 12 performs the zero reset for a first time. After this, if the load derived from the pressure signal is below −200 gf and does not change for 0.5 s or more, controller 12 performs the zero reset for a second time. Then, controller 12 changes image d210 displayed on output device 20 to image d220.

For example, the user watches image d210 displayed on output device 20 and then performs the operations indicated in image d210. More specifically, the user places the daikon radish on cooking board 11, cuts the daikon radish in half, cuts each half daikon radish in half again, cuts this half daikon radish at 2-cm intervals, and sets aside the cut pieces of daikon radish. Based on the assumption that the user performs these operations, controller 12 determines that the placement of the daikon radish is completed if the load exceeds 200 gf and does not change for 0.5 s or more. Thus, controller 12 performs the zero reset for the first time. Then, if the load is below −200 gf and does not change for 0.5 s or more, controller 12 determines that the setting-aside of the cut pieces of daikon radish is completed and thus performs the zero reset for the second time. These zero resets allow controller 12 to appropriately detect the cutting of the daikon radish and also appropriately detect the placement of the yam in the subsequent cooking process.

Image d220 includes the descriptions of images d221 and d222 illustrated in FIG. 21, and is displayed on output device 20 instead of images d221 and d222. While image d220 is displayed, controller 12 performs the zero reset if the load derived from the pressure signal exceeds 100 gf and does not change for 0.5 s or more. More specifically, if the load exceeds 100 gf and does not change for 0.5 s or more, controller 12 determines that the placement of the yam is completed and thus performs the zero reset. After this, if detecting the cutting of the yam L times on the basis of a change in the load, controller 12 changes image d220 displayed on output device 20 to image d201. This zero reset allows controller 12 to appropriately detect the cutting of the yam.

In the example illustrated in FIG. 21, the zero reset is performed when the image is changed. In the example illustrated in FIG. 22, the zero reset is performed while the image is displayed. Here, the zero reset may be performed both when the image is changed and while the image is displayed.

Figure 23:
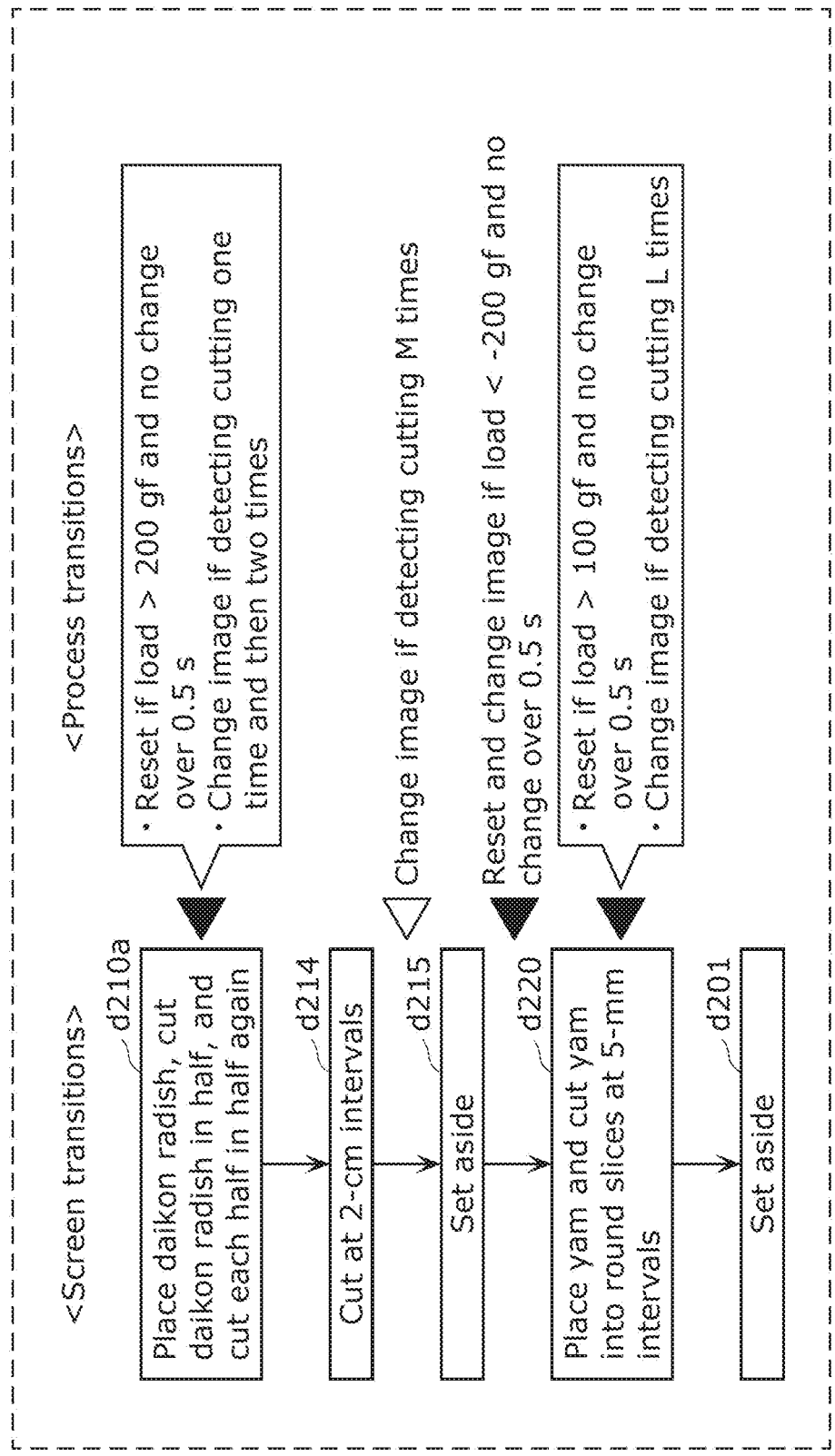
FIG. 23 illustrates another example of screen transitions of the output device and process transitions for making a dish by cutting an ingredient a plurality of times, according to Embodiment 2.

FIG. 23 illustrates another example of screen transitions of output device 20 and process transitions for making a dish by cutting an ingredient a plurality of times.

In the example illustrated in FIG. 23, controller 12 causes output device 20 to display image d210a including the descriptions of images d211 to d213 illustrated in FIG. 21, instead of displaying images d211 to d213. While image d210a is displayed, controller 12 performs the zero reset if the load derived from the pressure signal exceeds 200 gf and does not change for 0.5 s or more. This allows controller 12 to appropriately detect the subsequent cutting of the daikon radish. If detecting the cutting of the daikon radish one time and then detecting the cutting two times on the basis of changes in the load, controller 12 changes image d210a displayed on output device 20 to image d214.

Figure 24A:
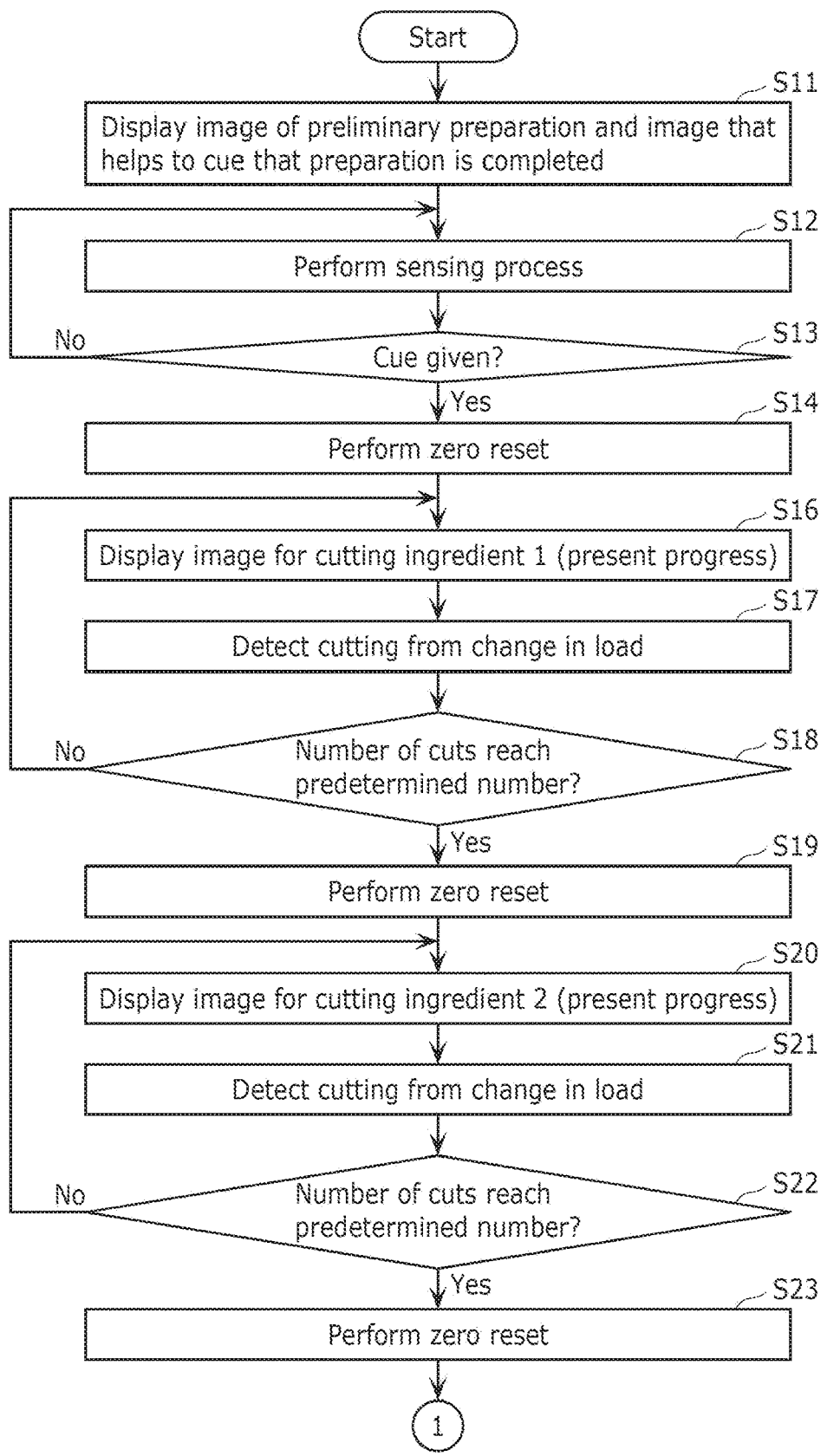
FIG. 24A is a flowchart illustrating a processing operation performed by a controller according to Embodiment 2.
Figure 24B:
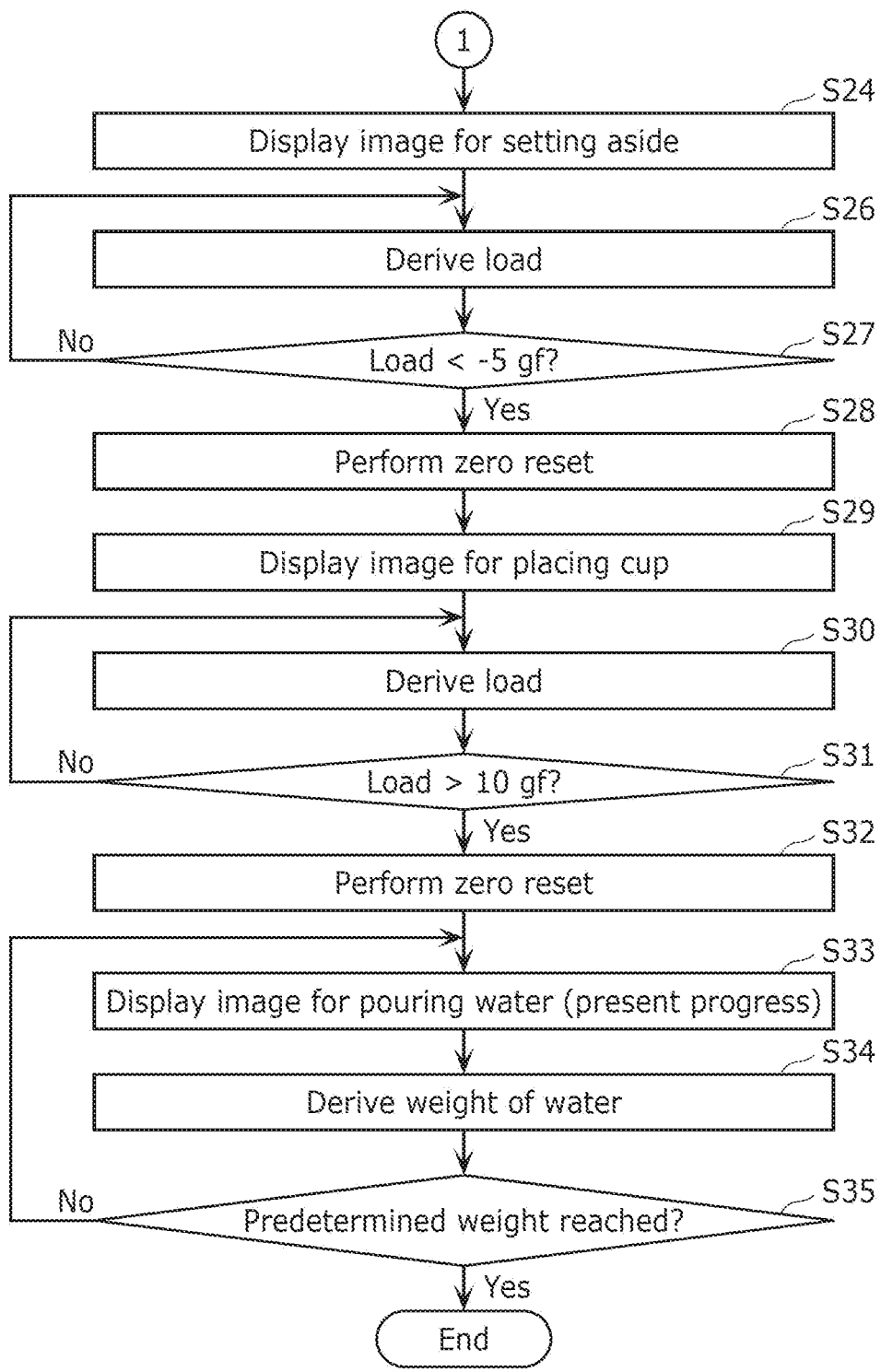
FIG. 24B is a flowchart illustrating a processing operation performed by the controller according to Embodiment 2.

Each of FIG. 24A and FIG. 24B is a flowchart illustrating a processing operation performed by controller 12 according to the present embodiment. The flowcharts in FIG. 24A and FIG. 24B illustrate the processing operation performed until images d1 to d7 in FIG. 17 are displayed.

(Step S11)

First, controller 12 causes output device 20 to display image d1 of the preliminary preparation and image d2 that helps the user to cue that the preliminary preparation is completed (Step S12)

Next, controller 12 receives a pressure signal from first sensor 13 and performs a sensing process based on this pressure signal.

(Step S13)

Next, controller 12 determines, by the sensing process in Step S13, whether the user gives a cue. For example, if a pattern of change in the load derived from the pressure signal matches a predetermined pattern, controller 12 determines that the user gives the cue. Here, if determining that the user does not give the cue (No in Step S13), controller 12 executes the processing from Step S12 again.

(Step S14)

In contrast, if determining in Step S13 that the user gives the cue (Yes in Step S13), controller 12 performs the zero reset.

(Step S16)

Then, controller 12 causes output device 20 to display image d3 that helps the user to cut ingredient 1. At this time, controller 12 may cause the progress bar, for instance, to be displayed to indicate the progress of the operation, as illustrated in (b) of FIG. 10.

(Step S17)

Next, controller 12 detects the cutting of ingredient 1 on the basis of a change in the load derived from the pressure signal.

(Step S18)

Next, controller 12 determines whether the number of detected cuts reaches a number predetermined for the cutting process of ingredient 1. Here, if determining that the number of detected cuts does not reach the predetermined number (No in Step S18), controller 12 proceeds to perform the processing from Step S16.

(Step S19)

In contrast, if determining in Step S18 that the number of detected cuts reaches the predetermined number (Yes in Step S18), controller 12 performs the zero reset.

(Step S20)

Then, controller 12 causes output device 20 to display image d4 that helps the user to cut ingredient 2. At this time, controller 12 may cause the progress bar, for instance, to be displayed to indicate the progress of the operation, as illustrated in (b) of FIG. 10.

(Step S21)

Next, controller 12 detects the cutting of ingredient 2 on the basis of a change in the load derived from the pressure signal.

(Step S22)

Next, controller 12 determines whether the number of detected cuts reaches a number predetermined for the cutting process of ingredient 2. Here, if determining that the number of detected cuts does not reach the predetermined number (No in Step S22), controller 12 proceeds to perform the processing from Step S20.

(Step S23)

In contrast, if determining in Step S22 that the number of detected cuts reaches the predetermined number (Yes in Step S22), controller 12 performs the zero reset.

(Step S24)

Then, controller 12 causes output device 20 to display image d5 that helps the user to set aside ingredients 1 and 2 placed on cooking board 11, as illustrated in FIG. 24B.

(Step S26)

Next, controller 12 derives the load on cooking board 11 by performing the aforementioned sensing process.

(Step S27)

Next, controller 12 determines whether the load derived in Step S26 is below −5 gf. If determining that the load is not below −5 gf (No in Step S26), controller 12 performs the processing from Step S26 again.

(Step S28)

In contrast, if determining in Step S27 that the load is below −5 gf (Yes in Step S27), controller 12 performs the zero reset.

(Step S29)

Then, controller 12 causes output device 20 to display image d6 that helps the user to place the cup on cooking board 11.

(Step S30)

Next, controller 12 derives the load on cooking board 11 by performing the aforementioned sensing process.

(Step S31)

Next, controller 12 determines whether the load derived in Step S30 exceeds 10 gf. If determining that the load does not exceed 10 gf (No in Step S31), controller 12 performs the processing from Step S30 again.

(Step S32)

In contrast, if determining in Step S31 that the load exceeds 10 gf (Yes in Step S31), controller 12 performs the zero reset.

(Step S33)

Then, controller 12 causes output device 20 to display image d7 that helps the user to pour 100 gf of water into the cup placed on cooking board 11. At this time, controller 12 may cause the progress ring, for instance, to be displayed to indicate the progress of the operation, as illustrated in (c) of FIG. 10.

(Step S34)

Next, controller 12 derives the weight of the water in the cup by performing the aforementioned sensing process.

(Step S35)

Next, controller 12 determines whether the weight of the water derived in Step S34 reaches a weight predetermined for the preparation process in which the water is poured into the cup. If determining that the weight of the water does not reach the predetermined weight (No in Step S35), controller 12 performs the processing from Step S33 again. In contrast, if determining in Step S35 that the weight of the water reaches the predetermined weight (Yes in Step S35), controller 12 ends the processing.

[Summary of Embodiment 2]

As described thus far, cooking assistance system 100 according to the present embodiment performs the zero reset when the image is changed. More specifically, controller 12 according to the present embodiment performs the processing illustrated in FIG. 25.

Figure 25:
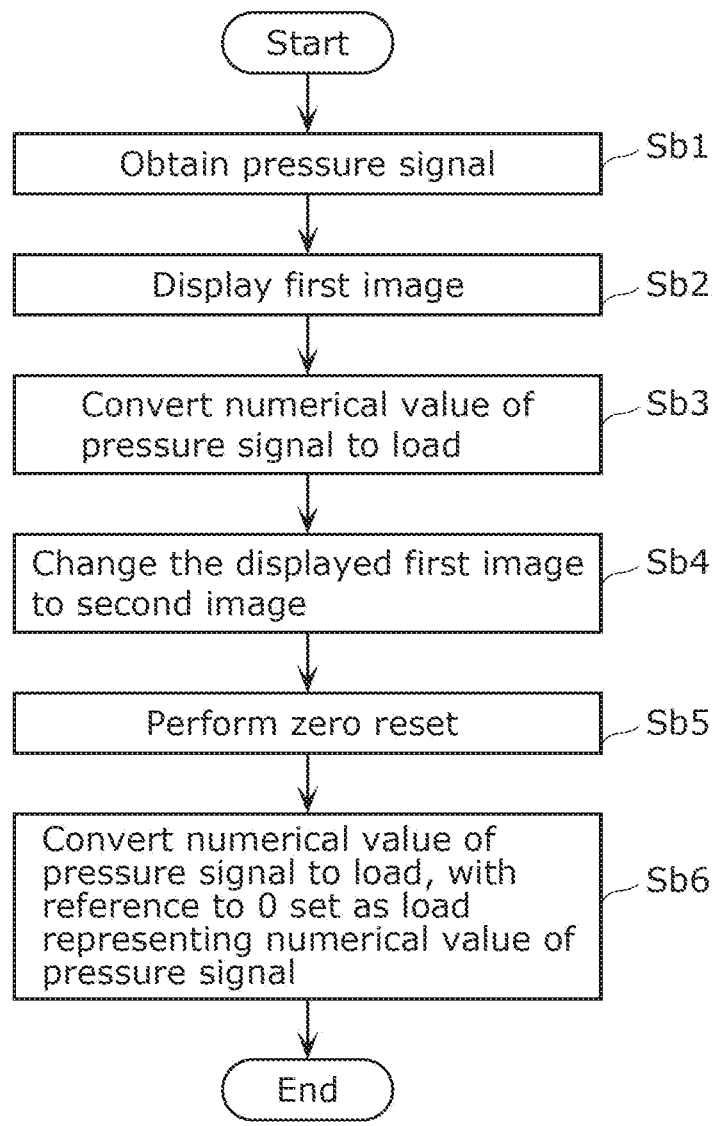
FIG. 25 is a flowchart illustrating a processing operation performed by the controller to execute zero reset, according to Embodiment 2.

FIG. 25 is a flowchart illustrating a processing operation performed by controller 12 to execute the zero reset according to the present embodiment.

(Step Sb1)

First, controller 12 continuously obtains, from first sensor 13, a pressure signal indicating a numerical value varying depending on a load on cooking board 11.

(Step Sb2)

Next, controller 12 causes output device 20 to display the first image relating to the first cooking process in which a cooking operation is performed using cooking board 11.

(Step Sb3)

Next, while the first image is displayed, controller 12 converts the numerical value indicated by the obtained pressure signal to a load.

(Step Sb4)

Next, controller 12 changes the first image displayed on output device 20 to the second image relating to the second cooking process in which a cooking operation different from the first cooking process is performed using cooking board 11. For example, controller 12 changes the first image to the second image on the basis of the pressure signal obtained using cooking board 11.

(Step Sb5)

Controller 12 performs the zero reset to set, to 0 as a load, the numerical value indicated by the pressure signal obtained when the first image is changed to the second image.

(Step Sb6)

Then, while the second image is displayed, controller 12 converts the numerical value indicated by the obtained pressure signal to a load, with reference to 0 set as a numerical value of a load.

In this way, the user of output device 20 performs the cooking operation of the first cooking process according to the first image outputted by output device 20 for example. Then, the load on cooking board 11 in response to this cooking operation is derived. Thus, the result of the cooking operation of the first cooking process can be determined on the basis of the load. After the first image is changed to the second image, the user performs the cooking operation of the second cooking process according to the second image. Then, the load on cooking board 11 in response to this cooking operation is derived. Thus, the result of the cooking operation of the second cooking process can also be determined on the basis of the load. Moreover, the zero reset is performed when the image is changed from the first image to the second image. This reduces the influence caused, by the cooking operation of the first cooking process, to the load derived in the second cooking process. As a result, the accuracy of the load derived in the second cooking process increases. Thus, the result of the cooking operation performed in the second cooking process can be appropriately determined. Moreover, the zero reset is performed when the image is changed. Thus, while helping the user to perform the operations in the cooking processes with high accuracy using the images before and after the change, the zero reset is appropriately performed during an interval between the cooking operations. Hence, the cooking assistance can be appropriately provided.

For example, in the first cooking process, a cooking operation to place an ingredient on cooking board 11 is performed. In the second cooking process, a cooking operation to cut the ingredient on cooking board 11 is performed.

In this case, before the ingredient is cut on cooking board 11 in the second cooking process, the zero reset is performed in advance. Thus, the cutting of the ingredient can be appropriately detected as a result of the cooking operation in the second cooking process, on the basis of the load on cooking board 11, for example.

Moreover, in the first cooking process, a cooking operation to measure the weight of a first cooking substance on cooking board 11 is performed. In the second cooking process, a cooking operation to measure the weight of a second cooking substance on cooking board 11 is performed.

In this case, before the weight of the second cooling substance is measured on cooking board 11 in the second cooking process, the zero reset is performed in advance even if the first cooking substance measured in the first cooking process is still on cooking board 11. Thus, the weight of the second cooking substance can be appropriately measured as a result of the cooking operation of the second cooking process.

Moreover, in the first cooking process, a cooking operation to place a container into which an ingredient or a cooking substance is to be put is performed. In the second cooking process, a cooking operation to measure the weight of the ingredient or cooking substance is performed while this ingredient or cooking substance is being put into the container placed on cooking board 11.

In this case, before the weight is measured in the second cooking process, the zero reset is performed in advance even if the container placed in the first cooking process is still on cooking board 11. Thus, the weight of the ingredient for instance can be appropriately measured as a result of the cooking operation of the second cooking process.

Furthermore, in the first cooking process, a cooking operation to cut the ingredient on cooking board 11 is performed. In the second cooking process, a cooking operation to measure the weight of the ingredient, container, or cooking substance on cooking board 11 is performed.

In this case, before the weight is measured in the second cooking process, the zero reset is performed in advance even if the ingredient cut in the first cooking process is still on cooking board 11. Thus, the weight of the ingredient for instance can be appropriately measured as a result of the cooking operation of the second cooking process.

Moreover, in the first cooking process, a cooking operation to set aside the ingredient or container that is placed on cooking board is performed. In the second cooking process, a cooking operation to cut the ingredient on cooking board 11 or to measure the weight of the ingredient, container, or cooking substance on cooking board 11 is performed.

In this case, before the ingredient is cut or measured in the second cooking process, the zero reset is performed in advance even if the ingredient that was to be set aside in the first cooking process is still on cooking board 11. Thus, the cutting of the ingredient can be appropriately detected or the weight can be appropriately measured, as a result of the cooking operation of the second cooking process.

Embodiment 3

Controller 12 of cooking assistance system 100 according to the present embodiment also changes a measurement mode when changing the image displayed on output device 20. In the measurement mode, a load on cooking board 11 is measured. In the present embodiment, any numerical value representing a load or time for instance is merely an example and thus may be any different numerical value.

Figure 26:
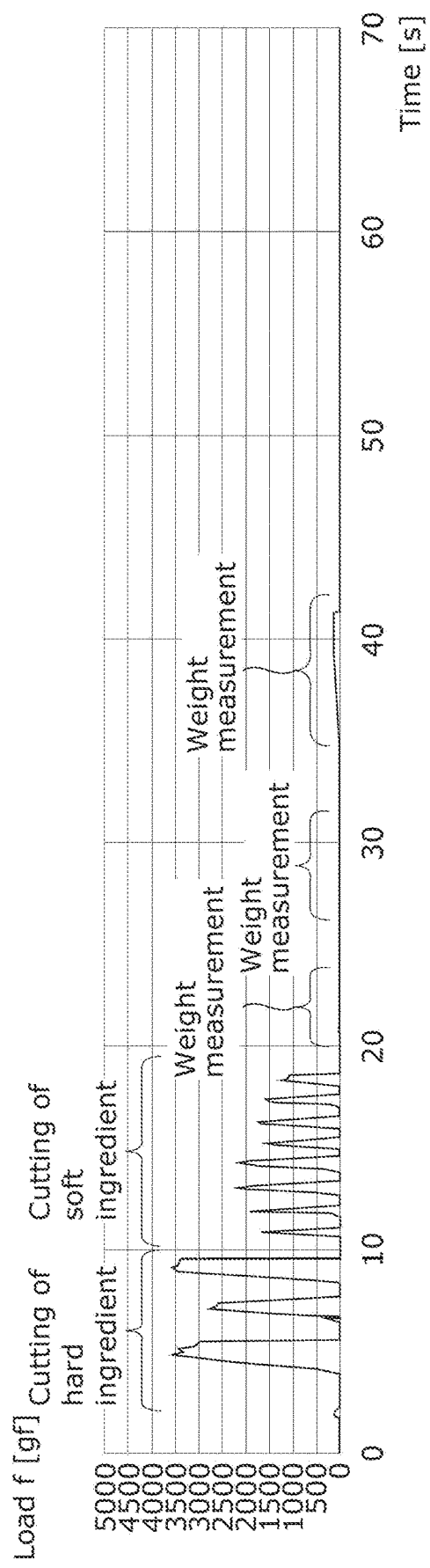
FIG. 26 illustrates change in load on a cooking board when a hard ingredient is cut, when a soft ingredient is cut, and when a weight of an ingredient is measured.

FIG. 26 illustrates change in load on cooking board 11 when a hard ingredient is cut, when a soft ingredient is cut, and when a weight of a cooking substance is measured. In a graph of FIG. 26, the horizontal axis represents time [s] whereas the vertical axis represents load f [gf].

As illustrated in FIG. 26, a greater load is placed on cooking board 11 when a hard or soft ingredient is cut on cooking board 11 as compared to when a weight of a cooking condiment is measured on cooking board 11.

Moreover, an amount of change per unit time in the load on cooking board 11 is greater when a hard or soft ingredient is cut on cooking board 11 as compared to when a weight of a cooking condiment is measured on cooking board 11.

Thus, to appropriately detect the cutting of the hard or soft ingredient, a wide load range is to be used. In contrast, to appropriately measure the weight of the cooking substance, the wide load range is not to be used.

Note that the load range refers to a difference between a maximum value and a minimum value calculated on the basis of pressure signals from first sensor 13.

To appropriately detect the cutting of the hard or soft ingredient, a low load resolution at which a small change in the load is detected is not to be used. However, to appropriately measure the weight of the cooking substance in detail, the low load resolution is to be used.

Note that the load resolution is not simply theoretical and refers to a minimum amount of change identifiable as a load. Here, the theoretical load resolution refers to a value obtained by dividing an output load range (0 kgf to 2 kgf, for example) by the number of bits for AD conversion (24 bits, for example).

More specifically, a high load resolution has the same meaning as a high stability of the output load value obtained while the same load is continuously placed. For example, moving average performed on an output value of a load obtained in a process increases the stability of the output value while the same load is continuously placed. More specifically, the moving average performed on the output value can also increase the load resolution.

Moreover, to appropriately detect the cutting of the hard or soft ingredient, a change in load caused in a short time is to be detected. For example, if the soft ingredient is cut after the hard ingredient is cut, a practicable short temporal resolution is to be used. In contrast, to appropriately measure the weight of the cooking substance, such short temporal resolution is not to be used.

Note that the temporal resolution refers not only to a sampling period for obtaining a value of a pressure signal received from first sensor 13, but also to a minimum sampling period for obtaining a value of a pressure signal used to calculate the load. During this sampling period, load smoothing may be performed.

More specifically, even if periods during which the pressure signals are outputted from first sensor 13 are the same, the temporal resolution can be increased by increasing a smoothing time for outputting a measurement value. In this case, although the temporal resolution is increased, the aforementioned load resolution can be accordingly increased.

Thus, controller 12 according to the present embodiment uses a different load change, a different load resolution, and a different temporal resolution for each of cases where the cutting of the ingredient is to be detected and where the weight of the cooking substance is to be measured. More specifically, controller 12 changes the load measurement mode including the load range, the load resolution, and the temporal resolution, between a cut measurement mode and a weight measurement mode.

A load on cooking board 11 and an amount of change in the load per unit time are greater when a hard ingredient is cut on cooking board 11 as compared to when a soft ingredient is cut. Thus, controller 12 according to the present embodiment may also use a different load change, a different load resolution, and a different temporal resolution for each of cases where the cutting of the hard ingredient is to be detected and where the cutting of the soft ingredient is to be detected. More specifically, controller 12 may change the load measurement mode among a hard-ingredient cut measurement mode, a soft-ingredient cut measurement mode, and a weight measurement mode. Hereinafter, the hard-ingredient cut measurement mode is referred to as a first cut measurement mode whereas the soft-ingredient cut measurement mode is referred to as a second cut measurement mode.

A larger ingredient is harder and a smaller ingredient is softer even though both of these ingredients are the same food item. On this account, a change in load when a hard ingredient is cut has the same characteristics as a change in load when a large ingredient is cut. Similarly, a change in load when a soft ingredient is cut has the same characteristics as a change in load when a small ingredient is cut. Thus, the first cut measurement mode may be used in a cooking process in which a large ingredient is cut. The second cut measurement mode may be used in a cooking process in which a small ingredient is cut.

Note that, although not illustrated, the load measurement mode may be changed if a cooking process of measuring a heavy ingredient and a cooking process of measuring a light ingredient are performed in a row. For example, a process of measuring 100 g of water and a process of measuring 2 g of a seasoning may be performed. In this case, these two processes may be different in at least one of the intended load resolution or the intended temporal resolution. Even so, both of these processes can be satisfactorily performed using the single sensor.

FIG. 27 illustrates a comparison of the load range, the load resolution, and the temporal resolution among the measurement modes.

The first cut measurement mode has the widest load range, followed by the second cut measurement mode. The weight measurement mode has a narrower load range than any other measurement mode.

The first cut measurement mode has the highest load resolution, followed by the second cut measurement mode. The weight measurement mode has a lower load resolution than any other measurement mode.

The first cut measurement mode has the shortest temporal resolution, followed by the second cut measurement mode. The weight measurement mode has a longer temporal resolution than any other measurement mode.

Figure 28:
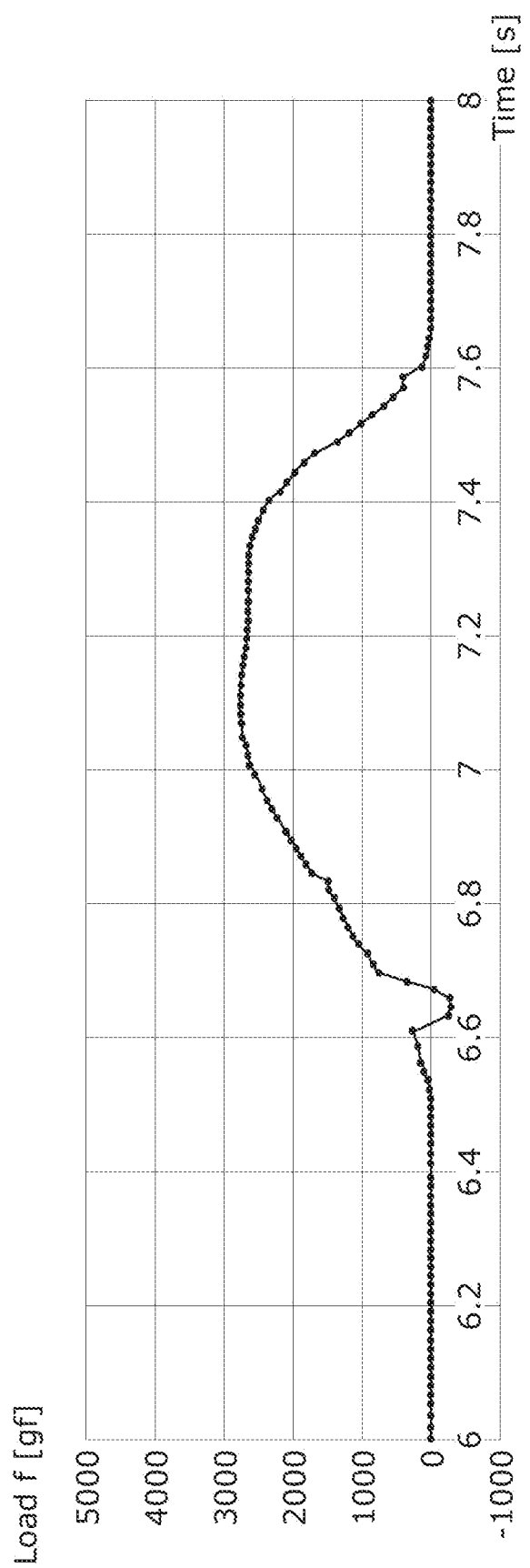
FIG. 28 illustrates change in load measured when a hard ingredient is cut in a first cut measurement mode according to Embodiment 3.

FIG. 28 illustrates change in load measured when a hard ingredient is cut in the first cut measurement mode. In a graph of FIG. 28, the horizontal axis represents time [s] whereas the vertical axis represents load f [gf].

As illustrated in FIG. 28, the load range is 0 gf to 5000 gf and the temporal resolution is 1/50 seconds or less, for example. This allows controller 12 to appropriately measure the load placed by the cutting and also increases the accuracy of detecting the cutting. Although not illustrated, the load resolution at this time is about 1 gf. This first cut measurement mode does not have a load resolution adequate to measure, for instance, a seasoning that requires finer accuracy.

Figure 29:
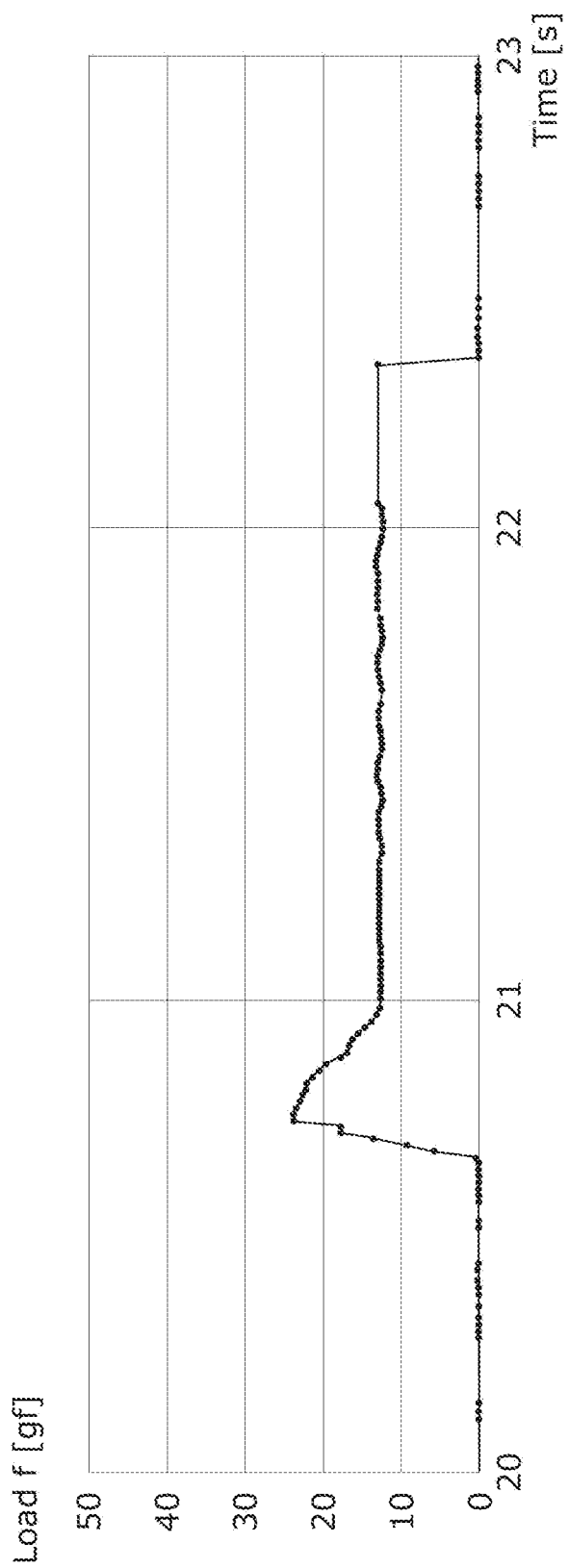
FIG. 29 illustrates change in, for example, a weight of water measured in a weight measurement mode, according to Embodiment 3.

FIG. 29 illustrates change in the weight of water measured in the weight measurement mode, for example. In a graph of FIG. 29, the horizontal axis represents time [s] whereas the vertical axis represents load f [gf].

As illustrated in FIG. 29, the load range is 0 gf to 50 gf and the load resolution is 0.5 gf or less, for example.

This allows controller 12 to appropriately measure the change in the weight of water and also increases the accuracy of the weight to be measured. For example, the weight of water can be accurately measured within a period from 21 seconds to 22 seconds illustrated in FIG. 29.

Note that, in this example, a gain of the pressure signal from first sensor 13 is greater in the weight measurement mode than in the first cut measurement mode and the second cut measurement mode. This enables a finer load resolution.

Note that the gain may be changed according to a method of changing a signal to be sent to a converter that converts an analog signal from first sensor 13 into a digital signal.

The load resolution may be made finer by making the temporal resolution coarser. The temporal resolution may be changed according to a method of changing a signal to be sent to a converter that converts an analog signal from first sensor 13 into a digital signal. Alternatively, the smoothing time for outputting the load measurement value may be changed without changing the signal period of first sensor 13.

Figure 30:
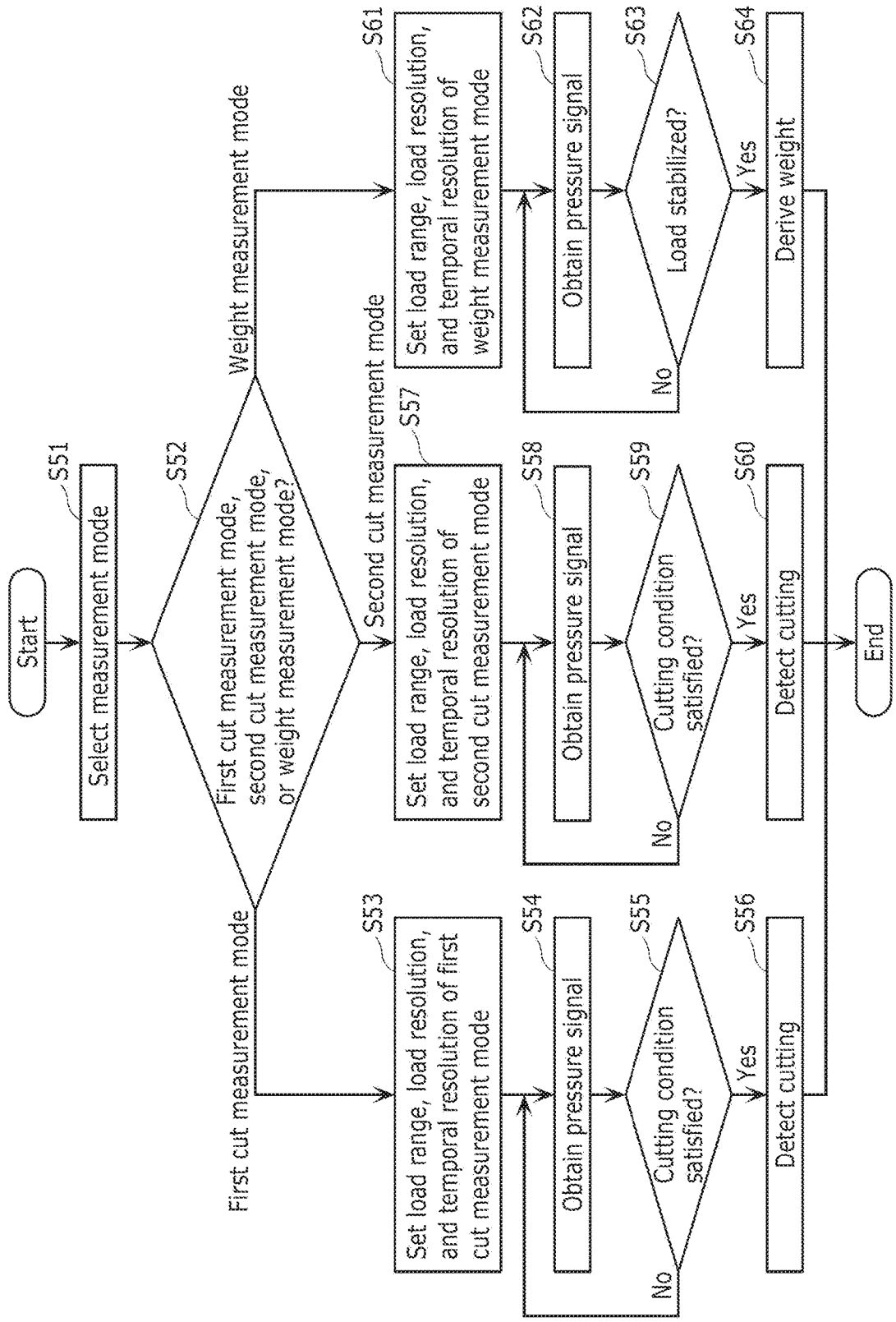
FIG. 30 is a flowchart illustrating a processing operation performed by a controller to change the measurement mode, according to Embodiment 3.

FIG. 30 is a flowchart illustrating a processing operation performed by controller 12 to change the measurement mode.

(Step S51)

First, controller 12 selects the measurement mode corresponding to an operation performed by the user according to an image displayed on output device 20.

(Step S52)

Next, controller 12 determines which one of the first cut measurement mode, the second cut measurement mode, and the weight measurement mode is the selected measurement mode.

(Step S53)

If determining in Step S52 that the first cut measurement mode is the selected measurement mode (First cut measurement mode in Step S52), controller 12 sets the load range, the load resolution, the temporal resolution of the first cut measurement mode as those used to represent the change in the load on cooking board 11.

(Step S54)

Then, controller 12 obtains the pressure signal from first sensor 13.

(Step S55)

Controller 12 derives the load on cooking board 11 from this pressure signal, and determines whether a change in the load satisfies the cutting condition. If determining that the change in the load does not satisfy the cutting condition (No in Step S55), controller 12 performs the processing from Step S54 again.

(Step S56)

In contrast, if determining in Step S55 that the change in the load satisfies the cutting condition (Yes in Step S55), controller 12 detects the cutting of the ingredient.

(Step S57)

If determining in Step S52 that the second cut measurement mode is the selected measurement mode (Second cut measurement mode in Step S52), controller 12 sets the load range, the load resolution, the temporal resolution of the second cut measurement mode as those used to represent the change in the load on cooking board 11.

(Step S58)

Then, controller 12 obtains the pressure signal from first sensor 13.

(Step S59)

Controller 12 derives the load on cooking board 11 from this pressure signal, and determines whether a change in the load satisfies the cutting condition. If determining that the change in the load does not satisfy the cutting condition (No in Step S59), controller 12 performs the processing from Step S58 again.

(Step S60)

In contrast, if determining in Step S59 that the change in the load satisfies the cutting condition (Yes in Step S59), controller 12 detects the cutting of the ingredient.
(Step S61)

If determining in Step S52 that the weight measurement mode is the selected measurement mode (Weight measurement mode in Step S52), controller 12 sets the load range, the load resolution, the temporal resolution of the weight measurement mode as those used to represent the change in the load on cooking board 11.
(Step S62)

Then, controller 12 obtains the pressure signal from first sensor 13.
(Step S63)

Controller 12 derives the load on cooking board 11 from this pressure signal, and determines whether the load stabilizes. For example, if the change in the load stays within a predetermined range (within 0.5 gf, for example) for a given time, controller 12 determines that the load stabilizes. If determining that the load does not stabilize (No in Step S63), controller 12 performs the processing from Step S62 again.
(Step S64)

In contrast, if determining that the load stabilizes (Yes in Step S63), controller 12 derives the weight of the ingredient. More specifically, this stable load is derived as the weight of the ingredient, for example.

Controller 12 may use a different cutting condition for each of the first cut measurement mode and the second cut measurement mode. More specifically, controller 12 may change the cutting condition when changing the image displayed on output device 20. For example, the cutting condition is changed when the image relating to the cooking process of cutting a hard ingredient is changed to the image relating to the cooking process of cutting a soft ingredient. Similarly, the cutting condition is changed when the image relating to the cooking process of cutting a large ingredient is changed to the image relating to the cooking process of cutting a small ingredient. For example, thresholds th and fh used in the cutting condition illustrated in FIG. 4 are greater in the first cut measurement mode than in the second cut measurement mode.

Figure 31:
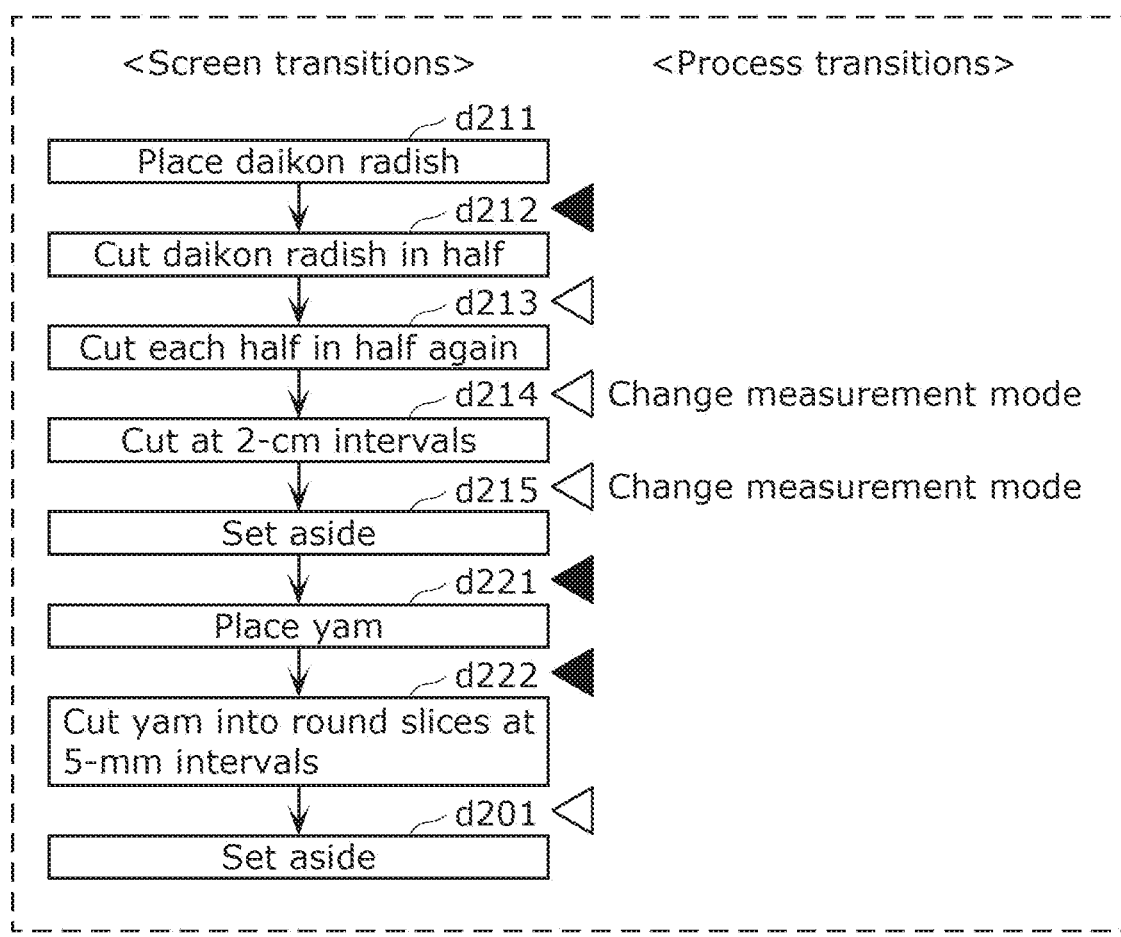
FIG. 31 illustrates an example of screen transitions of an output device and process transitions, according to Embodiment 3.

FIG. 31 illustrates an example of screen transitions of output device 20 and process transitions. In the example illustrated in FIG. 31, the process of changing the measurement mode is added to the screen transitions and the progress transitions illustrated in FIG. 21.

Controller 12 changes the measurement mode when changing image d213 displayed on output device 20 to image d214. For example, controller 12 changes the first cut measurement mode to the second cut measurement mode. This allows the subsequent cutting of the daikon radish at 2-cm intervals to be appropriately detected.

Moreover, controller 12 changes the measurement mode when changing image d214 displayed on output device 20 to image d215. For example, controller 12 changes the second cut measurement mode to the first cut measurement mode. This allows the subsequent placement of the yam and the subsequent cutting of the yam into round slices at 2-cm intervals to be appropriately detected.

In the example illustrated in FIG. 31, the measurement mode is changed when the image is changed. Thus, while helping the user to perform the cooking operations in the cooking processes with high accuracy using the images before and after the change, controller 12 appropriately changes the measurement mode during an interval between the cooking operations.

Note that the timing of changing the measurement mode illustrated in FIG. 31 is merely an example and thus the measurement mode may be changed at different timing. Note also that the measurement mode may be changed between the weight measurement mode and either of the first and second cut measurement modes.

Figure 32:
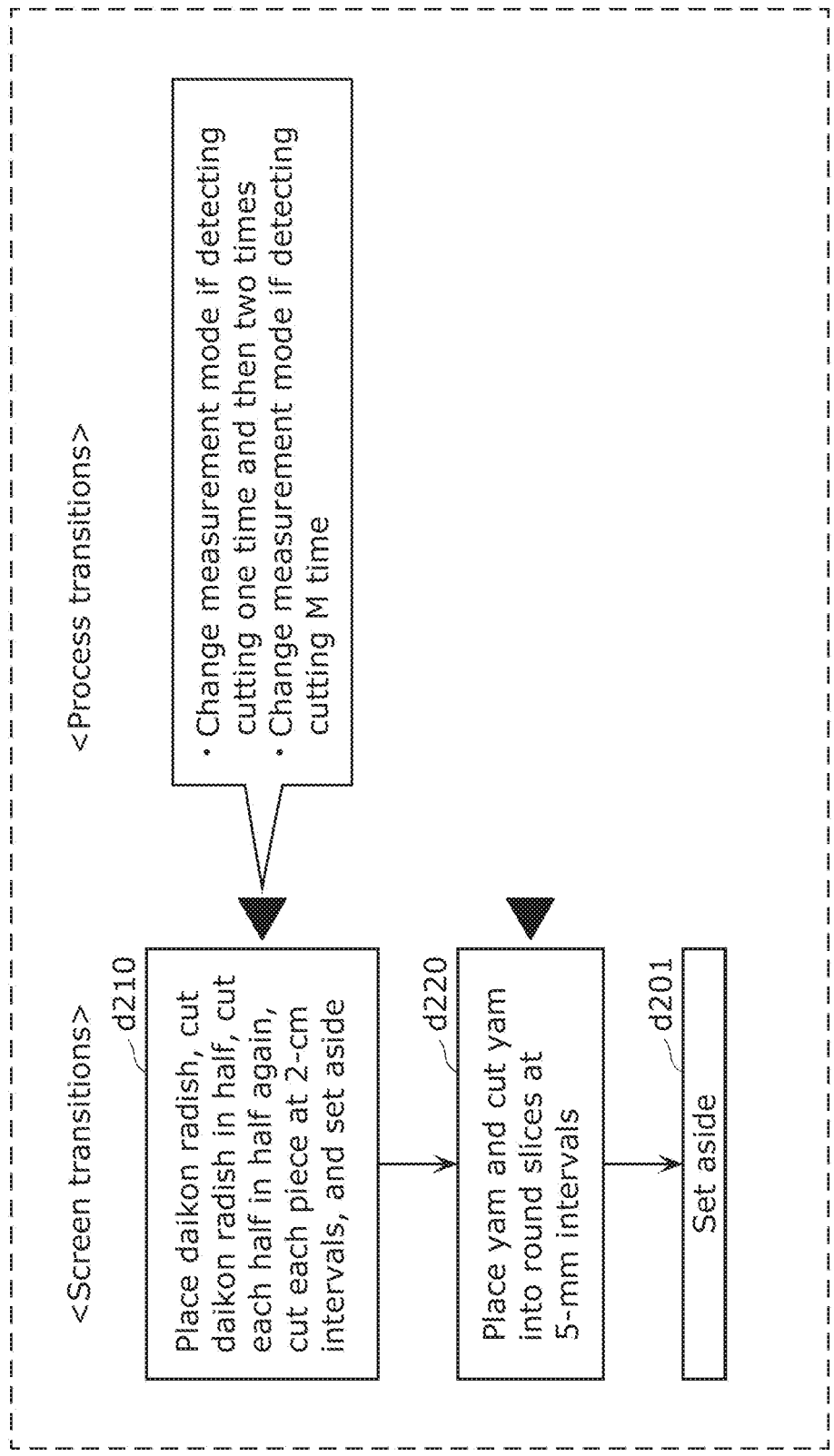
FIG. 32 illustrates another example of screen transitions of the output device and process transitions, according to Embodiment 3.

FIG. 32 illustrates another example of screen transitions of output device 20 and process transitions. In the example illustrated in FIG. 32, the process of changing the measurement mode is added to the screen transitions and the progress transitions illustrated in FIG. 22.

While image d210 is displayed, controller 12 changes the measurement mode when detecting the cutting of the daikon radish one time and then detecting the cutting of the cut daikon radish two times. For example, controller 12 changes the first cut measurement mode to the second cut measurement mode. This allows the subsequent cutting of the daikon radish at 2-cm intervals to be appropriately detected.

Moreover, after detecting the 2 cm-interval cutting of the daikon radish M times, controller 12 changes the measurement mode. For example, controller 12 changes the second cut measurement mode to the first cut measurement mode. This allows the subsequent placement of the yam and the subsequent cutting of the yam into round slices at 2-cm intervals to be appropriately detected.

Note that the timing of changing the measurement mode illustrated in FIG. 32 is merely an example and thus the measurement mode may be changed at different timing. Note also that the measurement mode may be changed between the weight measurement mode and either of the first and second cut measurement modes.

Figure 33:
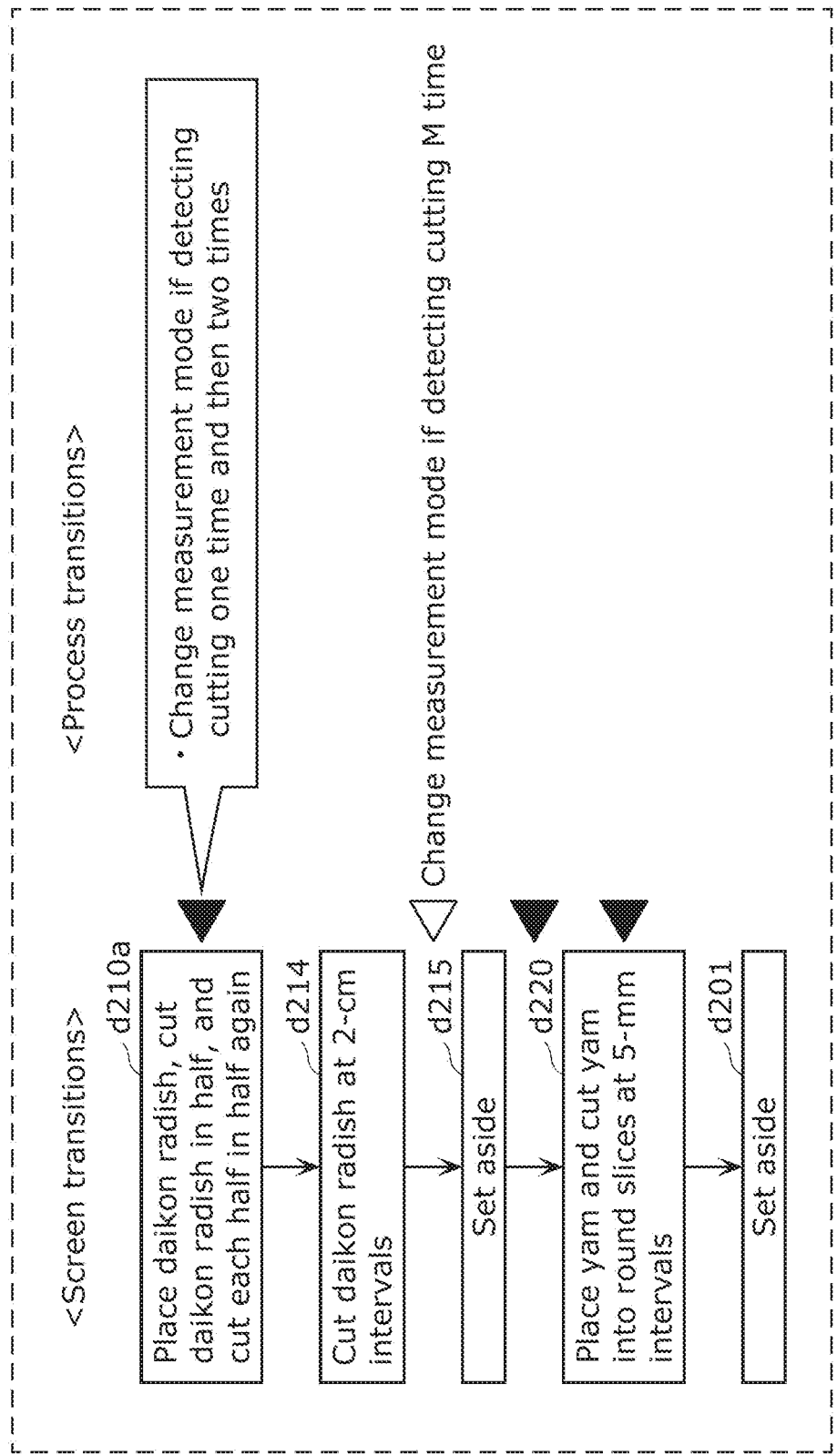
FIG. 33 illustrates another example of screen transitions of the output device and process transitions, according to Embodiment 3.

FIG. 33 illustrates another example of screen transitions of output device 20 and process transitions. In the example illustrated in FIG. 33, the process of changing the measurement mode is added to the screen transitions and the progress transitions illustrated in FIG. 23.

While image d210a is displayed on output device 20, controller 12 changes the measurement mode when detecting the cutting of the daikon radish one time and then detecting the cutting of the cut daikon radish two times. For example, controller 12 changes the first cut measurement mode to the second cut measurement mode.

Moreover, controller 12 changes the measurement mode when changing image d214 displayed on output device 20 to image d215. For example, controller 12 changes the second cut measurement mode to the first cut measurement mode.

Note that the timing of changing the measurement mode illustrated in FIG. 33 is merely an example and thus the measurement mode may be changed at different timing. Note also that the measurement mode may be changed between the weight measurement mode and either of the first and second cut measurement modes.

Figure 34A:
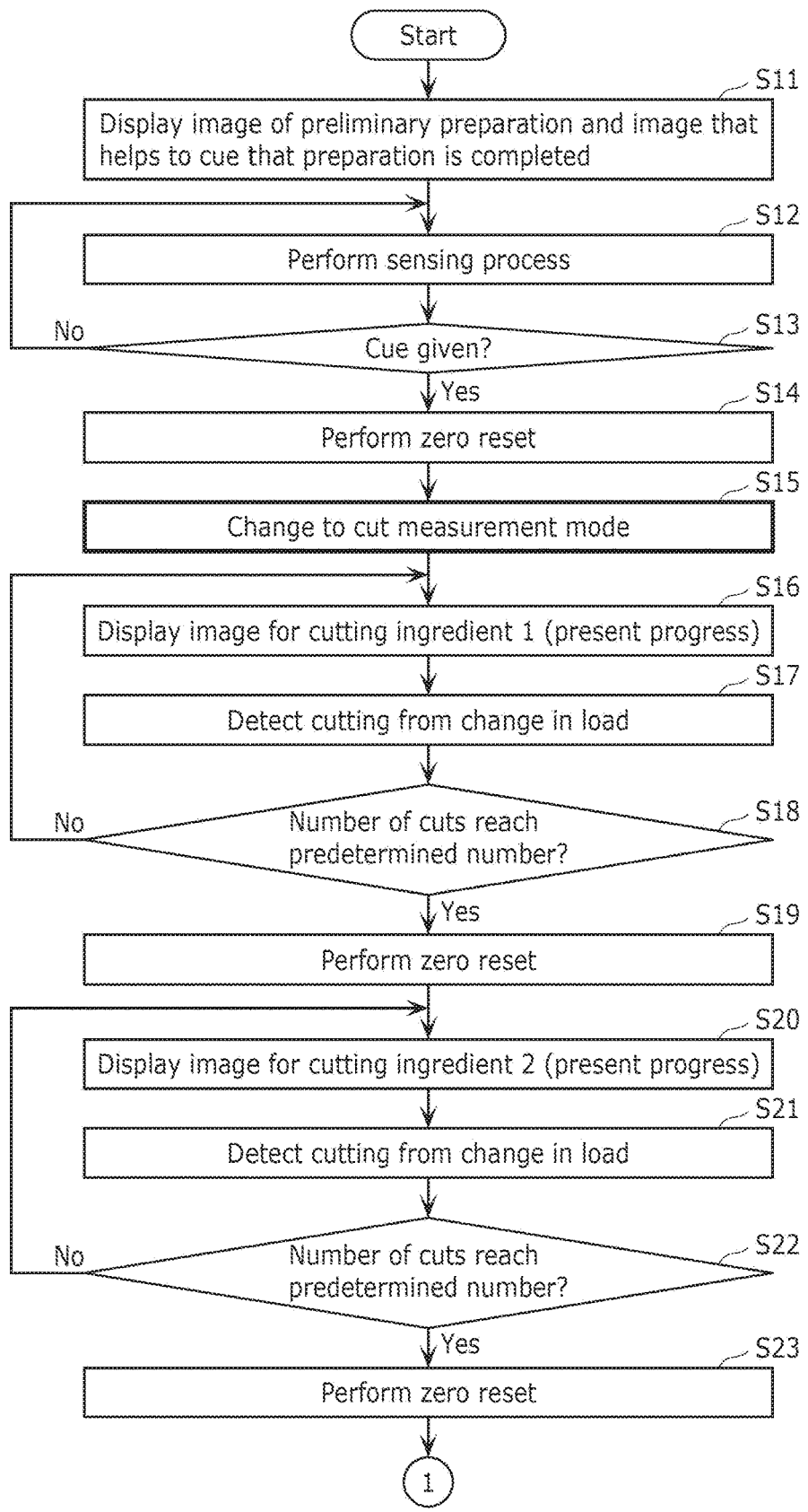
FIG. 34A is a flowchart illustrating a processing operation performed by the controller according to Embodiment 3.
Figure 34B:
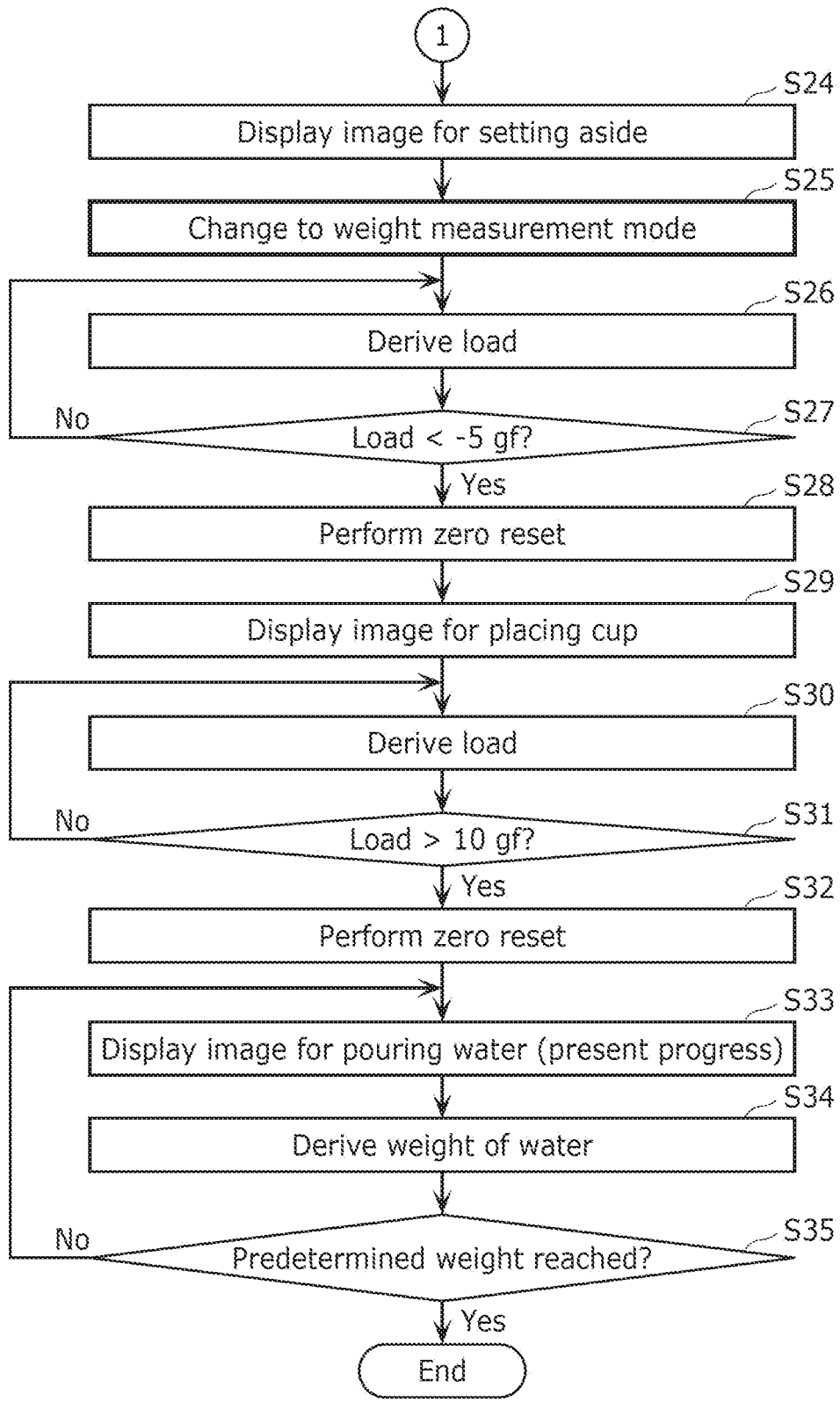
FIG. 34B is a flowchart illustrating a processing operation performed by the controller according to Embodiment 3.

Each of FIG. 34A and FIG. 34B is a flowchart illustrating a processing operation performed by controller 12 according to the present embodiment. The flowcharts in FIG. 34A and FIG. 34B illustrate the processing operation performed until images d1 to d7 in FIG. 17 are displayed. Moreover, these flowcharts illustrate that the change of the measurement mode is added to the flowcharts in FIG. 24A and FIG. 24B.
(Step S15)

For example, controller 12 changes the measurement mode to the cut measurement mode after performing the zero reset in Step S14, as illustrated in FIG. 34A. This allows the cutting to be appropriately detected in Step S17.
(Step S25)

For example, controller 12 changes the measurement mode to the weight measurement mode after causing the image to be displayed in Step S24, as illustrated in FIG. 34B. This allows the weight of water to be appropriately derived in Step S34 for example.

[Summary of Embodiment 3]

As described thus far, cooking assistance system 100 according to the present embodiment also changes the measurement mode when changing the image. More specifically, controller 12 according to the present embodiment performs processing illustrated in FIG. 35.

Figure 35:
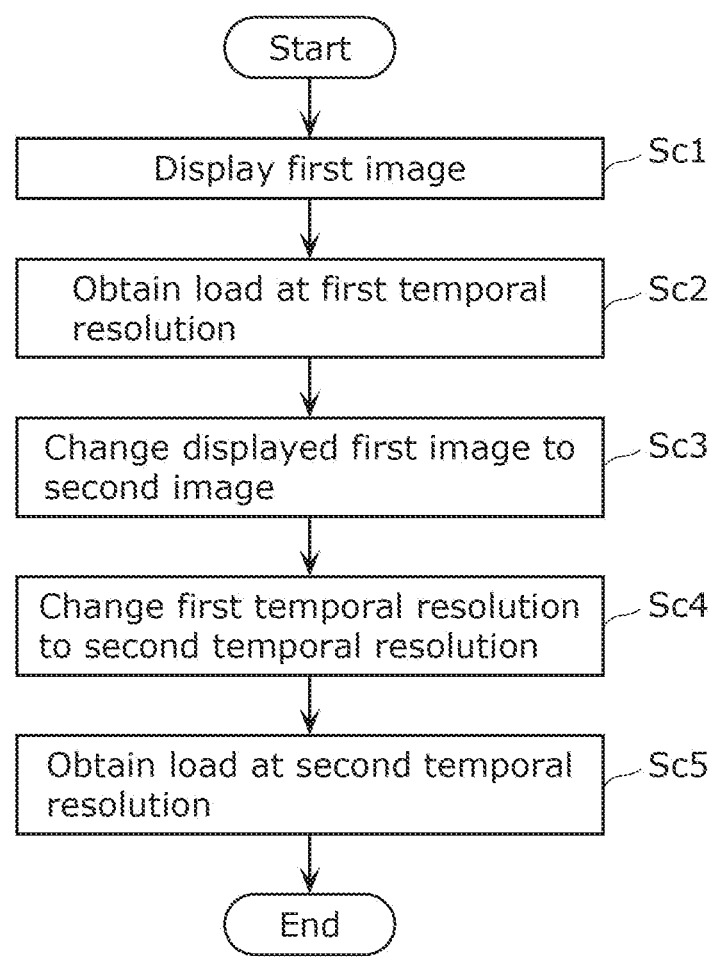
FIG. 35 is a flowchart illustrating a processing operation performed by the controller to change the measurement mode, according to Embodiment 3.

FIG. 35 is a flowchart illustrating a processing operation performed by controller 12 according to the present embodiment.

(Step Sc1)

First, controller 12 causes output device 20 to display the first image relating to the first cooking process in which a cooking operation is performed using cooking board 11.

(Step Sc2)

Next, while the first image is displayed, controller 12 obtains a load on cooking board 11 at a first temporal resolution.

(Step Sc3)

Next, controller 12 changes the first image displayed on output device 20 to the second image relating to the second cooking process in which a cooking process different from the first cooking process is performed using cooking board 11.

(Step Sc4)

Next, when the first image is changed to the second image, controller 12 changes the temporal resolution used to obtain the load, from the first temporal resolution to a second temporal resolution.

(Step Sc5)

Then, while the second image is displayed, controller 12 obtains a load on cooking board 11 at the second temporal resolution.

For example, in the first cooking process, a cooking operation to cut the ingredient on cooking board 11 is performed. In the second cooking process, a cooking operation to measure the weight of the cooking substance on cooking board 11 is performed. In this case, the first temporal resolution is shorter than the second temporal resolution.

In this way, the user of output device 20 performs the cooking operation of the first cooking process according to the first image outputted from output device 20. Then, the load on cooking board 11 in response to this cooking operation is derived. Thus, the result of the cooking operation of the first cooking process can be determined on the basis of the load. After the first image is changed to the second image, the user performs the cooking operation of the second cooking process according to the second image. Then, the load on cooking board 11 in response to this cooking operation is derived. Thus, the result of the cooking operation of the second cooking process can also be determined on the basis of the load. Moreover, the load is obtained at the first temporal resolution during the first cooking process, and the load is obtained at the second temporal resolution during the second cooking process. This allows the change in the load to be obtained in the first cooking process at a temporal resolution suited for the cooking operation of the first cooking process, and also appropriately determines a result of the cooking operation of the first cooking process. Similarly, this allows the change in the load to be obtained in the second cooking process at a temporal resolution suited for the cooking operation of the second cooking process, and also appropriately determines a result of the cooking operation of the second cooking process. Moreover, the temporal resolution used to obtain the load is changed when the image is changed. Thus, while helping the user to perform the operations in the cooking processes with high accuracy using the images before and after the change, the temporal resolution is appropriately changed during an interval between the cooking operations. Hence, the cooking assistance can be appropriately provided.

To obtain a load while the first image is displayed, controller 12 obtains the load using a first load range. Then, when changing the first image to the second image, controller 12 changes the first load range to a second load range that is different from the first load range. To obtain a load while the second image is displayed, controller 12 obtains the load using the second load range.

For example, in the first cooking process, a cooking operation to cut the ingredient on cooking board 11 is performed. In the second cooking process, a cooking operation to measure the weight of the cooking substance on cooking board 11 is performed. In this case, the first load range is wider than the second load range.

With this, the load is obtained using the first load range during the first cooking process, and the load is obtained using the second load range during the second cooking process. This allows the load to be obtained in the first cooking process using a load range suited for the cooking operation of the first cooking process, and also appropriately determines a result of the cooking operation of the first cooking process. Similarly, this allows the load to be obtained in the second cooking process using a load range suited for the cooking operation of the second cooking process, and also appropriately determines a result of the cooking operation of the second cooking process.

To obtain the load while the first image is displayed, controller 12 obtains the load using a first load resolution. Then, when changing the first image to the second image, controller 12 changes the first load resolution to a second load resolution that is different from the first load resolution. To obtain the load while the second image is displayed, controller 12 obtains the load using the second load resolution.

For example, if the cooking operation to cut the ingredient on cooking board 11 is performed in the first cooking process and the cooking operation to measure a weight of a cooking substance on cooking board 11 is performed in the second cooking process, the first load resolution is greater than the second load resolution.

With this, the load is obtained at the first load resolution during the first cooking process and the load is obtained at the second load resolution during the second cooking process. This allows the change in the load to be obtained in the first cooking process using a load resolution suited for the cooking operation of the first cooking process, and also appropriately determines a result of the cooking operation of the first cooking process. Similarly, this allows the load to be obtained in the second cooking process using a load resolution suited for the cooking operation of the second cooking process, and also appropriately determines a result of the cooking operation of the second cooking process.

To obtain the load while the first image is displayed, controller 12 obtains the load expressed by the first load resolution by averaging an output value received from first sensor 13 in response to the load during a first period. Then, when changing the first image to the second image, controller 12 changes the first period to a second period different from the first period. To obtain the load while the second image is displayed, controller 12 obtains the load expressed by the second load resolution different from the first load resolution by averaging an output value received from first sensor 13 in response to the load during the second period. Note that the aforementioned output value is a value indicated by the pressure signal.

With this, the load resolution can be changed by changing the first period to the second period as a period used for the moving average. For example, if the second period is longer than the first period, the stability of the load to be obtained can be enhanced. To be more specific, the load resolution can be enhanced. Here, one of the first period and the second period may be 1, and the moving average may not be performed during this period.

If a cooking operation to cut a first ingredient on cooking board 11 is performed in the first cooking process and a cooking operation to cut a second ingredient different in at least one of hardness or size from the first ingredient on cooking board 11 is performed in the second cooking process, controller 12 detects cutting of the first ingredient while the first image is displayed, when a change in the load obtained satisfies a first condition. When changing the first image to the second image, controller 12 changes the first condition to a second condition different from the first condition. Controller 12 detects cutting of the second ingredient while the second image is displayed, when a change in the load obtained satisfies the second condition.

For example, each of the first condition and the second condition is that, after a period during which a time derivative value of the load is a positive value exceeds a first threshold and the load exceeds a second threshold, the load decreases below the second threshold. The first condition is different from the second condition in at least one of the first threshold or the second threshold.

With this, the cutting of the first ingredient is detected under the first condition during the first cooking process, and the cutting of the second ingredient is detected under the second condition during the second cooking process. This allows the cutting of the ingredient to be detected in the first cooking process under a condition suited for the ingredient used in the first cooking process, and also appropriately determines a result of the cooking operation of the first cooking process. Similarly, this allows the cutting of the ingredient to be detected in the second cooking process under a condition suited for the ingredient used in the second cooking process, and also appropriately determines a result of the cooking operation of the second cooking process.

In the present embodiment, the cut measurement mode includes the first cut measurement mode and the second cut measurement mode. However, the weight measurement mode may also include a first weight measurement mode and a second weight measurement mode. For example, the first weight measurement mode is used in a cooking process in which a weight of a heavy ingredient or a weight of a heavy cooking substance to be put into a pot, such as water, is measured. In contrast, the second weight measurement mode is used in a cooking process in which a weight of a light ingredient or a weight of a light seasoning, such as salt, is measured. This allows the weight of the ingredient or the weight of the cooking substance to be measured more appropriately.

OTHER EMBODIMENTS

Although the cooking assistance method, the cooking assistance device, and the cooking assistance method according to aspects of the present disclosure have been described based on the respective embodiments, the present disclosure is not limited to these embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

For example, in the above embodiments, although first sensor 13 includes four pressure sensors, the number of the pressure sensors included in first sensor 13 may be any number other than four.

It should also be noted in the present disclosure that a part or all of the units and devices, or a part or all of the functional blocks in the block diagrams of FIGS. 2A to 2C may be executed by one or more electronic circuits including a semiconductor device, a semiconductor Integrated Circuit (IC), or a Large Scale Integration (LSI). The LSI or IC may be integrated as a single chip or a combination of a plurality of chips. For example, functional blocks except the memory element may be integrated into a single chip.

Note that here, the terminology "LSI" or "IC" is used, but depending on the degree of integration, the circuit may also be referred to as a system LSI, a very large scale integration (VLSI), or an ultra large scale integration (ULSI). A field programmable gate array (FPGA) that is programed after manufacturing the LSI, or a reconfigurable logic device capable of reconfiguring the connections and settings of the circuit cells in the LSI may be used for the same purpose.

It should also be noted that a part or all of functions or operations of a unit, a device, or a part of the device may be executed by software. In this case, the software is recorded on one or more non-transitory recording mediums, such as a Read Only Memory (ROM), an optical disk, or a hard disk drive, and when the software is executed by a processor, the software causes the processor and peripheral devices to perform specific functions in the software. The system or device may include one or more non-transitory recording mediums that store software, a processor, or a necessary hardware device, such as an interface.

INDUSTRIAL APPLICABILITY

The present disclosure is usable as a cooking assistance system or a cooking assistance device that is used for cooking an ingredient, for example.

The invention claimed is:
1. A cooking assistance method executed by a computer, the cooking assistance method comprising:
    causing an output device to display a first image relating to a first cooking process in which a cooking operation is performed using a cooking board;
    obtaining a load on the cooking board at a first temporal resolution while the first image is displayed;
    changing the first image displayed on the output device to a second image relating to a second cooking process in which a cooking operation different from the first cooking process is performed using the cooking board;
    changing the first temporal resolution used to obtain the load to a second temporal resolution different from the first temporal resolution, when the first image is changed to the second image; and
    obtaining a load on the cooking board at the second temporal resolution while the second image is displayed, wherein the cooking operation performed in one of the first cooking process and the second cooking process is a cooking operation to cut an ingredient on the cooking board.

2. The cooking assistance method according to claim 1, wherein when the cooking operation to cut the ingredient on the cooking board is performed in the first cooking process and a cooking operation to measure a weight of a cooking substance on the cooking board is performed in the second cooking process, the first temporal resolution is shorter than the second temporal resolution.

3. The cooking assistance method according to claim 1, wherein the obtaining of the load while the first image is displayed is performed further using a first load range, the changing of the first image to the second image includes changing the first load range to a second load range different from the first load range, and the obtaining of the load while the second image is displayed is performed further using the second load range.

4. The cooking assistance method according to claim 3, wherein when the cooking operation to cut the ingredient on the cooking board is performed in the first cooking process and a cooking operation to measure a weight of a cooking substance on the cooking board is performed in the second cooking process, the first load range is wider than the second load range.

5. The cooking assistance method according to claim 1, wherein the obtaining of the load while the first image is displayed is performed further using a first load resolution, the changing of the first image to the second image includes changing the first load resolution to a second load resolution different from the first load resolution, and the obtaining of the load while the second image is displayed is performed further using the second load resolution.

6. The cooking assistance method according to claim 1, wherein the obtaining of the load while the first image is displayed includes
averaging output values received from a sensor in response to the load during a first period, thereby obtaining the load expressed by a first load resolution,
the changing of the first image to the second image includes changing the first period to a second period different from the first period, and
the obtaining of the load while the second image is displayed includes
averaging output values received from the sensor in response to the load during the second period, thereby obtaining the load expressed by a second load resolution different from the first load resolution.

7. The cooking assistance method according to claim 5, wherein when the cooking operation to cut the ingredient on the cooking board is performed in the first cooking process and a cooking operation to measure a weight of a cooking substance on the cooking board is performed in the second cooking process, the first load resolution is greater than the second load resolution.

8. The cooking assistance method according to claim 1, further comprising:
when a cooking operation to cut a first ingredient on the cooking board is performed in the first cooking process and a cooking operation to cut a second ingredient different in at least one of hardness or size from the first ingredient on the cooking board is performed in the second cooking process,
detecting cutting of the first ingredient while the first image is displayed, when a change in the load obtained satisfies a first condition,
changing the first condition to a second condition different from the first condition when the first image is changed to the second image, and
detecting cutting of the second ingredient while the second image is displayed, when a change in the load obtained satisfies the second condition.

9. The cooking assistance method according to claim 8, wherein each of the first condition and the second condition is that, after a period during which a time derivative value of the load is a positive value exceeds a first threshold and the load exceeds a second threshold, the load decreases below the second threshold, and the first condition is different from the second condition in at least one of the first threshold or the second threshold.

10. A cooking assistance device comprising:
a processor; and
a memory,
wherein the processor
causes an output device to display a first image stored in the memory, the first image relating to a first cooking process in which a cooking operation is performed using a cooking board,
obtains a load on the cooking board at a first temporal resolution while the first image is displayed,
changes the first image displayed on the output device to a second image relating to a second cooking process in which a cooking operation different from the first cooking process is performed using the cooking board,
changes the first temporal resolution used to obtain the load to a second temporal resolution different from the first temporal resolution, when the first image is changed to the second image, and
obtains a load on the cooking board at the second temporal resolution while the second image is displayed, and
the cooking operation performed in one of the first cooking process and the second cooking process is a cooking operation to cut an ingredient on the cooking board.

11. The cooking assistance device according to claim 10, wherein when the cooking operation to cut the ingredient on the cooking board is performed in the first cooking process and a cooking operation to measure a weight of a cooking substance on the cooking board is performed in the second cooking process, the first temporal resolution is shorter than the second temporal resolution.

12. The cooking assistance device according to claim 10, wherein the processor
further uses a first load range when the load is obtained while the first image is displayed,
changes the first load range to a second load range different from the first load range when the first image is changed to the second image, and
further uses the second load range when the load is obtained while the second image is displayed.

13. The cooking assistance device according to claim 12, wherein when the cooking operation to cut the ingredient on the cooking board is performed in the first cooking process and a cooking operation to measure a weight of a cooking substance on the cooking board is performed in the second cooking process, the first load range is wider than the second load range.

14. The cooking assistance device according to claim 10, wherein the processor further uses a first load resolution when the load is obtained while the first image is displayed, changes the first load resolution to a second load resolution different from the first load resolution when the first image is changed to the second image, and further uses the second load resolution when the load is obtained while the second image is displayed.

15. The cooking assistance device according to claim 10, wherein the processor performs (i) when the load is obtained while the first image is displayed, averaging output values received from a sensor in response to the load during a first period, thereby obtaining the load expressed by a first load resolution, (ii) when the first image is changed to the second image, changing the first period to a second period different from the first period, and (iii) when the load is obtained while the second image is displayed, averaging output values received from the sensor in response to the load during the second period, thereby obtaining the load expressed by a second load resolution different from the first load resolution.

16. The cooking assistance device according to claim 14, wherein when the cooking operation to cut the ingredient on the cooking board is performed in the first cooking process and a cooking operation to measure a weight of a cooking substance on the cooking board is performed in the second cooking process, the first load resolution is greater than the second load resolution.

17. The cooking assistance device according to claim 10, wherein when a cooking operation to cut a first ingredient on the cooking board is performed in the first cooking process and a cooking operation to cut a second ingredient different in at least one of hardness or size from the first ingredient on the cooking board is performed in the second cooking process, the processor further detects cutting of the first ingredient while the first image is displayed, when a change in the load obtained satisfies a first condition, changes the first condition to a second condition different from the first condition when the first image is changed to the second image, and detects cutting of the second ingredient while the second image is displayed, when a change in the load obtained satisfies the second condition.

18. The cooking assistance device according to claim 17, wherein each of the first condition and the second condition is that, after a period during which a time derivative value of the load is a positive value exceeds a first threshold and the load exceeds a second threshold, the load decreases below the second threshold, and the first condition is different from the second condition in at least one of the first threshold or the second threshold.

19. A non-transitory computer-readable recording medium for use in a computer, the recording medium having a computer program recorded thereon for causing the computer to execute:

causing an output device to display a first image relating to a first cooking process in which a cooking operation is performed using a cooking board;

obtaining a load on the cooking board at a first temporal resolution while the first image is displayed;

changing the first image displayed on the output device to a second image relating to a second cooking process in which a cooking operation different from the first cooking process is performed using the cooking board;

changing the first temporal resolution used to obtain the load to a second temporal resolution different from the first temporal resolution, when the first image is changed to the second image; and obtaining a load on the cooking board at the second temporal resolution while the second image is displayed, wherein the cooking operation performed in one of the first cooking process and the second cooking process is a cooking operation to cut an ingredient on the cooking board.

20. The cooking assistance method according to claim 1, wherein when a cooking operation to cut a first ingredient on the cooking board is performed in one of the first cooking process and the second cooking process, one of: a cooking operation to cut a second ingredient different in at least one of hardness or size from the first ingredient on the cooking board; and a cooking operation to measure a weight of a cooking substance on the cooking board, is performed in an other one of the first cooking process and the second cooking process.

\* \* \* \* \*